(12) United States Patent
Wakeham et al.

(10) Patent No.: US 12,722,306 B2
(45) Date of Patent: Sep. 1, 2026

(54) END EFFECTOR OF A HUMANOID ROBOT

(71) Applicant: Figure AI Inc., San Jose, CA (US)

(72) Inventors: Keith Wakeham, San Jose, CA (US); Michael Stevens, San Jose, CA (US); Jake Goldsmith, San Jose, CA (US)

(73) Assignee: FIGURE AI INC., San Jose, CA (US)

( * ) Notice: Subject to any disclaimer, the term of this patent is extended or adjusted under 35 U.S.C. 154(b) by 0 days.

(21) Appl. No.: 19/347,690

(22) Filed: Oct. 1, 2025

(65) Prior Publication Data

US 2026/0091509 A1 Apr. 2, 2026

Related U.S. Application Data

(60) Provisional application No. 63/828,916, filed on Jun. 23, 2025, provisional application No. 63/757,440, filed on Feb. 12, 2025, provisional application No. 63/706,768, filed on Oct. 14, 2024, provisional application No. 63/705,715, filed on Oct. 10, 2024, provisional application No. 63/701,625, filed on Oct. 1, 2024.

(51) Int. Cl.

| | |
|---|---|
| ***B25J 13/00*** | (2006.01) |
| ***B25J 13/08*** | (2006.01) |
| ***B25J 15/00*** | (2006.01) |

(52) U.S. Cl.

CPC ........... *B25J 13/082* (2013.01); *B25J 13/084* (2013.01); *B25J 15/0009* (2013.01)

(58) Field of Classification Search

CPC .... B25J 13/082; B25J 13/084; B25J 15/0009; B25J 13/085

See application file for complete search history.

(56) References Cited

U.S. PATENT DOCUMENTS

| | | | |
|---|---|---|---|
| 552,557 | A | 1/1896 | Weber |
| 1,290,140 | A | 1/1919 | Elleby |
| 2,362,597 | A | 11/1944 | Vince |

(Continued)

FOREIGN PATENT DOCUMENTS

| | | |
|---|---|---|
| AU | 202413544 | 7/2024 |
| CA | 137209 | 5/2011 |

(Continued)

OTHER PUBLICATIONS

Schulman et al., "Proximal Policy Optimization Algorithms," arXiv:1707.06347v2 (Aug. 28, 2017).

(Continued)

*Primary Examiner* — Ian Jen

(57) ABSTRACT

The present disclosure provides a humanoid robot comprising a torso, a head coupled to the torso, an articulated arm coupled to torso, and an end effector coupled to the articulated arm and comprising a tactile sensor assembly. The tactile sensor assembly includes a bridge comprising a base section and three flexure arms, wherein each flexure arm includes a sloped section extending from the base section at a first non-zero angle and a load section extending from the sloped section at a second non-zero angle. A strain gauge is coupled to the sloped section of each flexure arm. The tactile sensor assembly includes an electronics assembly communicatively coupled to each strain gauge and configured to process data received from each strain gauge.

10 Claims, 25 Drawing Sheets

(56) References Cited

U.S. PATENT DOCUMENTS 3,060,445 A 10/1962 Brockman
3,458,864 A 8/1969 Austin
D246,201 S 10/1977 Ogawa
D251,627 S 4/1979 Mcquarrie
D255,283 S 6/1980 Piche
4,678,952 A 7/1987 Peterson
4,804,220 A 2/1989 Rosheim
4,834,761 A 5/1989 Walters
4,986,723 A 1/1991 Maeda
5,394,766 A 3/1995 Johnson
5,447,403 A 9/1995 Engler, Jr.
5,673,367 A 9/1997 Buckley
6,477,058 B1 11/2002 Luebs
D476,404 S 6/2003 Chen
6,732,015 B2 5/2004 Maeda
6,901,313 B2 5/2005 Mori
6,980,889 B2 12/2005 Ito
7,024,276 B2 4/2006 Ito
7,031,806 B2 4/2006 Kuroki
7,072,741 B2 7/2006 Nagashima
7,099,747 B2 8/2006 Mikami
7,113,849 B2 9/2006 Kuroki
7,230,402 B2 6/2007 Kumagai
7,308,336 B2 12/2007 Takenaka
7,319,918 B2 1/2008 Takenaka
7,330,775 B2 2/2008 Orita
7,337,040 B2 2/2008 Takenaka
7,379,789 B2 5/2008 Takenaka
7,386,364 B2 6/2008 Mikami
7,664,569 B2 2/2010 Shimizu
D622,332 S 8/2010 Pence
D631,612 S 1/2011 Tajima
7,864,159 B2 1/2011 Sweetser
D641,808 S 7/2011 Matsuda
8,224,652 B2 7/2012 Wang
D668,758 S 10/2012 Hall
D677,743 S 3/2013 Koshiishi
D687,908 S 8/2013 Hoang
8,511,964 B2 8/2013 Linn
D689,566 S 9/2013 Wong
8,660,695 B2 2/2014 De La Rosa Tames
8,706,299 B2 4/2014 Sanders
8,770,749 B2 7/2014 Mccabe
D712,598 S 9/2014 Mehra
8,942,849 B2 1/2015 Maisonnier
D732,999 S 6/2015 Siegel
9,134,547 B2 9/2015 Mccabe
9,180,595 B2 11/2015 Inada
9,205,556 B1 12/2015 Magnusson
9,205,560 B1 12/2015 Edsinger
9,302,393 B1 4/2016 Rosen
9,346,165 B1 5/2016 Metzger
9,494,415 B2 11/2016 Sweetser
D774,148 S 12/2016 Hong
9,569,976 B2 2/2017 Krauss
9,574,646 B1 2/2017 Edsinger
9,575,335 B1 2/2017 Mccabe
9,592,603 B2 3/2017 Hardouin
9,669,280 B2 6/2017 Hua
D794,692 S 8/2017 Haranaka
D795,320 S 8/2017 Liu
D795,321 S 8/2017 Liu
D800,229 S 10/2017 Baker
9,789,607 B1 10/2017 Whitman
9,789,612 B2 10/2017 Hoffman
9,796,078 B2 10/2017 Angle
9,821,466 B2 11/2017 Bingham
9,842,585 B2 12/2017 Huang
9,868,210 B1 1/2018 Whitman
9,975,248 B2 5/2018 Stephens, Jr.
9,992,474 B2 6/2018 Grunnet-Jepsen
10,007,994 B2 6/2018 Grunnet-Jepsen
10,018,256 B1 7/2018 Magnusson
D831,308 S 10/2018 Lu
D835,214 S 12/2018 Xiong
D838,759 S 1/2019 Kowalski
10,189,158 B2 1/2019 Edsinger
D841,708 S 2/2019 Koshiishi
10,203,209 B2 2/2019 Roumeliotis
10,310,362 B2 6/2019 Grunnet-Jepsen
10,349,245 B2 7/2019 Tokuchi
D856,593 S 8/2019 Burke
10,369,071 B2 8/2019 Klassen
10,399,238 B2 9/2019 Waita
D866,684 S 11/2019 Früh
D868,866 S 12/2019 Gable
D872,152 S 1/2020 Xiong
D873,320 S 1/2020 Clerc
10,532,464 B1 1/2020 Guzman
10,537,998 B2 1/2020 Salisbury
10,545,497 B1 1/2020 Cui
10,571,896 B2 2/2020 Benaim
D885,451 S 5/2020 Chen
D888,120 S 6/2020 Hurst
D892,886 S 8/2020 Klassen
D892,887 S 8/2020 Klassen
D893,573 S 8/2020 Yan
10,780,578 B2 9/2020 Blankespoor
D898,789 S 10/2020 Nazarikhorram
D900,251 S 10/2020 Ouyang
D901,608 S 11/2020 Okabe
10,890,921 B2 1/2021 Gillett
D911,459 S 2/2021 Xiong
10,921,558 B2 2/2021 Yao
10,924,638 B2 2/2021 Swaminathan
10,946,528 B2 3/2021 Gupta
10,960,539 B1 3/2021 Kalakrishnan
10,988,192 B1 4/2021 Thorne
D918,979 S 5/2021 Mullan
D921,081 S 6/2021 Laplante
D932,531 S 10/2021 Xu
11,179,848 B2 11/2021 Hume
11,180,205 B2 11/2021 Amino
11,188,821 B1 11/2021 Kalakrishnan
11,200,816 B2 12/2021 Wang
11,247,738 B2 2/2022 Lavalley
11,292,126 B2 4/2022 Christensen
11,333,954 B2 5/2022 Bull
11,347,030 B2 5/2022 Yao
11,416,003 B2 8/2022 Whitman
11,435,745 B2 9/2022 Lee
11,498,223 B2 11/2022 Williams
D972,815 S 12/2022 Wang
D975,363 S 1/2023 Paulson
11,546,504 B2 1/2023 Kim
11,554,484 B2 1/2023 Jung
11,600,010 B2 3/2023 Doutre
11,602,853 B2 3/2023 Stoianovici
11,623,354 B2 4/2023 L'Ecuyer
11,632,991 B2 4/2023 Hull
D985,643 S 5/2023 Li
11,645,444 B2 5/2023 Scheutz
11,686,884 B2 6/2023 Shinohara
D991,347 S 7/2023 Ding
11,699,884 B2 7/2023 Braun
11,707,852 B1 7/2023 Hurst
11,736,677 B2 8/2023 Grunnet-Jepsen
11,807,067 B2 11/2023 Mancini
11,833,680 B2 12/2023 Deits
11,850,738 B2 12/2023 Chernyak
11,851,120 B2 12/2023 Fay
11,924,023 B1 3/2024 Smith
D1,024,427 S 4/2024 Li
11,999,423 B2 6/2024 Whitman
12,036,670 B2 7/2024 Geating
12,054,208 B2 8/2024 Swilling
12,070,863 B2 8/2024 Whitman
12,077,229 B2 9/2024 Whitman
12,097,626 B2 9/2024 Ikeda
12,122,044 B2 10/2024 Webb
D1,051,193 S 11/2024 Mahoor
12,134,181 B2 11/2024 Klingensmith
D1,055,176 S 12/2024 Qin
12,172,537 B2 12/2024 Gonano

(56) References Cited

U.S. PATENT DOCUMENTS 12,205,214 B2 1/2025 Starke
12,214,497 B2 2/2025 Whitman
12,235,652 B2 2/2025 Whitman
12,240,117 B2 3/2025 Chebotar
12,246,441 B1 3/2025 Abate
12,251,831 B2 3/2025 Murphy
D1,069,875 S 4/2025 Belon
12,263,591 B1 4/2025 Clerc
D1,082,878 S 7/2025 Grummas
D1,082,881 S 7/2025 Wang
D1,085,192 S 7/2025 Abroff
12,365,094 B2 7/2025 Mccall
D1,089,451 S 8/2025 Lin
12,403,611 B2 9/2025 Mccall
12,420,434 B1 9/2025 Goldsmith
12,472,648 B1 11/2025 Hadas
D1,105,195 S 12/2025 Liu
D1,107,770 S 12/2025 Wang
D1,114,356 S 2/2026 Dau
D1,114,898 S 2/2026 Feldman
12,539,618 B1 2/2026 Mccall
12,558,791 B1 2/2026 Bernards
12,558,801 B2 2/2026 Shannon
D1,115,887 S 3/2026 Wang
D1,117,383 S 3/2026 Wang
D1,118,726 S 3/2026 Mccall
12,578,733 B2 3/2026 Lynch
2002/0157167 A1 10/2002 Paul
2003/0070202 A1 4/2003 Paul
2003/0173926 A1 9/2003 Hattori
2004/0003950 A1 1/2004 Ogawa
2004/0044417 A1 3/2004 Gramnaes
2004/0075168 A1 4/2004 Azuma
2004/0103740 A1 6/2004 Townsend
2004/0176875 A1 9/2004 Iribe
2005/0072558 A1 4/2005 Whitney
2006/0217838 A1 9/2006 Sugino
2007/0035143 A1 2/2007 Blackwell
2008/0239678 A1 10/2008 Ploeg
2008/0240889 A1 10/2008 Yokoyama
2009/0059033 A1 3/2009 Shimada
2009/0321150 A1 12/2009 Kwon
2010/0229663 A1 9/2010 Wang
2010/0280662 A1 11/2010 Abdallah
2011/0058800 A1 3/2011 Lee
2011/0067517 A1 3/2011 Ihrke
2011/0067520 A1 3/2011 Ihrke
2011/0068595 A1 3/2011 Ihrke
2011/0071671 A1 3/2011 Ihrke
2011/0071673 A1 3/2011 Ihrke
2011/0071678 A1 3/2011 Ihrke
2011/0178636 A1 7/2011 Kwon
2011/0186362 A1 8/2011 Alfayad
2012/0072215 A1 3/2012 Yu
2012/0078419 A1 3/2012 Kim
2012/0155775 A1 6/2012 Ahn
2012/0215539 A1 8/2012 Juneja
2012/0310412 A1 12/2012 Seo
2013/0175816 A1 7/2013 Kawasaki
2013/0345863 A1 12/2013 Linder
2014/0039675 A1 2/2014 Ead
2014/0132210 A1 5/2014 Partovi
2014/0217762 A1 8/2014 Ihrke
2014/0265401 A1 9/2014 Allen Demers
2014/0279432 A1 9/2014 Holman
2015/0019013 A1* 1/2015 Rose ........................ B25J 13/08
702/41
2015/0192399 A1 7/2015 Raab
2015/0290795 A1 10/2015 Oleynik
2016/0008988 A1 1/2016 Kennedy
2016/0052574 A1 2/2016 Khripin
2016/0064263 A1 3/2016 Hosek
2017/0028551 A1 2/2017 Hemken
2017/0028563 A1 2/2017 Hemken
2017/0032035 A1 2/2017 Gao
2017/0075143 A1 3/2017 Saylor
2017/0080582 A1 3/2017 Mugnier
2017/0106738 A1 4/2017 Gillett
2017/0125008 A1 5/2017 Maisonnier
2017/0299898 A1 10/2017 Gallina
2017/0326736 A1 11/2017 Nagatsuka
2018/0104823 A1 4/2018 Kaku
2018/0136912 A1 5/2018 Venkataramani
2018/0182260 A1 6/2018 Ciniello
2018/0186015 A1 7/2018 Xiong
2018/0232201 A1 8/2018 Holtmann
2018/0281179 A1 10/2018 Michalakis
2018/0293517 A1 10/2018 Browne
2018/0357552 A1 12/2018 Campos
2019/0005374 A1 1/2019 Shankar
2019/0025611 A1 1/2019 Saylor
2019/0079924 A1 3/2019 Sugiura
2019/0082811 A1 3/2019 Gray
2019/0105783 A1 4/2019 Al Moubayed
2019/0278079 A1 9/2019 Mccabe
2019/0329413 A1 10/2019 Johnson
2019/0337166 A1 11/2019 Keeney-Ritchie
2019/0371307 A1 12/2019 Zhao
2019/0374161 A1 12/2019 Ly
2020/0003256 A1 1/2020 Koroyasu
2020/0009739 A1 1/2020 Moon
2020/0086479 A1 3/2020 Messier
2020/0180145 A1 6/2020 Xiong
2020/0180146 A1 6/2020 Xiong
2020/0180167 A1 6/2020 Xiong
2020/0182336 A1 6/2020 Xiong
2020/0182337 A1 6/2020 Xiong
2020/0330246 A1 10/2020 Tognetti
2020/0409183 A1 12/2020 Saylor
2021/0146214 A1 5/2021 Lim
2021/0162602 A1 6/2021 Kawaguchi
2021/0387346 A1 12/2021 Gillett
2022/0226996 A1 7/2022 Ishizuka
2022/0227010 A1 7/2022 Takabu
2022/0287853 A1 9/2022 Ren
2022/0294062 A1 9/2022 Kamon
2022/0307581 A1 9/2022 Johansen
2022/0388174 A1 12/2022 Stathis
2022/0390952 A1 12/2022 Yu
2022/0395974 A1 12/2022 Balasubramanian
2022/0410380 A1 12/2022 Lu
2023/0033779 A1 2/2023 Gazeau
2023/0048725 A1 2/2023 Barbour
2023/0112596 A1 4/2023 Yang
2023/0143315 A1 5/2023 Whitman
2023/0154055 A1 5/2023 Besenbruch
2023/0173683 A1 6/2023 Gomez
2023/0182296 A1 6/2023 Sermanet
2023/0287941 A1 9/2023 Dellon
2023/0347514 A1 11/2023 Xiao
2023/0390948 A1 12/2023 Hsu
2024/0003380 A1 1/2024 Vyas
2024/0044331 A1 2/2024 Sterling
2024/0091964 A1 3/2024 Smith
2024/0181637 A1 6/2024 Gillett
2024/0217096 A1 7/2024 Maleki
2024/0217104 A1 7/2024 Neville
2024/0228191 A1 7/2024 Kumar
2024/0289606 A1 8/2024 Wang
2024/0294219 A1 9/2024 Gildert
2024/0299195 A1 9/2024 Perry
2024/0300109 A1 9/2024 Shaw
2024/0430464 A1 12/2024 Kalva
2025/0042020 A1 2/2025 Fleury
2025/0042024 A1 2/2025 Dijkman
2025/0050507 A1 2/2025 Camasmie
2025/0131347 A1 4/2025 Wells
2025/0147517 A1 5/2025 Swilling
2025/0187202 A1 6/2025 Mccall
2025/0196326 A1 6/2025 Katz
2025/0196327 A1 6/2025 Geating
2025/0205908 A1 6/2025 Goldsmith
2025/0242500 A1 7/2025 Mccall
2025/0269518 A1 8/2025 Ragusila

(56) References Cited

U.S. PATENT DOCUMENTS

| | | | |
|---|---|---|---|
| 2025/0312911 | A1 | 10/2025 | Ragusila |
| 2025/0319614 | A1 | 10/2025 | Stevens |
| 2025/0322372 | A1 | 10/2025 | Berlin |
| 2025/0367837 | A1 | 12/2025 | Webb |
| 2025/0375905 | A1 | 12/2025 | Goldsmith |
| 2026/0008178 | A1 | 1/2026 | Mccall |
| 2026/0016809 | A1 | 1/2026 | Shu-Xing Cheng |
| 2026/0027736 | A1 | 1/2026 | Yeganeh |
| 2026/0034678 | A1 | 2/2026 | Mccall |
| 2026/0070216 | A1 | 3/2026 | Webb |
| 2026/0084309 | A1 | 3/2026 | Wu |

FOREIGN PATENT DOCUMENTS

| | | | |
|---|---|---|---|
| CA | 233700 | | 7/2025 |
| CN | 102357889 | | 2/2012 |
| CN | 302064216 | S | 9/2012 |
| CN | 302255798 | | 12/2012 |
| CN | 302255798 | S | 12/2012 |
| CN | 308637925 | | 5/2014 |
| CN | 303298408 | | 7/2015 |
| CN | 304998646 | S | 1/2019 |
| CN | 305154358 | S | 5/2019 |
| CN | 209615545 | | 11/2019 |
| CN | 210998685 | | 7/2020 |
| CN | 306231734 | | 12/2020 |
| CN | 212287717 | | 1/2021 |
| CN | 112959343 | | 6/2021 |
| CN | 306894068 | S | 10/2021 |
| CN | 114147745 | | 3/2022 |
| CN | 114147745 | A | 3/2022 |
| CN | 307563528 | | 9/2022 |
| CN | 307563528 | S | 9/2022 |
| CN | 115503013 | | 12/2022 |
| CN | 115649316 | | 1/2023 |
| CN | 218802294 | | 4/2023 |
| CN | 116714698 | | 9/2023 |
| CN | 117047810 | | 11/2023 |
| CN | 117301022 | | 12/2023 |
| CN | 117462367 | | 1/2024 |
| CN | 308675468 | S | 6/2024 |
| CN | 308157136 | S | 8/2024 |
| CN | 309180560 | S | 3/2025 |
| DE | 3345607 | A1 | 6/1985 |
| DE | 10217020 | | 11/2003 |
| DE | 112018003604 | T5 | 5/2020 |
| DE | 402020100743 | | 2/2021 |
| DE | 102022107533 | | 10/2023 |
| DE | 112018003604 | | 11/2023 |
| EP | 2186552 | A1 | 5/2010 |
| ES | 59639 | U | 6/1957 |
| FR | 2595950 | A1 | 9/1987 |
| GB | 2446885 | A | 8/2008 |
| GB | 2472046 | | 4/2013 |
| GB | 2496335 | | 5/2013 |
| GB | 90038381840001 | | 11/2017 |
| GB | 6367851 | | 6/2024 |
| GB | 6420068 | | 2/2025 |
| GB | 6420070 | | 2/2025 |
| JP | 1162349 | | 1/2003 |
| JP | 2003266362 | A | 9/2003 |
| JP | 1301180 | | 5/2007 |
| JP | 1412554 | | 5/2011 |
| JP | D1638014 | | 7/2019 |
| JP | 6775862 | B1 | 10/2020 |
| JP | 1698172 | | 10/2021 |
| KR | 20180107353 | | 10/2018 |
| KR | 300994127 | | 2/2021 |
| KR | 3020240036125 | | 9/2024 |
| SU | 1734994 | | 5/1992 |
| TW | 105306360 | | 2/2018 |
| WO | 2009030922 | | 3/2009 |
| WO | 2017103682 | A2 | 6/2017 |
| WO | 2019234706 | | 12/2019 |
| WO | 2020190594 | | 9/2020 |
| WO | 2020190594 | A1 | 9/2020 |
| WO | 2022207106 | | 10/2022 |
| WO | 2023110778 | | 6/2023 |
| WO | D224613 | | 10/2023 |
| WO | 2023246994 | | 12/2023 |
| WO | 2023246995 | | 12/2023 |
| WO | 2024058844 | | 3/2024 |
| WO | 2024072966 | | 4/2024 |
| WO | 2024085904 | | 4/2024 |
| WO | 2024111509 | A1 | 5/2024 |
| WO | 2024112350 | | 5/2024 |
| WO | 2024112351 | | 5/2024 |
| WO | 2024123766 | | 6/2024 |
| WO | 2024163992 | | 8/2024 |
| WO | 2025019583 | | 1/2025 |
| WO | 2025042802 | | 2/2025 |
| WO | 2025072321 | | 4/2025 |
| WO | 2025103557 | A1 | 5/2025 |
| WO | 2025221916 | A1 | 10/2025 |

OTHER PUBLICATIONS

Sermanet, Pierre, et al. "Time-contrastive networks: Self-supervised learning from video." 2018 IEEE international conference on robotics and automation (ICRA). IEEE, (Mar. 20, 2018).
Sharma et al., "Third-Person Visual Imitation Learning via Decoupled Hierarchical Controller," 33rd Conference on Neural Information Processing Systems (NeurIPS 2019), Vancouver, Canada.
Sieb et al., "Graph-Structured Visual Imitation," 3rd Conference on Robot Learning (CoRL 2019), Osaka, Japan. (May 12, 2020).
Smith et al., "AVID: Learning Multi-Stage Tasks via Pixel-Level Translation of Human Videos," arXiv:1912.04443v3 (Jun. 21, 2020).
Stadie et al., "Third-Person Imitation Learning," arXiv:1703.01703v2 (Sep. 22, 2019).
Sun et al., "Learning by Watching via Keypoint Extraction and Imitation Learning," Machines 2022, 10, 1049. https://doi.org/10.3390/machines10111049 (Nov. 9, 2022).
Team, Octo Model, et al. "Octo: An open-source generalist robot policy." arXiv preprint arXiv:2405.12213 (May 20, 2024).
Touvron et al., "Llama 2: Open Foundation and Fine-Tuned Chat Models," arXiv:2307.09288v2 (Jul. 19, 2023).
Vaswani et al., "Attention Is All You Need," 31st Conference on Neural Information Processing Systems (NIPS 2017), Long Beach, CA, USA. (Jun. 12, 2017).
Wang et al., "Structbert: Incorporating Language Structures Into Pre-Training for Deep Language Understanding,," arXiv:1908.04577v3 (Sep. 27, 2019).
Wiedebach, Georg, et al. "Walking on partial footholds including line contacts with the humanoid robot atlas." 2016 IEEE-RAS 16th International Conference on Humanoid Robots (Humanoids). IEEE, 2016.
Xiong et al., "Learning by Watching: Physical Imitation of Manipulation Skills from Human Videos," arXiv:2101.07241v2 (Nov. 14, 2021).
Yao et al., "FILIP: Fine-Grained Interactive Language-Image Pre-Training," arXiv:2111.07783v1 (Nov. 9, 2021).
Yin et al., "A Survey on Multimodal Large Language Models," arXiv:2306.13549v2 (Apr. 1, 2024).
Zhang et al., "An Object Attribute Guided Framework for Robot Learning Manipulations from Human Demonstration Videos," 2019 IEEE/RSJ International Conference on Intelligent Robots and Systems (IROS) Macau, China, (Nov. 4, 2019).
Zhang et al., "LLAMA-Adapter: Efficient Fine-Tuning of Large Language Models With Zero-Initialized Attention," arXiv:2303.16199v3 (Sep. 18, 2024).
Zhang et al., "MM-LLMs: Recent Advances in MultiModal Large Language Models," arXiv:2401.13601v5 (May 28, 2024).
Zhou et al., "Watch, Try, Learn: Meta-Learning From Demonstrations and Rewards," arXiv:1906.03352v4 (Jan. 30, 2020).
Zitkovich, Brianna, et al. "Rt-2: Vision-language-action models transfer web knowledge to robotic control." Conference on Robot Learning. PMLR, (Jul. 28, 2023).
Brohan, Anthony, et al. "Rt-1: Robotics transformer for real-world control at scale." arXiv preprint arXiv:2212.06817 (Dec. 13, 2022).

(56) References Cited

OTHER PUBLICATIONS

Brown et al., "Language Models are Few-Shot Learners," arXiv:2005.14165v4 (Jul. 22, 2020).
Calvert, Duncan, et al. "A fast, autonomous, bipedal walking behavior over rapid regions." 2022 IEEE-RAS 21st International Conference on Humanoid Robots (Humanoids). IEEE, 2022.
Chang et al., "A Survey on Evaluation of Large Language Models," ACM Trans. Intell. Syst. Technol., vol. 15, No. 3, Article 39. (Mar. 2024).
Chen et al., "InternVL: Scaling up Vision Foundation Models and Aligning for Generic Visual-Linguistic Tasks," https://github.com/OpenGVLab/InternVL (2024).
Dafarra, Stefano, et al. "Non-linear trajectory optimization for large step-ups: Application to the humanoid robot atlas." 2020 IEEE/RSJ International Conference on Intelligent Robots and Systems (IROS). IEEE, 2020.
Ding, Tianli, et al. "Goalseye: Learning high speed precision table tennis on a physical robot." arXiv preprint arXiv:2210.03662 (Oct. 13, 2022).
Driess, Danny, et al. "Palm-e: An embodied multimodal language model." (Mar. 6, 2023).
Dwibedi, Debidatta, et al. "Learning actionable representations from visual observations." 2018 IEEE/RSJ international conference on intelligent robots and systems (IROS). IEEE, Feb. 2, 2018).
Garcia, Gabriel, Robert Griffin, and Jerry Pratt. "0-step capturability, motion decomposition and global feedback control of the 3D variable height-inverted pendulum." arXiv preprint arXiv:1912.06078 (2019).
Gia et al., "Densely Connected Feature Pyramid Network for Image Segmentation," 2020 8th International Conference on Digital Home (ICDH).
Griffin, Robert J., et al. "Capture point trajectories for reduced knee bend using step time optimization." 2017 IEEE-RAS 17th International Conference on Humanoid Robotics (Humanoids). IEEE, 2017.
Griffin, Robert J., et al. "Footstep planning for autonomous walking over rough terrain." 2019 IEEE-RAS 19th international conference on humanoid robots (humanoids). IEEE, 2019.
Griffin, Robert J., et al. "Straight-leg walking through underconstrained whole-body control." 2018 IEEE International Conference on Robotics and Automation (ICRA). IEEE, 2018.
Griffin, Robert J., et al. "Walking stabilization using step timing and location adjustment on the humanoid robot, atlas." 2017 IEEE/RSJ International Conference on Intelligent Robots and Systems (IROS). IEEE, 2017.
Gupta, Abhishek, et al. "Bootstrapped autonomous practicing via multi-task reinforcement learning." arXiv preprint arXiv:2203.15755 (Mar. 29, 2022).
Gupta, Abhishek, et al. "Relay policy learning: Solving long-horizon tasks via imitation and reinforcement learning." arXiv preprint arXiv:1910.11956 (Oct. 25, 2019).
Heravi, Negin, et al. "Visuomotor control in multi-object scenes using object-aware representations." arXiv preprint arXiv:2205.06333 (May 12, 2022).
Jang, Eric, et al. "Bc-z: Zero-shot task generalization with robotic imitation learning." Conference on Robot Learning. PMLR, (Feb. 4, 2022).
Jin et al., "Unified Language-Vision Pretraining in LLM With Dynamic Discrete Visual Tokenization," arXiv:2309.04669v3 [cs.CV] Mar. 22, 2024.
Kim et al., "Giving Robots a Hand: Learning Generalizable Manipulation with Eye-in-Hand Human Video Demonstrations," arXiv:2307.05959v1 (Jul. 12, 2023).
Kim et al., "Parallel Feature Pyramid Network for Object Detection," ECCV 2018.
Kim, Moo Jin, et al. "Openvla: An open-source vision-language-action model." arXiv preprint arXiv:2406.09246 (Jun. 13, 2024).
Kirillov et al., "Panoptic Feature Pyramid Networks," IEEE Xplore (2019).
Lee et al., "Learning Robot Activities from First-Person Human Videos Using Convolutional Future Regression," IEEE Xplore (2017).
Li et al., "Supervision Exists Everywhere: A Data Efficient Contrastive Language-Image Pre-Training Paradigm," arXiv:2110.05208v2 (Mar. 14, 2022).
Li et al., BLIP: Bootstrapping Language-Image Pre-training for Unified Vision-Language Understanding and Generation, Proceedings of the 39 th International Conference on Machine Learning, Baltimore, Maryland, USA, PMLR 162, 2022.
Lin et al., "Feature Pyramid Networks for Object Detection," IEEE Xplore (2017).
Lin et al., "Feature Pyramid Networks for Object Detection," IEEE Xplore (2024).
Lin et al., "VILA: On Pre-training for Visual Language Models," https://github.com/Efficient-Large-Model/VILA (2024).
Liu et al., "A Survey of Attacks on Large Vision-Language Models: Resources, Advances, and Future Trends," Journal of Latex Class Files, vol. 14, No. (Aug. 8, 2021).
Liu et al., "Imitation from Observation: Learning to Imitate Behaviors from Raw Video via Context Translation," arXiv:1707.03374v2 (Jun. 18, 2018).
Liu et al., "Improved Baselines with Visual Instruction Tuning," IEEE Xplore (2024).
Liu et al., "RoBERTa: A Robustly Optimized BERT Pretraining Approach," arXiv:1907.11692v1 (Jul. 26, 2019).
Liu et al., "Visual Instruction Tuning," 37th Conference on Neural Information Processing Systems (NeurIPS 2023).
Lynch, Corey, and Pierre Sermanet. "Language conditioned imitation learning over unstructured data." arXiv preprint arXiv:2005.07648 (Jul. 7, 2020).
Lynch, Corey, et al. "Interactive language: Talking to robots in real time." IEEE Robotics and Automation Letters (Oct. 12, 2023).
Lynch, Corey, et al. "Learning latent plans from play." Conference on robot learning. Pmlr, (Dec. 20, 2020).
Lynch, Corey, Kamelia Aryafar, and Josh Attenberg. "Images don't lie: Transferring deep visual semantic features to large-scale multimodal learning to rank." Proceedings of the 22nd ACM SIGKDD international conference on knowledge discovery and data mining. (Nov. 20, 2015).
Mandi et al., "Towards More Generalizable One-shot Visual Imitation Learning," bencharXiv: 2110.13423v2 [cs.RO] Feb. 8, 2022.
Maniparambil et al., "Do Vision and Language Encoders Represent the World Similarly?" IEEE Xplore (2024).
Peng et al., "DeepMimic: Example-Guided Deep Reinforcement Learning of Physics-Based Character Skills," ACM Trans. Graph., vol. 37, No. 4, Article 143. Publication date: Aug. 2018.
Pirk, Sören, et al. "Online object representations with contrastive learning." arXiv preprint arXiv:1906.04312 (Jun. 10, 2019).
Radford et al., "Improving Language Understanding by Generative Pre-Training," 2018.
Radford et al., "Language Models are Unsupervised Multitask Learners," 2019.
Radford et al., "Learning Transferable Visual Models From Natural Language Supervision," Proceedings of the 38 th International Conference on Machine Learning, PMLR 139, 2021.
Raffel et al., "Exploring the Limits of Transfer Learning with a Unified Text-to-Text Transformer," Journal of Machine Learning Research 21 (2020) 1-67.
Ramachandruni et al., "Attentive Task-Net: Self Supervised Task-Attention Network for Imitation Learning using Video Demonstration," 2020 IEEE International Conference on Robotics and Automation (ICRA) May 31—Paris, France. (Aug. 31, 2020).
Rombach et al., "High-Resolution Image Synthesis with Latent Diffusion Models," IEEE Xplore (2022).
Sanh et al., "DistilBERT, a distilled version of BERT: smaller, faster, cheaper and lighter," arXiv:1910.01108v4 (Mar. 1, 2020).
Available online at https://www.youtube.com/watch?v=q8ldbodRG14, at least as early as May 22, 2019.
Available online at https://youtu.be/GtPs_ygfaEA?si=7lv6MEFvFoaacKfa, at least as early as Aug. 15, 2023.
Available online at https://www.youtube.com/watch?v=FuNFr7V7KFQ, at least as early as Aug. 19, 2024.

(56) References Cited

OTHER PUBLICATIONS

Available online at https://www.youtube.com/watch?v=GzX1qOIO1bE, at least as early as May 13, 2024.
Available online at https://youtu.be/_MBd_XfXy9M?si=PbEHUJpRUFqaxS3J, at least as early as Jun. 26, 2023.
Available online at https://youtu.be/SHPxcRBIXN0?si=VbJqbK7jzUqtZGmn, at least as early as Sep. 26, 2023.
Available online at https://youtu.be/BvFxD-8AhJA?si=Vx1F4a76tbQDUX48, at least as early as Nov. 16, 2023.
Available online at https://www.youtube.com/watch?v=jWTWWuzB6Cg, at least as early as Aug. 27, 2024.
Available online at https://www.youtube.com/watch?v=B-ebMigAHzQ, at least as early as Sep. 30, 2024.
Available online at https://youtu.be/XiQkeWOFwmk?si=1qOPC8gXgmmGvXRT, at least as early as May 16, 2023.
Available online at https://youtu.be/cpraXaw7dyc?si=JvPaT6eMA18psrmU, at least as early as Dec. 13, 2023.
Available online at https://youtu.be/BNSZ8Fwcd20?si=_YnVgjYblVuhASk1, at least as early as Oct. 27, 2023.
Available online at https://youtu.be/SS3Ga2HQQ0s?si=Dwr3sJuCsOeUoSLj, at least as early as Nov. 20, 2023.
Available online at https://youtu.be/sihlDeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.
Available online at https://www.youtube.com/watch?v=oXBYZxa25vc&t=1s, at least as early as Apr. 3, 2013.
Available online at https://www.youtube.com/watch?v=LBem19AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml&t=222s, at least as early as May 22, 2012.
Available online at https://www.youtube.com/watch?v=Bmglbk_Op64&t=1s, at least as early as Nov. 10, 2011.
Available online at https://www.youtube.com/watch?v=20GHG-R9eFI, at least as early as Mar. 6, 2023.
Available online at https://www.youtube.com/watch?v=bUrLuUxv9gE, at least as early as Aug. 30, 2024.
Available online at https://www.youtube.com/watch?v=-9EM5_VFIt8, at least as early as Apr. 16, 2024.
Available online at https://www.youtube.com/watch?v=29ECwExc-_M&t=2s, at least as early as Apr. 17, 2024.
Available online at https://www.youtube.com/watch?v=67CUudkjEG4, at least as early as Oct. 26, 2009.
Available online at https://www.youtube.com/watch?v=yBmatGQ0giY&t=1s, at least as early as Aug. 11, 2022.
Available online at https://www.youtube.com/watch?v=bdVrWxjK2vo, at least as early as Sep. 17, 2024.
Available online at https://www.youtube.com/watch?v=B_12k7MZEKg, at least as early as Jun. 30, 2024.
Available online at https://www.youtube.com/watch?v=CbA9wA9etGA, at least as early as Sep. 19, 2024.
Available online at https://www.youtube.com/watch?v=zLhA-RWBBYU, at least as early as Jul. 5, 2024.
Available online at https://www.youtube.com/watch?v=_mQJw8VhZ7w&t=111s, as least as early as Oct. 5, 2022.
Available online at https://www.youtube.com/watch?v=1fC7b2LjVW4, at least as early as Jul. 12, 2016.
Available online at https://www.youtube.com/watch?v=UPOLcE1vwA0, at least as early as Apr. 28, 2016.
Available online at https://www.youtube.com/watch?v=MCbGeC-kuBM, at least as early as Aug. 5, 2024.
Available online at https://www.youtube.com/watch?v=ujdK3yd2gHY, at least as early as Jul. 2, 2024.
Available online at https://www.youtube.com/watch?v=-HizP4UQvug, at least as early as Apr. 25, 2024.
Available online at https://www.youtube.com/watch?v=ioOkbUQqmZ0, at least as early as Nov. 9, 2022.
Available online at https://www.youtube.com/watch?v=q8ldbodRG14, at least as early as Feb. 26, 2024.
Available online at https://www.youtube.com/watch?v=CUhuhleQNos, at least as early as May 22, 2019.
Available online at https://www.youtube.com/watch?v=dY57qnD_O7U, at least as early as Jul. 27, 2021.
Pateromichelakis et al., Head-eyes system and gaze analysis of the humanoid robot Romeo, 2014, IEEE, p. 1374-1379 (Year: 2014).
Jeung et al., Realization of human neck motion with novel robotic mechanism, 2016, IEEE, p. 482-486 (Year: 2016).
Barker et al., Natural head movement for HRI with a muscular-skeletal head and neck robot, 2017, IEEE, p. 587-592 (Year: 2017).
Gao et al., Development of a low motion-noise humanoid neck: Statics analysis and experimental validation, 2010, IEEE, p. 1203-1208 (Year: 2010).
Keselman et al., “Intel RealSense stereoscopic depth cameras,” in Proceedings of the IEEE Conference on Computer Vision and Pattern Recognition Workshops, pp. 1-10, 2017.
Nakada et al., Deep Learning of Neuromuscular and Visuomotor Control of a Biomimetic Simulated Humanoid, 2020, IEEE, p. 3952-3959 (Year: 2020).
Lim et al., Basic emotional walking using a biped humanoid robot, 1999, IEEE, p. 954-959 (Year: 1999).
Albers et al., Upper Body of a new Humanoid Robot—the Design of Armar III, 2006, IEEE, p. 308-309 (Year: 2006).
Mike Oitzman, (date posted Aug. 6, 2024), Figure 02 humanoid robot is ready to get to work, therobotreport.com, URL: (https://www.therobotreport.com/figure-02-humanoid-robot-is-ready-to-get-to-work/), (Year: 2024).
Park et al., Mechanical Design of Humanoid Robot Platform KHR-3 (KAIST Humanoid Robot 3: HUBO), 2005, IEEE, pgl., 321-3226 (2005).
ttps/startu-wey.com/Figure-announces-70m-Seres-A-to-suppor-commercialzaton-of-Figure-01-humanoid-robot/531/2023( Year: 2023).
https://supercarblondie.com/unitree-humanoid-robot-word-speed-record/(Year 2024).
https://robotsguide.com/robots/hrp4 (Year: 2010).
https://www.economist.com/science-and-technology/2024/06/05/he-uesto-buld-obots-that-look-and-behavelike-humans(Year 2024).
https://lifearchitect.ai/humanoids/ (Year: 2023).
https://robotsguide.com/robots/optimus (Year: 2022).
Englsberger et al., “Overview of the Torque-Controlled Humanoid Robot TORO,” 2014 14th IEEE-RAS International Conference on Humanoid Robots (Humanoids), Nov. 18-20, 2014. Madrid, Spain.
Hebi Robotics, “T-Series Actuator,” Jan. 29, 2024.
Cheng et al., “Human Posture Estimation Using Voxel Data for “Smart” Airbag Systems: Issues and Framework,” IEEE, p. 84-89 (2004).
Droeschel et al., “Learning to Interpret Pointing Gestures with a Time-of-Flight Camera,” IEEE, p. 481-488 (2011).
Frohlich et al., “Design and Impementation of a Spherical Joint for Mobile Manipulators,” IEEE, p. 251-258 (2016).
Netzev et al., “Many Faced Robot—Design and Manufacturing of a parametric, Modular and Open Source Robot Head,” IEEE, p. 342-348 (2019).
Netzev et al., Design and implementation of a spherical joint for mobile manipulators, 2019, IEEE, p. 342-348 (Year: 2019).
Haddadin et al., The “DLR crash report”: Towards a standard crash-testing protocol for robot safety—Part II: Discussions, 2009, IEEE, p. 280-287 (Year: 2009).
Yaghoubi et al., Region-Based CNNs for Pedestrian Gender Recognition in Visual Surveillance Environments, 2019, IEEE, p. 1-5 (Year: 2019).
Pateromichelakis et al., Head-eyes system and gaze analysis of the humanoid robot Romeo, 2014, IEEE, p. 1374-131379 (Year: 2014).
Mokhtari et al., Taban:A Retro-Projected Social Robotic-Head for Human-Robot Interaction, 2019, IEEE, p. 46-51 (Year: 2019).
Merged original document with English translation (CN 112959343); Paragraphs added for citation purposes. (Year: 2021).
Merged original document (KR 20180107353) with English Translation (Year: 2018).
Available online at https://x.com/elonmusk/status/1752516361799258318, at least as early as Jan. 30, 2024.

(56) References Cited

OTHER PUBLICATIONS

Duran-Hernandez et al., "Control Implementation in a Low-cost Designed Biped Robot to Reproduce Squats," The 10th International Conference on Control, Mechatronics and Automation, Nov. 9, 2022.
Hao et al., Design and kinematics analysis of a 4-DOF articulated steering mechanism, 2015, IEEE, p. 5875-5880 (Year: 2015).
Or, Computer Simulations of a Humanoid Robot Capable of Walking Like Fashion Models, 2012, IEEE, p. 241-248 (Year: 2012).
Available online at https://www.youtube.com/watch?v=Fb_R6IDDU4A, at least as early as Oct. 9, 2020.
Available online at https://www.youtube.com/watch?v=_mQJw8VhZ7w, at least as early as Oct. 5, 2022.
Available online at https://www.youtube.com/watch?v=a-R4H8-8074, at least as early as Jun. 6, 2015.
Ophaswongse et al., Optimal Design of a Novel 3-DOF Orientational Parallel Mechanism for Pelvic Assistance on a Wheelchair: An Approach Based on Kinematic Geometry and Screw Theory, 2020, IEEE, p. 3315-3322 (Year: 2020).
Shafti et al., Real-time Robot-assisted Ergonomics, 2019, IEEE, p. 1975-1981 (Year: 2019).
Luo et al., Human body trajectory generation using point cloud data for robotics massage applications, 2014, IEEE, p. 5612-5617 (Year: 2014).
Cheng et al., Human posture estimation using voxel data for "smart" airbag systems: issues and framework, 2004, IEEE, p. 84-89 (Year: 2004).
Or, Humanoids Grow a Spine: The Effect of Lateral Spinal Motion on the Mechanical Energy Efficiency, 2012, IEEE, p. 1-11 (Year : 2012).
Souissi et al., Influence of the number of humanoid vertebral column pitch joints in flexion movements, 2011, IEEE, p. 227-282 ( Year: 2011).
Han et al., Mechanical design of robot lower body based on four-bar linkage structure for energy efficient bipedal walking, 2016, IEEE, p. 402-407 (Year: 2016).
Park et al., Design of a lower limb exoskeleton including roll actuation to assist walking and standing up, 2015, IEEE, p. 359-354 ( Year: 2015).
Tsagarakis et al., Lower body realization of the baby humanoid 'iCub', 2007, IEEE, p. 3616-3622 (Year: 2007).
Machine translation of CN-114147745-A (Year: 2022).
Machine translation of DE-112018003604-T5 (Year: 2020).
Machine translation of WO-2020190594-A1. (Year: 2020).
"A lightweight robotic leg prosthesis replicating the biomechanics of the knee, ankle, and toe joint", published Nov. 23, 2022 retrieved from Wayback machine URLhttps://www.science.org/doi/10.1126/scirobotics.abo3996 on Feb. 22, 2026 (Year: 2022).
https://web.archive.org/web/20220702203427/https://singularityhub.com/2010/01/20/ iwalk-presents-worlds-first-actively-powered-foot-and-ankle/ (Year: 2010).
https://www.hola.com/us/celebrities/20221003337667/elon-musk-unveils-robot/ Oct. 3, 2022 (Year: 2022).
https://robotsguide.com/robots/figure (Year: 2023).
https://startup-weekly.com/Figure-announces-70m-Seres-A-to-support-commercialization-of-Figure-01-humanoid-obot5/312/2023 ( Year: 2023).
https://www.cnn.com/2022/09/30/business/tesla-bot-robot 10.1.2022 (Year: 2022).
https://electrek.co/2023/05/16/tesla-bot-sideshow-new-footage-robots/ 5/16/2023 (Year: 2023).
https://www.humanoidsdaily.com/news/figure-reveals-fgure-03-in-new-teaser-full-unveling-set-for-october-10 (Oct. 7, 2025) (Year: 2025).
htp://www.analyticsinsight.net/artificial-inteligence/xiaomis-cyberone-a-new-humanoid-obot-to-fight-teslabot(Sep. 8, 2022) (Year: 2022).
Asano et al., Achievement of twist squat by musculoskeletal humanoid with screw-home mechanism, 2013, IEEE, p. 4649-4654 ( Year: 2013).
Haywood et al., A novel 3D printed leg design for a biped robot, 2017, IEEE, p. 1-6 (Year: 2006).
Kawamura et al., One-leg Jumping with Virtual Spring Principle, 2008, IEEE, p. 34-39 (Year: 2008).
Lohmeier et al., Modular joint design for performance enhanced humanoid robot LOLA, 2006, IEEE, p. 88-93 (Year: 2006).
Mike, (date published Dec. 18, 2023), Tesla Optimus Gen 2 Humanoid Robot, Mikeshouts.com, URL: (https://mikeshouts.com/tesla-optimus-gen-2-humanoid-robot/, (Year: 2023).
Park et al., Whole-body walking pattern using pelvis-rotation for long stride and arm swing for yaw angular momentum compensation, 2021, IEEE, p. 47-52 (Year: 2021).
Tsagarakis et al., Lower Body Design of the 'iCub' a Human-baby like Crawling Robot, 2006, IEEE., p. 450-455 (Year: 2006).
Tsagarakis et al., The design of the lower body of the compliant humanoid robot "cCub", 2011, IEEE, p. 2035-2040 (Year: 2011).

* cited by examiner

END EFFECTOR OF A HUMANOID ROBOT

CROSS-REFERENCE TO RELATED APPLICATIONS

This application claims the benefit of and priority to U.S. Provisional Patent Application Nos. 63/701,625, 63/828,916, 63/705,715, 63/757,440, 63/706,768, each of which is expressly incorporated by reference herein in its entirety.

TECHNICAL FIELD

This disclosure relates to an end effector for a robot, specifically an end effector that includes a tactile sensor assembly.

BACKGROUND

Humanoid robots are increasingly being developed to perform a wide range of general-purpose tasks traditionally executed by humans. An important component for these robots is the end effector, which functions like a human hand to interact with and manipulate objects. The effectiveness of a humanoid robot in performing complex and delicate operations is highly dependent on the dexterity and sensory capabilities of its end effector. However, a significant challenge in the field is the lack of sophisticated tactile feedback in robotic end effectors. This deficiency limits a robot's capacity to perform refined movements such as carefully grasping, pinching, or lifting various objects. Without the ability to sense and interpret contact forces with high resolution, a robot may struggle to apply the appropriate amount of pressure, potentially damaging the object or failing to secure a stable grip. This limitation may hinder the robot's ability to operate effectively in unstructured environments where interaction with a diverse array of objects is required. Therefore, there is a need for advanced tactile sensing systems within a humanoid robot's end effector to provide detailed feedback about contact forces.

SUMMARY

The presently disclosed subject matter is directed to a humanoid robot comprising a torso, a head coupled to the torso, an articulated arm coupled to torso, and an end effector coupled to the articulated arm and comprising a tactile sensor assembly. The tactile sensor assembly includes a bridge comprising a base section and three flexure arms, wherein each flexure arm includes a sloped section extending away from the base section at a first non-zero angle to the base section and a load section extending away from the sloped section at a second non-zero angle from the sloped section. For each flexure arm of the three flexure arms, a first separate strain gauge is coupled to the sloped section of each of the three flexure arms. The tactile sensor assembly includes an electronics assembly communicatively coupled to each separate strain gauge of each flexure arm and configured to process data received from each strain gauge.

The presently disclosed subject matter is directed to a humanoid robot comprising a torso, a head coupled to the torso, an articulated arm coupled to torso, and an end effector coupled to the articulated arm and comprising a tactile sensor assembly including a first strain gauge, and an electronics assembly communicatively coupled to the strain gauge and configured to receive signals from the strain gauge as input, process the received signals, and output processed data based on the received signals, and an energy attenuation member comprising an interior region having a first compression/deflection ratio, and an exterior region at least partially surrounding the interior region and having a second compression/deflection ratio that is less than the first compression/deflection ratio. The energy attenuation member is configured to receive an external force and transfer at least a portion of the received external force to the tactile sensor assembly.

The presently disclosed subject matter is directed to a tactile sensor assembly for a humanoid robot end effector, comprising a bridge having a base and a plurality of flexure arms extending from the base at locations spaced apart from one another, wherein each flexure arm has a sloped section extending at a first non-zero angle relative to the base and a load section extending from the sloped section, a plurality of strain gauges, wherein one strain gauge is coupled to the sloped section of each flexure arm, and an electronics assembly communicatively coupled to the strain gauges and configured to process signals received from the strain gauges to determine force information.

The presently disclosed subject matter is directed to a distal assembly for a finger of a humanoid robot end effector, comprising a distal housing assembly including a base member, a tactile sensor assembly positioned within the distal housing assembly and including a bridge with flexure arms and strain gauges coupled to the flexure arms, a force distributor member positioned over the bridge and configured to distribute force to the flexure arms, and a finger energy attenuation member coupled to the force distributor member and defining an outer surface with ridges and grooves configured to contact objects.

The presently disclosed subject matter is directed to a method of detecting tactile feedback in a humanoid robot end effector, comprising receiving an external force at a finger energy attenuation member of a distal assembly, transferring the external force through a force distributor member to a plurality of flexure arms of a bridge, measuring strain in each flexure arm using strain gauges coupled to sloped sections of the flexure arms, and processing signals from the strain gauges to determine force magnitude and direction information for controlling finger assembly actuation.

The presently disclosed subject matter is directed to a tactile sensing system for a robotic finger, comprising a bridge structure having a base section and at least three flexure arms extending upward and away from the base section, wherein each flexure arm includes a sloped section at a first angle and a load section at a second angle from the sloped section, strain measurement devices coupled to the sloped sections of the flexure arms, a force distribution component positioned to engage contact surfaces of the load sections, and processing circuitry configured to determine triaxial force information from strain measurements.

The presently disclosed subject matter is directed to a distal assembly for a finger of a robotic end effector, the assembly comprising a distal housing assembly comprising a base member, a sensor assembly supported by the base member, a rigid force distributor member positioned over the sensor assembly and configured to transfer a force to the sensor assembly, and a compliant finger energy attenuation member coupled to and positioned over the force distributor member, wherein a gap exists between the force distributor member and the base member, the gap being configured to close when a predetermined force is applied, causing the base member to act as a hard stop to limit movement of the force distributor member and prevent overloading the sensor assembly.

The presently disclosed subject matter is directed to a finger energy attenuation member for a robotic fingertip, comprising an interior region composed of a first material having a first shore durometer, and an exterior region at least partially surrounding the interior region, the exterior region being composed of a second material having a second shore durometer that is less than the first shore durometer of the interior region, wherein the exterior region defines an outer surface shaped to mimic a human fingertip.

The presently disclosed subject matter is directed to a tactile sensor assembly for a robotic end effector, comprising a finger energy attenuation member having an interior region formed from a first material having a first shore durometer and an exterior region at least partially surrounding the interior region formed from a second material having a second shore durometer different from the first shore durometer, wherein the exterior region defines a curvilinear outer surface configured to receive an external force, a sensor assembly positioned beneath the finger energy attenuation member and configured to detect forces transmitted through the finger energy attenuation member, and a distal housing assembly supporting the sensor assembly and coupled to the finger energy attenuation member.

The presently disclosed subject matter is directed to a tactile sensor assembly for a robotic finger, comprising a bridge having a base section and at least three flexure arms extending from the base section, wherein each flexure arm comprises a sloped section extending from the base section at a first non-zero angle relative to a dominant plane of the base section, and a load section extending from the sloped section at a second non-zero angle relative to a dominant plane of the sloped section, a plurality of strain gauges, wherein at least one strain gauge is coupled to the sloped section of each flexure arm, and an electronics assembly communicatively coupled to the plurality of strain gauges and configured to process signals from the strain gauges to determine force characteristics.

The presently disclosed subject matter is directed to a tactile sensor assembly for a robotic digit, comprising a housing assembly having a base member, a bridge coupled to the base member and having a plurality of deformable flexure arms, a plurality of strain gauges coupled to the flexure arms, a force distributor member positioned over the bridge and configured to engage contact surfaces of the flexure arms, and wherein the housing assembly defines at least one physical stop surface spaced from the force distributor member by a predetermined gap when no external force is applied, the gap configured to close upon application of a threshold force to limit deflection of the flexure arms and prevent overloading of the strain gauges.

In some embodiments, a robotic tactile sensor assembly comprises a bridge with a base section and a plurality of flexure arms, typically three, spaced approximately 120 degrees apart around a centroid of the base. Each flexure arm includes a sloped section extending upward and outward from the base at a first non-zero angle, for instance between 1 and 60 degrees, and a load section extending from the sloped section, with the load sections being substantially coplanar and parallel to the base when no force is applied. Strain gauges, such as T-Rosette strain gauges, are coupled to the outer surfaces of the sloped sections of the flexure arms to detect deformation. In some embodiments, additional strain gauges, such as shear-strain gauges, are coupled to the inner surfaces opposite the outer surfaces, where strain gauges on the outer surfaces measure tensile forces and strain gauges on the inner surfaces measure compressive forces. The strain gauges may be screen printed onto the sloped sections.

In some embodiments, the assembly includes a rigid force distributor member positioned over the bridge to receive an external force and transfer it to the load sections of the flexure arms. This force distributor member, fabricated from materials such as metal, plastic, or carbon fiber composite, may comprise a distributor base, an extension flange, and location tabs configured to engage the contact surfaces of the flexure arm load sections. The force distributor member is configured to move toward the base member until contact with a physical stop surface prevents further movement beyond a predetermined deflection limit. To prevent overloading and deformation of the strain gauges beyond their elastic limit, physical hard stops or a predetermined gap between the force distributor member and a base member limit the deflection of the flexure arms. The housing assembly may comprise first and second gap tolerances at different locations relative to the force distributor member.

In some embodiments, an electronics assembly, which may include a printed circuit board positioned at least partially between the flexure arms, is communicatively coupled to the strain gauges. This assembly is configured to process differential signals from the strain gauges to calculate the magnitude and direction of both normal and shear forces. The sensor bridge and electronics assembly may be configured for hot-swapping, secured to a base member with a single fastener. The tactile sensor assembly forms part of a distal assembly of an end effector on a general-purpose humanoid robot, with the sensor assembly configured to measure or forces or loads experienced by and/or applied to finger assemblies.

In some embodiments, a finger energy attenuation member is coupled to the force distributor member. This attenuation member is typically formed from elastic materials such as silicone rubber, thermoplastic elastomers, or polyurethane elastomers, and is configured to mimic a human fingertip. It comprises an interior region with a first shore durometer and a first compression/deflection ratio, providing a firmer base, and a more compliant exterior region with a second, lower shore durometer and a second compression/deflection ratio that at least partially surrounds the interior region. The interior region has a curvilinear outer boundary interfacing with the exterior region. An intermediate region with a third shore durometer and third compression/deflection ratio between those of the interior and exterior regions may also be included. The different regions vary in material properties including Young's modulus, compression set, indentation force deflection, tensile strength, damping capacity, density, and Poisson's ratio. The outer curvilinear surface of the attenuation member features a pattern of ridges and grooves covering at least a majority of the surface, similar to human fingerprint patterns, which is configured to generate vibrational feedback that is transferred to the strain gauges for texture detection when contacting surfaces.

BRIEF DESCRIPTION OF THE DRAWINGS

The drawing figures depict one or more implementations in accordance with the present teachings, by way of example only, not by way of limitation. These figures are intended to illustrate and not to restrict the scope of the disclosure. In the figures, like reference numerals refer to the same or similar elements. This convention is maintained throughout the drawings for consistency.

FIG. 4 is a block diagram of sensors for the humanoid robot of FIGS. 1-3B;

FIG. 5 is a block diagram of a communication interface for the humanoid robot of FIGS. 1-3B;

DETAILED DESCRIPTION

Figure 1:
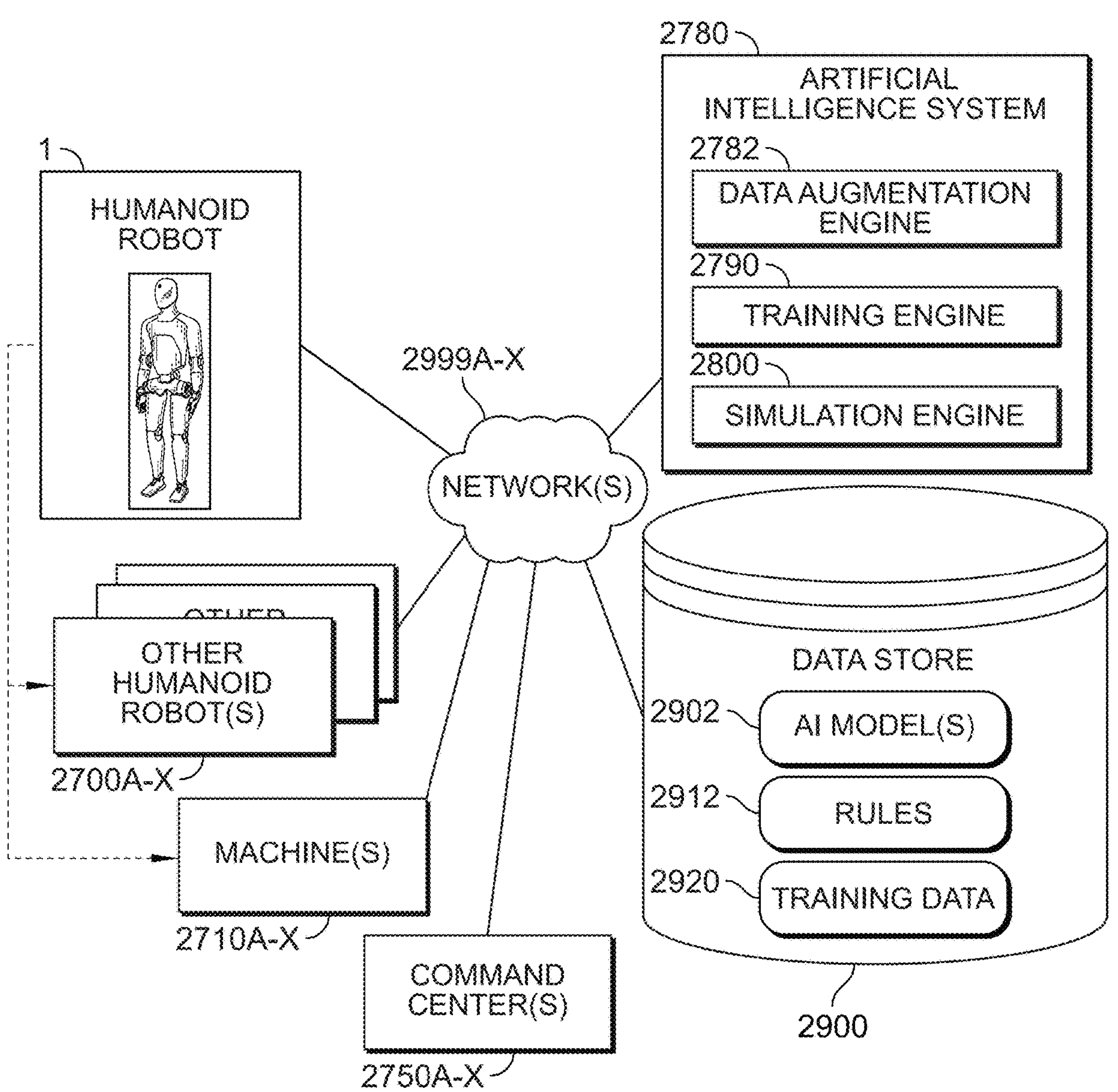
FIG. 1 is a diagram illustrating an environment and a network in which one or more humanoid robots may operate, connect, command and/or be commanded by, control and/or be controlled by, and/or interact.

In the following detailed description, numerous specific details are set forth by way of examples in order to provide a thorough understanding of the relevant teachings. These examples are illustrative and not exhaustive. It should be apparent to those skilled in the art that the scope of the teachings is not limited to these specific details. Additionally or alternatively, well-known methods, procedures, components, and/or circuitry have been described at a relatively high-level, without detail, in order to avoid unnecessarily obscuring aspects of the present disclosure.

While this disclosure includes several embodiments, there is shown in the drawings and will herein be described in detail certain embodiments with the understanding that the present disclosure is to be considered as an exemplification of the principles of the disclosed methods and systems and is not intended to limit the broad aspects of the disclosed concepts to the embodiments illustrated. As will be realized, the disclosed methods and systems are capable of other and different configurations, and one or more details are capable of being modified, all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A. Introduction

The mechanical end effector disclosed in this Application is designed to be a component within a robot system, for example, a versatile and highly-functional humanoid robot. Enabling such a robot system to execute general human tasks poses a challenge due to the vast array of potential positions, locations, and states said robots could occupy at any given time in a challenging environment. Additionally, a lack of tactile feedback may further limit the robot's ability to execute more refined human end effector movements, such as grasping, pinching, or lifting objects. Therefore, the robot disclosed herein includes tactile sensing capabilities that detect information about the position of the end effector and the contact with an object to enhance the end effector's dexterity.

The end effector includes (a) an end effector housing, (b) a thumb assembly, (c) at least one, preferably four, finger assemblies, and (d) an electronics package that is configured to control said thumb assembly and said finger assemblies. Additionally, the end effector also includes a tactile sensor assembly with a three-flexure-arm bridge. each flexure arm contained in the three-flexure-arm bridge includes a sloped section extending from a base at a first non-zero angle and a load section extending from the sloped section at a second non-zero angle. This two-angle geometry departs from conventional tactile sensing approaches that rely on cantilever beams, four-corner force-sensing resistor arrays, or matrix-based capacitive sensors. Further, the strategic placement of strain gauges on the sloped sections—optionally in paired, opposite-side gauges (e.g., tension/compression or T-rosette plus shear)—allows the arm itself to mechanically resolve applied forces into separable tension and compression components. By processing the differential signals across the three arms, the electronics compute the magnitude and direction of both normal and shear forces, achieving true triaxial force detection from a single compact structure. Locating the gauges off the exposed horizontal load faces can also provide inherent mechanical filtering and impact shielding, improving durability and signal-to-noise without additional damping hardware.

The invention is further distinguished over conventional sensors by the inclusion of the energy attenuation member and an overload protection system. The energy attenuation member can be non-uniform in composition—featuring a firmer interior region and a more compliant exterior region—to maintain high sensitivity to light touch while preventing sensor saturation at higher loads. Its exterior surface can further include engineered ridges and grooves that act as a frequency-shaping interface: contact-induced micro-slips generate vibrations that propagate through the stack to the sloped-section gauges, enabling texture detection. Concurrently, a rigid force-distributor engages the load sections and is designed to "bottom out" against a physical hard stop, thereby providing overload protection. Further, other improvements disclosed herein allow the disclosed sensor assemblies to overcome long-standing trade-offs between sensitivity, durability, manufacturability, reliability, and system complexity.

B. Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Although selected human medical terminology is used to describe features and/or relative positions related to the humanoid robot, it should be understood that said medical terminology may not directly correspond to the exact same features of a human. It should be understood that names of various assemblies and components (e.g., including housings and assemblies contained within) may generally relate to a location of similar anatomy of a human body and may not have an exact correlation in dimension, function, or shape. The reference system including three orthogonal reference planes is defined with respect to the robot in a neutral standing position to describe relative positions of components of the robot. Although standard human medical terminology is used to describe the anatomical reference planes (i.e., sagittal, coronal, transverse) of the robot, the planes may be shifted from the typical location on a human to be meaningful for the kinematic layout and features of the robot.

Humanoid Robot: a robot that is capable of bipedal locomotion and includes components (e.g., head, torso, etc.) that generally resemble parts of a human. However, the robot does not need to include every part of a human (e.g., end effectors with over ten degrees of freedom), nor do its components need to have a shape that exactly or substantially resembles human parts. Furthermore, it should be understood that a humanoid robot is not designed to be primarily quadruped or have a wheeled base.

Neutral State: a state where the robot is standing upright on a horizontal support surface (PG) and facing a forward direction with its torso substantially vertically aligned over its pelvis and legs, where the legs are substantially straight with the knees substantially aligned under the hips and substantially above the ankles, such that the robot's weight is balanced over its feet. In the neutral state, the robot's head is facing forward (i.e., in the forward direction), the arms are located at the sides of the robot, the end effectors are oriented with the palms facing substantially inward, and the fingers pointing in a substantially downward direction toward the horizontal support surface. An illustrative example of the neutral state for the humanoid robot 1 is shown FIG. 3A.

Figure 3A:
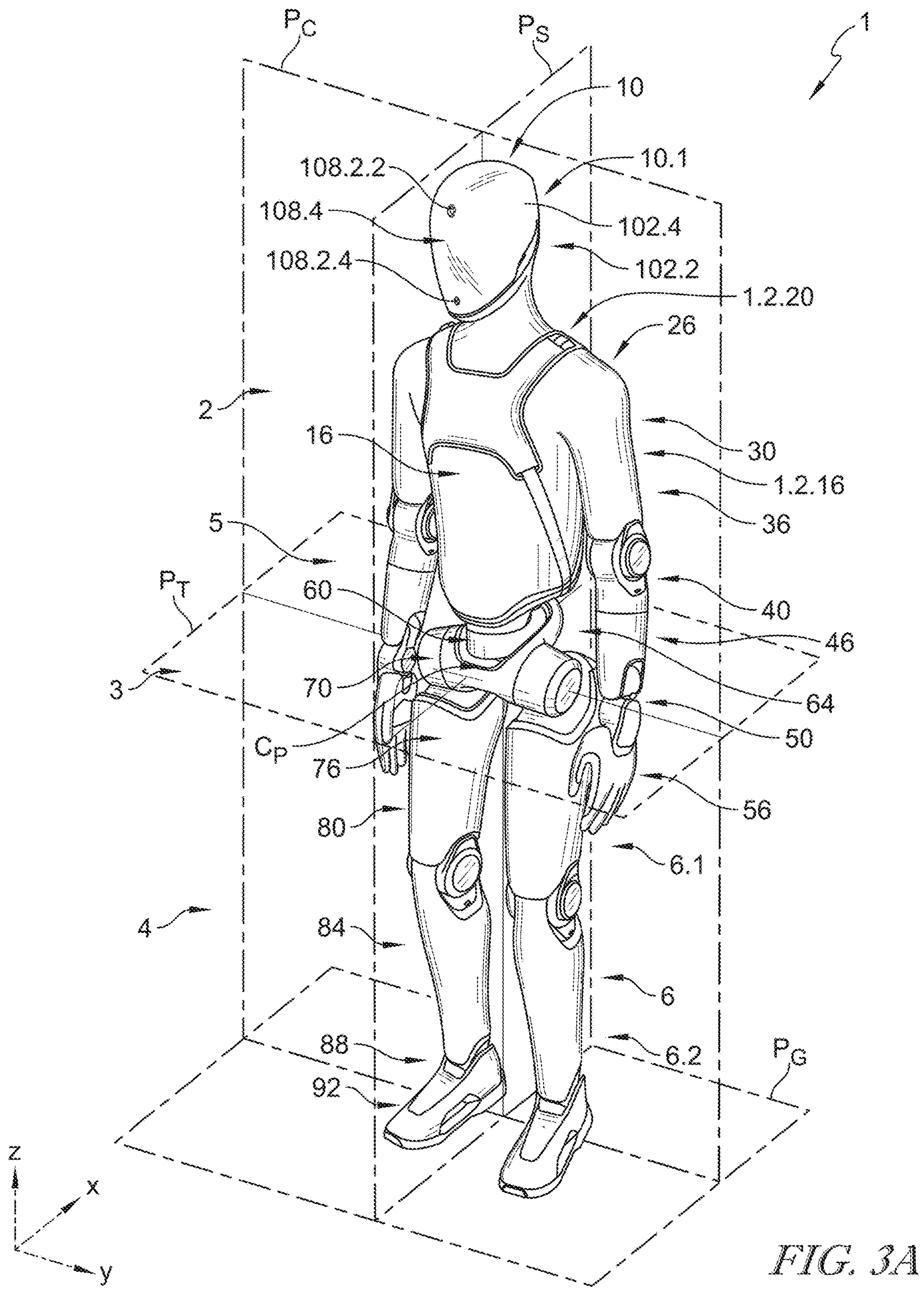
FIG. 3A is a perspective view of a humanoid robot of FIGS. 1-2.
Figure 3B:
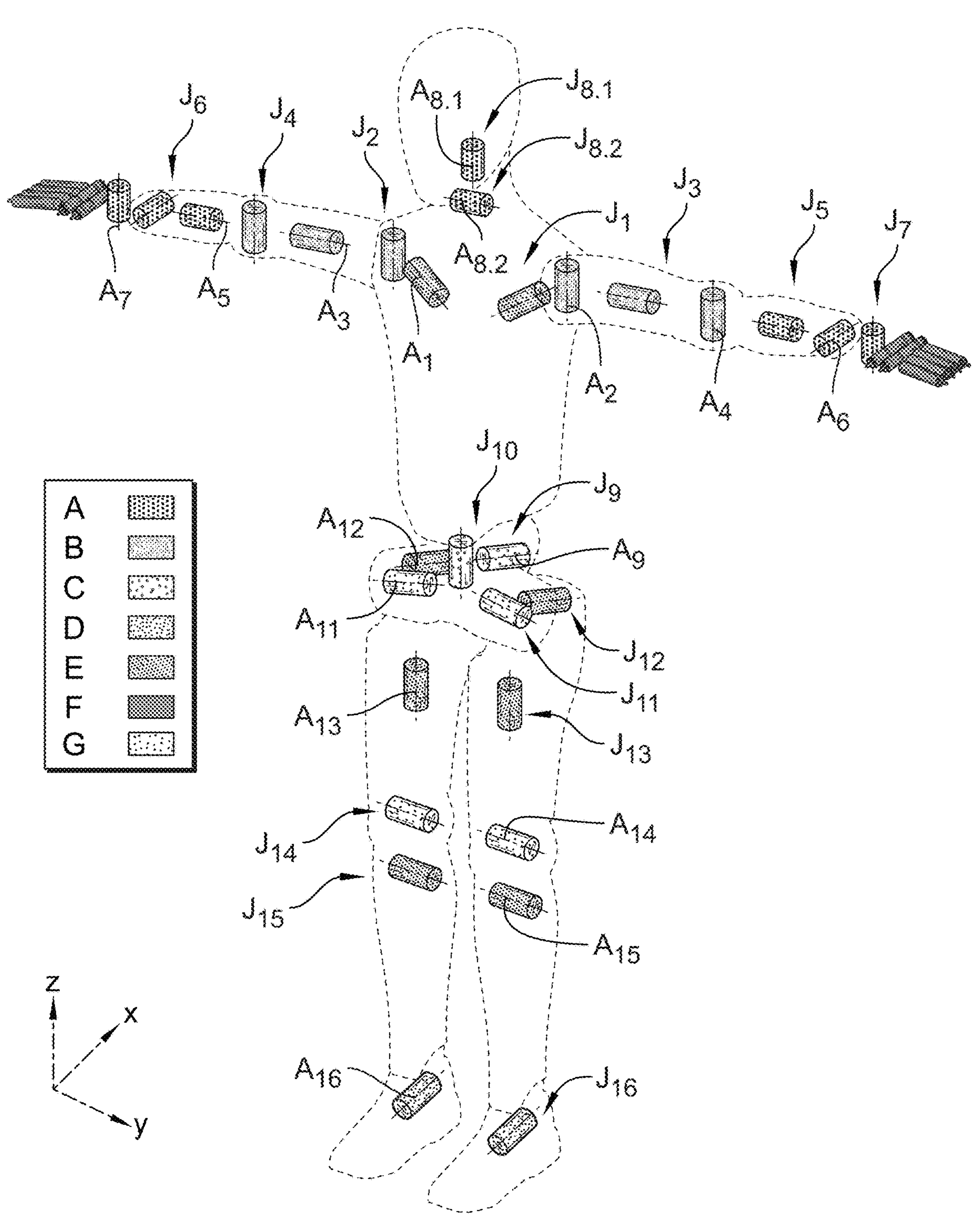
FIG. 3B is a diagram illustrating actuators contained within the humanoid robot of FIGS. 1-3A and the corresponding rotational axes of said actuators.

Extended State: a state of the robot with the arms extended outward laterally at the shoulder (as illustrated in FIG. 3B) and oriented with the palms of the end effectors substantially facing downward and the fingers pointing in a substantially outward direction, where the central and lower portions of the robot remain in a neutral state.

Sagittal Plane: a vertical plane when the robot is in the neutral state that aids in defining left and right sides of the robot for all states. Accordingly, the sagittal plane may: (i) divide the robot and/or the torso into left and right portions or halves, (ii) extend through an axis of rotation about which the torso twists or rotates relative to the pelvis and legs, (iii) contain an origin point of the robot, and/or (iv) be positioned between the left and right legs, and/or left and right arms. In an illustrative embodiment, the sagittal plane ($P_S$) (e.g., as illustrated in FIG. 3A) is a vertical plane positioned at a midway point between the left and right legs and the left and right arms and contains a rotational axis $A_{10}$ of a torso twist actuator (J10) (e.g., as illustrated in FIG. 3B) located in the spine 60 of the robot 1 and divides the left and right sides of the robot 1 (e.g., as illustrated in FIG. 3A). In other words, in an illustrative embodiment, the sagittal plane ($P_S$) is a plane that is colinear with the rotational axis $A_{10}$ of the torso twist actuator (J10).

Coronal Plane: a vertical plane when the robot is in the neutral state that aids in defining front and back portions of the robot for all states. Accordingly, the coronal plane may: (i) divide the robot and/or the torso into front and back portions or halves, (ii) contain an axis of rotation about which the torso pitches forward or backward from the neutral state, (iii) contain an axis of rotation of a knee joint about which a lower shin pitches forward and backward, and/or (iv) contains an axis of rotation of an elbow joint about which a lower forearm moves forward and backward, when the robot is in the extended state. In various embodiments, said axis of rotation for torso pitch may be two colinear axes, a single centrally located axis, an axis defined by a line connecting the midpoints of two non-collinear actuator axes that provide the torso pitch function, or an axis defined by a line connecting the center of actuator bearings of two actuators that provide the torso pitch function. In the illustrative embodiment (see, e.g., FIGS. 3A and 3B), the coronal plane ($P_C$) is a vertical plane that contains the rotational axes $A_{11}$ of the hip flex actuators (J11) located in the hips 70 (and likewise may contain an axis defined by a line connecting the midpoints of a left hip flex actuator (J11) axis ($A_{11}$) and a right hip flex actuator (J11) axis ($A_{11}$) and rotational axis $A_{10}$ of torso twist actuator (J10) located in the spine 60 of the robot 1. As shown in these figures, the coronal plane ($P_C$) does not bisect the robot, or torso, into equal front and back halves, as it is offset forward of a majority of the arm actuators in the extended position, and other positional relationships that can be understood from the figures.

Transverse Plane: a horizontal plane that aids in defining the upper and lower portions of the robot. Accordingly, the transverse plane may: (i) divide the robot into upper and lower portions or halves, and/or (ii) contain an axis of rotation about which the torso pitches forward or backward, as discussed above. In the illustrative embodiment, the transverse plane ($P_T$) is a horizontal plane that contains the mid-point of the rotational axes $A_{11}$ of the hip flex actuators (J11) located in the hips 70 of the robot 1.

Origin Point: an orthogonal intersection point of the sagittal plane, coronal plane, and transverse plane, all of which extend through the humanoid robot disclosed herein. In the illustrative embodiment of the robot 1 shown in FIG. 3A, an origin point ($C_P$) is present and shown.

Reference Axes: consist of: (i) the Z-axis (vertical) is defined pursuant to the intersection of the sagittal plane and coronal plane, (ii) the Y-axis (horizontal) is defined pursuant to the intersection of the coronal plane and transverse plane; and (iii) the X-axis (depth) is defined pursuant to the intersection of the sagittal plane and transverse plane. FIG. 3A illustrates example Z, Y, X reference axes where the sagittal, coronal, and transverse planes share a common origin point.

Kinematic Chain: a representation of an assembly of rigid bodies connected by joints to provide constrained motion. Within this application, e.g., FIG. 3B, a kinematic chain is illustrated by cylindrical bodies, where the respective central axis of each individual cylindrical body represents the position and orientation of the axis of rotation for the individual joints. For example, each rotary actuator has a central rotational axis. Other types of actuators may include linkages that provide rotational movement about one or more rotational axes via linkages, bearing or other rotation features, or other means.

Range of Motion: a range of rotational motion of an actuator about an axis of rotation, where a first and second angle define a rotational limit in opposing rotational directions from a neutral position of the actuator with the limits expressed in Radians.

Degrees of Freedom (DoF): the number of parameters that define the configuration of the kinematic chain and possible movements associated therewith.

Singularities: geometric configurations of the robot's joints in which one or more degrees of freedom are effectively lost due to the alignment or overlap of rotational or translational axes, which in some cases is also affected by interference of extents of components where one or more of the components are moved by the joint.

Actuator Bearing: a specific component of the individual actuator that is generally ring-shaped with parallel edge guides, wherein the rotational axis ($A_n$) of the actuator is centered within the actuator bearing and orthogonal to the parallel edge guides. Within this application, the actuator bearings of individual actuators are referenced to further define orientation of the rotational axes and/or relative size of the individual actuator.

Actuator bearing plane ($B_n$): a plane defined mid-width of actuator bearing between parallel edge guides and orthogonal to the rotational axis ($A_n$).

Textile: a flexible (e.g., fabric-like), highly durable cover material that has high elastic stretch capabilities and is resistant to pilling, abrasions, and cuts. A textile includes both common textiles (e.g., traditional woven cloth), engineered textiles, and non-fabric-like materials (e.g., plastics or polymers), and/or a combination of the above.

C. Robot(s) and Environment

FIG. 1 illustrates an exemplary network and/or operational environment in which a humanoid robot (also referred to as a bipedal robot) 1, which is further detailed in additional figures herein, may operate. The environment may include a plurality of interconnected components, such as: (i) the humanoid robot 1, (ii) one or more other humanoid robots 2700A-X which may the same as or different from the robot 1, (iii) one or more machines 2710A-X, (iv) one or more command centers 2750A-X, (v) one or more remote artificial intelligence (AI) system(s) 2780 which are remote from the robot 1, such as a cloud-base AI system, and (vi) one or more data stores 2900. Each component may be interconnected with another component, directly or indirectly, by at least one of: (i) one or more networks 2999A-X, (ii) direct communication systems (not illustrated—e.g., a data store 2900 may have direct communication with a remote AI system 2780) and/or (iii) physical contact with one another (e.g., the humanoid robot 1 may be in direct physical contact when operating a machine 2710A-X). The one or more networks 2999A-X may include, for example, the Internet, a local area network, a wide area network, a private network, a cloud computing network, or a network based on a wireless communication protocol. Additionally, it should be understood that the humanoid robot 1 may be interconnected with one or more other humanoid robots 2700A-X through a wireless communication protocol, such as a Bluetooth connection or a connection based on a near-field communication protocol, or through a wired connection.

The humanoid robot 1 may be collocated with one or more of the other humanoid robots 2700A-X to collectively or separately perform a given task or workflow. Such operations may occur, e.g., at a worksite such as a factory, warehouse, industrial facility, or home. Furthermore, the humanoid robot 1 may also be situated in a separate geographical location relative to other humanoid robots 2700A-X. For example, the humanoid robot 1 may be located in a given worksite, while another humanoid robot 2700A-X is located at another worksite in a different geographical location.

The operational environment may generally include machines 2710A-X, which may be embodied as any device, heavy machinery, or object with which a humanoid robot 1 and/or other humanoid robots 2700A-X may interact. For instance, a machine 2710A-X can include, among other things, tools, packaging machinery, forklifts, drilling machines, pallet movers, HVAC equipment, carts, bins, and platform machines.

The command centers 2750A-X may be comprised of one or more physical computing devices or virtual computing instances executing on a local or cloud network. These centers 2750A-X may be utilized for one or more of monitoring, managing, and configuring tasks, as well as for issuing control directives to the humanoid robot 1 and other humanoid robots 2700A-X at one or more worksites. A command center 2750A-X may be collocated with any of the humanoid robot 1 or the other humanoid robots 2700A-X, or it may be located in a different geographical location from the robots 1 and other humanoid robots 2700A-X. The computing devices of the command centers 2750A-X may execute software that is used to monitor (e.g., charge level, task performance, etc.), manage the robots 1 and other humanoid robots 2700A-X, and/or transmit long-horizon goals, tasks, and control directives to the robots 1 and other humanoid robots 2700A-X over the networks 2999A-X. Additionally and as such, the humanoid robots 1 and other humanoid robots 2700A-X may each be configured to: (i) send data to the command centers 2750A-X, (ii) perform a given task based on the transmitted long-horizon goals, tasks, and control directives, and/or (iii) infer a task based on the transmitted long-horizon goals, tasks, and control directives.

The command centers 2750A-X may determine, based on available humanoid robots 1 and the capabilities of each robot, which of the robots may be best suited for a given task. For example, the command centers 2750A-X may identify a humanoid robot 2700A-X to transfer parts to the other room once they are placed in the jig. The command centers 2750A-X may thereafter relay the assignment to the assigned other humanoid robot 2700A-X, which may be identified based on a unique identifier (e.g., serial number) assigned to each of the humanoid robots 1 and 2700A-X, and also to the other humanoid robots 2700A-X to indicate which other humanoid robot 2700A-X has been assigned the task.

The remote AI system 2780 may be comprised of one or more computing devices that are configured to perform global operations related to AI/ML for the entire computing environment. For example, the remote AI system 2780 may store, retrieve, and otherwise manage data within the data store 2900. This data may include one or more AI models 2902, rules 2912, and training data 2920. The AI models 2902 may be embodied as any type of model that: (i) can be run in an environment that is remote from the humanoid robot 1 and 2700A-X, while being in communication with the humanoid robot 1 to enable the humanoid robots 1 and 2700A-X to perform the functions described herein (e.g., observing, reasoning, and performing tasks), (ii) can be sent to the humanoid robot 1 and 2700A-X, where the humanoid robot 1 and 2700A-X runs the model locally to perform the functions described herein, and/or (iii) can be used in the training of any model described herein. For instance, the AI models 2902 may comprise artificial neural networks, convolutional neural networks, recurrent neural networks, generative adversarial networks, variational autoencoders, diffusion models, transformer models, natural language processing models (e.g., speech-to-text and/or text-to-speech), object detection models, image segmentation models, facial recognition models, transfer learning models, autoregressive models, large language models, visual language models, vision-action models, multi-modal language models, graph neural networks, reinforcement learning models, or any other type of model known in the art or disclosed herein. The rules 2912 may be comprised of sets of rules and conditions that are used to enable: (i) deterministic behavior by the humanoid robot 1 and the other humanoid robots 2700A-X, (ii) training the models that enable the humanoid robots 1 and 2700A-X to perform the functions described herein, and/or any other known rule. For example, the rules 2912 may include any combination of finite state machines, reactive control protocols, safety rules, configuration files, task sequencing protocols, safety protocols, and/or protocols for compliance with standards, safety, morals and/or regulations.

The training data 2920 may be embodied as any type of data that is used to train one or more of the AI models 2902. For example, the training data 2920 may include: (i) image data, such as raw image data, annotated image data, or synthetic data comprising computer-generated images used to augment real image datasets, particularly in instances where usable data is scarce; (ii) video data, such as raw video data, annotated video data, or synthetic data; (iii) text data, such as natural language instructions, dialogue data, machine-readable instructions, or natural language mapping data; (iv) depth data, such as map data or point cloud data; (v) robot joint trajectories; (vi) robot joint locations; (vii) robot joint location data, which may be obtained from teleoperation of a robot; (viii) robot joint rotations data, which may also be obtained from teleoperation of a robot; (ix) other robot sensor data, such as inertial measurement unit (IMU) data, force and torque data, or proximity sensor data; (x) simulation data; (xi) human demonstration data, such as first person or third person images or videos of humans performing a task; (xii) robot demonstration data, such as images or videos of other robots performing a task; (xiii) any combination of the aforementioned data types; and/or (xiv) any other known data type. For clarity, it should be understood that any data type that is described above may be either labeled or unlabeled.

The remote AI system 2780 may include a data augmentation engine 2782, a training engine 2790, and a simulation engine 2800. The data augmentation engine 2782 may be embodied as any combination of hardware, software, or circuitry that is configured to increase the size and diversity of the training data 2920, particularly in instances where the training data is limited. For example, the data augmentation engine 2782 may be configured to perform: (i) image augmentation of visual data such as images and video frames (e.g., identifying anatomical point and/or kinematic chains), (ii) sensor data augmentation to simulate real-world inaccuracies like noise, thereby assisting in training the AI models 2902 to account for such inaccuracies, (iii) trajectory augmentation to modify the speed or timing of movements, which assists the AI models 2902 in learning to recognize and adapt to different behaviors, or to alter the trajectories or paths of the robot 1 in simulations, and (iv) domain randomization, which involves altering parameters including textures, lighting, and object positions.

The illustrative training engine 2790 may be embodied as any combination of hardware, software, or circuitry for training the AI models 2902, given a set of rules 2912 and training data 2920. To do so, the training engine 2790 may apply a variety of AI/ML techniques, such as supervised learning techniques (e.g., classification, regression), unsupervised learning techniques (e.g., clustering, dimensionality reduction, anomaly detection), semi-supervised learning techniques (e.g., training with both labeled and unlabeled data), reinforcement learning techniques (e.g., model-free methods, model-based methods), ensemble learning, active learning, and transfer learning techniques (e.g., by leveraging pre-trained models 2902). It should be understood that each of these techniques may be applied online or offline.

The simulation engine 2800 may be embodied as any combination of hardware, software, or circuitry for executing one or more of the AI models 2902 within a virtualized simulation environment. This allows for the simulation and analysis of various aspects of the humanoid robot 1, such as its kinematics, sensor behavior, overall behavior, anomalies, and the like. For example, the simulation engine 2800 may generate the simulation environment based on real-world mapping data that was previously observed and/or generated by the humanoid robot 1 or other humanoid robots 2700A-X, or that was obtained from third-party services. The simulation engine 2800 may also generate a physics-accurate model of the humanoid robot 1, which has a specified configuration (e.g., a physical structure, joints, sensors, actuators, and other components with predefined parameter sets). The data generated from the simulations may then be used by the training engine 2790 to build, train, alter, fine-tune, or modify a previously generated model, a new model, and/or rules. Advantageously, the simulation engine 2800 is designed to improve efficiencies in the manufacture, testing, and deployment of a given humanoid robot 1 for a specified purpose.

The remote AI system 2780 may account for the substantial computing and resource demands required by AI/ML-based techniques by processing at least a portion of data, requests, and/or training. As such, the humanoid robots 1 may be configured with considerably less powerful compute, network, and storage resources. For instance, the humanoid robot 1 may prioritize certain processes, such as those relating to the performance of a presently assigned task, and offload other processes, such as the refining of local AI/ML models, to the remote AI system 2780. The remote AI system 2780 may also periodically update the humanoid robots 1 and 2700A-X with refined AI models 2902 and training data 2920, or it may receive updates and propagate them to the robots 1, for instance, via over-the-air updates or push subscription-based updates. The remote AI system 2780 may also push updated rules 2912 to the robots 1 and 2700A-X. Additionally, the remote AI system 2780 may receive data from each of the humanoid robots 1 and 2700A-X, which may include behavioral information, learning information, model reinforcement data, and the like. The remote AI system 2780 may store such data as training data 2920 and subsequently use this data to refine the AI models 2902.

Although FIG. 1 depicts the data augmentation engine 2782, the training engine 2790, and the simulation engine 2800 as executing on a single remote AI system 2780, one of skill in the art will recognize that each of these engines may execute on separate systems or computing nodes associated with the remote AI system 2780. Such an arrangement may be advantageous in improving the performance and resource management of each of the engines 2782, 2790, and 2800.

D. Humanoid Robot

Figure 2:
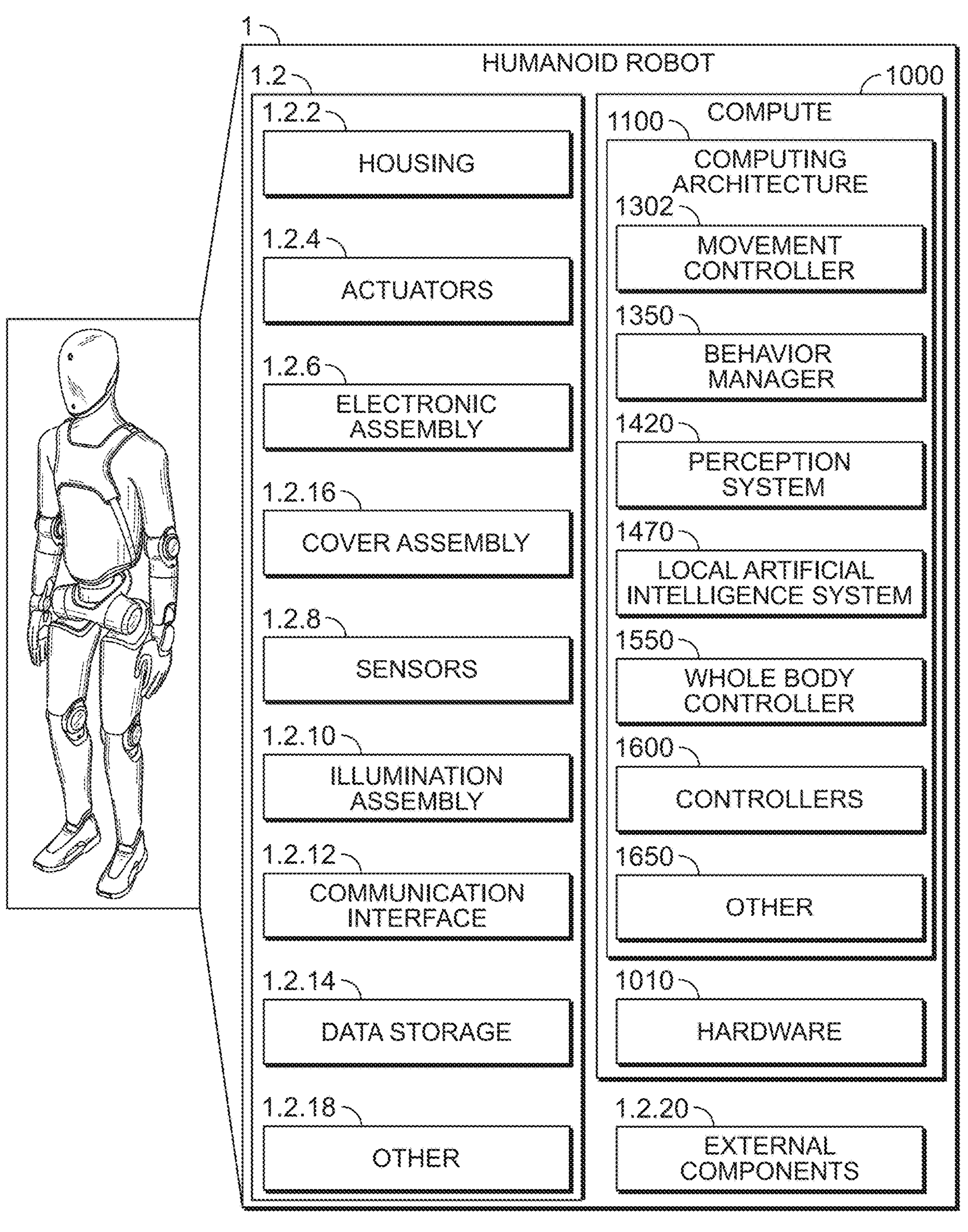
FIG. 2 is a block diagram illustrating components of the humanoid robot of FIG. 1.

FIG. 2 is a block diagram of a humanoid robot 1 that includes a variety of architectures and other components that may include: (i) a mechanical/electrical architecture 1.2 that includes housings 1.2.2, actuators 1.2.4, an electronic assembly 1.2.6, sensors 1.2.8, a communication interface 1.2.12, an illumination assembly 1.2.10, data storage 1.2.14, an exterior covering assembly 1.2.16, external components 1.2.20, and other components 1.2.18, and (ii) a compute module 1000 that includes a computing architecture 1100.

a. Humanoid Robot Configuration

The high-level configuration for the robot 1 includes assemblies that function together to provide the robot with a humanoid shape and enable said robot to perform human-like movements. As such, the structures and kinematic principles that are inherent to non-humanoid systems cannot be simply adopted or implemented into a humanoid robot 1 without undergoing careful analysis and empirical verification against the complex realities of design, testing, and manufacturing. Theoretical designs that attempt such direct modifications are insufficient, and in some instances woefully insufficient, because they amount to mere design exercises that are not tethered to the complex realities of successfully creating a functional, general-purpose humanoid robot.

In addition to the general systems, assemblies, components, and parts described above, the humanoid robot 1 in the illustrative embodiment shown in FIG. 3A may include the following systems, assemblies, components, and parts, which can be broadly categorized into three regions. As shown in FIG. 3A, these three regions include: (i) an upper portion 2, which includes a head and neck assembly 10, a torso 16, left and right arm assemblies 5, and left and right end effectors 56; (ii) a central portion 3, which includes a spine 60, a pelvis 64, and left and right upper leg assemblies 6.1 of left and right leg assemblies 6; and (iii) a lower portion 4, which includes left and right lower leg assemblies 6.2 of leg assemblies 6.

In the illustrative embodiment shown in FIG. 3A, each arm assembly 5 may include a shoulder 26, an upper humerus 30, a lower humerus 36, an upper forearm 40, a lower forearm 46, and a wrist 50. The end effector 56 is coupled to the wrist 50. Each leg assembly 6 may include: (i) an upper leg assembly 6.1, which may comprise a hip 70, an upper thigh 76, and a lower thigh 80, and, (ii) a lower leg assembly 6.2, which may comprise a shin 84, a talus 88, and a foot 92. In other embodiments, some of these systems, assemblies, components, or parts may be omitted, combined, or replaced with alternative designs.

i. Head and Neck Assembly

The head and neck assembly 10 of the humanoid robot 1 may be designed to enhance its anthropomorphic characteristics, while also providing functional capabilities that support interaction, perception, and communication. The head and neck assembly 10 is coupled to a torso 16 and possesses an overall shape that generally resembles the general shape of a human head. The head and neck assembly 10 is, however, specifically designed to lack pronounced human facial structures, such as cheeks, eye protrusions, a mouth, or other moving parts, to maintain a non-humanlike appearance. The exterior surface of the head 10.1 is characterized by an absence of large flat surfaces (e.g., the head 10.1 is not a cube or prism) and the head is also not formed with significant cylindrical features or perfect circles. Instead, almost all exterior surfaces of the head 10.1 are curvilinear or contain substantial curvilinear aspects, which presents a generally egg-shaped appearance when viewed from the front or top.

Structurally, the head 10.1 is symmetrical about the sagittal plane $P_S$ but is asymmetrical about Z-Y and X-Y planes that intersect the head and are parallel to the coronal plane ($P_C$) and the transverse plane ($P_T$), respectively. The width (parallel to the y-axis) and depth (parallel to the x-axis) of the head 10.1 change constantly from top to bottom, reaching a maximum dimension in the temple region, which is located at approximately 30-50% of the head's height from its top end.

The head 10.1 itself may house a range of components, such as high-resolution cameras, microphones, and displays, all of which are contained within an impact-resistant polymer shell 102.2. This shell 102.2 includes a large, freeform (i.e., not conforming to a regular or formal structure or shape) frontal shield 102.4 that covers the frontal and crown regions of the head 10.1. The frontal shield 102.4 is formed as a separate and distinct piece from the displays positioned behind it, thereby protecting the displays and internal electronics from damage. This separation provides a significant advantage during the performance of industrial tasks, as a damaged frontal shield 102.4 is substantially cheaper and easier to replace than a damaged display. The frontal shield 102.4 extends rearward beyond an auricular region into an occipital region and extends down to a chin region, but it does not extend below a jaw line.

Cameras embedded within the head 10.1 may include RGB, depth-sensing, thermal imaging capabilities and/or any other cameras disclosed herein, which are designed to enable the humanoid robot 1 to perform tasks such as object recognition, environmental mapping, and facial expression analysis. For the specific purpose of generating a low-latency Virtual Reality (VR) view, a pair of high-resolution, high-frame-rate RGB cameras with global shutters may be utilized. For example, this pair of cameras may be the vertically arranged cameras 108.2.2 and 108.2.4, or they may be horizontally arranged internal/external cameras. Microphones may be arranged in an array to facilitate directional audio input and noise cancellation, which enhances the ability of the humanoid robot 1 to understand and respond to verbal commands.

Displays integrated into the head 10.1 may serve as user interfaces, providing visual feedback or conveying expressions to improve communication and user engagement. Unlike the heads of conventional robots, the disclosed head 10.1 includes a main display 108.4 that is curved in at least one direction and is positioned at an angle relative to a sagittal plane. This curved design permits the inclusion of a larger display with a greater surface area compared to a flat screen, which increases the amount of information that can be conveyed, such as robot status and sensor data. This information is displayed using generic blocks or shapes rather than anthropomorphic features like eyes or a mouth. In addition to the main display 108.4, two side-facing displays are included to show indicia such as the identification number/serial number, battery life, current task, any safety indicia, and/or any other information associated with the humanoid robot 1.

Further, an extent of the illumination assembly 1.2.10, which comprises a plurality of light emitters, is positioned adjacent to an edge (e.g., lower) of the frontal shield 102.4. These light emitters may be configured to function as indicator lights to communicate the status of the robot 1 to nearby humans—for instance, by emitting light that appears to humans in different colors (e.g., yellow for working, green for idle, red for an error state, or blue for thinking) or illumination sequences—without relying on the main displays. This method of communication may be more power-efficient than displays, and may relay information more rapidly.

Additionally, the head 10.1 may house: (i) other sensors, such as gyroscopes and accelerometers, (ii) heat management systems (e.g., heat pipes, fans, etc.), (iii) wireless communication modules (e.g., 5G cellular, Wi-Fi, Bluetooth) and antennas. To maximize bandwidth and ensure connectivity, a plurality of 5G cellular radios may be positioned in the torso 16 and wired through the neck to the antennas in the head 10.1. The head and neck assembly 10 may also incorporate advanced materials and shock-absorbing structures to protect the sensitive electronic components housed within, which may improve the overall durability and reliability of the humanoid robot 1.

The head and neck assembly 10 may include two primary actuators: a head twist actuator (J8.1) 120, which is responsible for enabling rotational movement of the head 10.1 about axis $A_{8.1}$, which is a vertical (yaw) axis when the robot is in the neutral state, and a head nod actuator (J8.2) 140, which enables rotation of the head 10.1 about the axis $A_{8.2}$, which is a horizontal axis when the robot is in the neutral state. Together, these two actuators may provide two degrees of freedom for the head 10.1, allowing it to perform movements that emulate natural human head motions. The head twist actuator (J8.1) 120 may be positioned within the head and neck assembly 10, while the head nod actuator (J8.2) 140 may be located at the base of the neck. This head twist actuator (J8.1) 120 and head nod actuator (J8.2) 140 may each utilize a motor, a gear reduction system, and sensors or encoders that are similar to the actuator types discussed herein.

The head actuators, J8.1 and J8.2, may work in coordination to position the head 10.1 accurately, enabling the humanoid robot 1 to track objects, focus on specific areas of interest, or maintain eye contact during human-robot interactions. The actuators may be controlled, in conjunction with input from visual and inertial sensors, to execute smooth, human-like movements. For example, the head twist actuator (J8.1) 120 may rotate the head 10.1 to follow a moving object, while the head nod actuator (J8.2) 140 adjusts the pitch to maintain an optimal viewing angle.

Variations of this design may include the addition of a third actuator to provide roll motion, which would further increase the range of movement of the head 10.1 to three degrees of freedom (3-DoF) and could enable more expressive head gestures, such as tilting the head sideways to convey curiosity or empathy. Alternatively, for specialized applications, the actuators (J8.1) and/or (J8.2) may be replaced with compact linear actuators or parallel-link mechanisms.

Additionally, variations of head 10.1 may include modular head designs that allow for the quick customization or replacement of sensory and communication components. These modular designs may facilitate easy upgrades or modifications to the capabilities of the humanoid robot 1 without requiring extensive changes to the overall head and neck assembly 10. Furthermore, advanced control algorithms may be implemented to enable more natural, biomimetic head movements, potentially incorporating machine learning techniques to adapt and refine the motion patterns of the head 10.1 based on interaction data and environmental feedback.

ii. Torso

The torso assembly 16 is a central component within the humanoid robot 1, extending vertically between the waist and the head and neck assembly 10, and horizontally between the shoulders 26. The torso 16 is designed to provide the robot 1 with a generally humanoid shape, offer structural and operable support for the arm assemblies 5 and the head and neck assembly 10, and house and protect internal components, including the arm actuators (J1) 190 and an electronics assembly 1.2.6 housed at least partially within the torso 16.

The electronics assembly 1.2.6 within the torso 16 contains various interconnected components that are essential for the operation of the robot 1, including the battery pack, the compute module 1000 (which includes CPUs and GPUs), a power distribution unit, and a charging system. The components are strategically positioned to optimize space and balance. The battery pack may be rearwardly offset, positioned in a rear section of the torso 16, while the compute module 1000 is placed in a forward section. This spatial distribution helps to maintain a balanced posture, allows for efficient cooling, and maximizes the size and power density of the battery pack. A cooling system may be integrated between the battery pack and the compute module 1000 to manage their respective thermal loads. The electronics assembly 1.2.6 may be designed with modularity to facilitate easier maintenance, repair, and upgrades. The charging system may support both wired and wireless protocols. A wired system might use a docking station, while a wireless system could utilize inductive charging, with coils that may be embedded in a housing 1.2.2 and/or the feet 92. The charging system may also include safety features such as overcharge protection and temperature monitoring.

The torso 16 may have a total volume of more than 10 liters, preferably more than 15 liters, and most preferably more than 20 liters. However, the torso 16 has a total volume that is less than 40 liters and most preferably less than 30 liters. The torso 16 also has an uninterrupted internal height that is more than 250 mm, and is preferably near to 300 mm, but is less than 350 mm. This substantial internal volume may accommodate a battery pack that exceeds 2 liters, preferably more than 4 liters, and most preferably more than 6 liters in capacity. Consequently, the humanoid robot 1 may incorporate a battery pack with a capacity exceeding 2.5 kWh, which may provide an operational runtime of over 3.5 hours under normal conditions, and preferably more than 4.5 hours, and most preferably more than 6 hours. In some implementations, the torso 16 may adopt a quasi-trapezoidal prism configuration, wherein its front surface is smaller than its back surface, with angled side shrouds connecting these two sections. This geometric design may enhance the range of motion of the robot 1, particularly by improving its ability to reach across its own body.

iii. Arm Assemblies

The arm assemblies include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the arm assembly may incorporate features such as hard-stops, cooling channels, heat sinks, or other materials, structures, components, or assemblies described herein. For example, a heat pipe may extend from the end effector to the lower forearm. Furthermore, the wrist 50 may include a quick-release mechanism that enables the interchange of different end-effectors or tools. Moreover, the housing of each component may be designed with internal reinforcement structures, and may be made from various materials (e.g., metal alloys or advanced materials like carbon-fiber-reinforced polymers).

iv. End Effector

Figure 6:
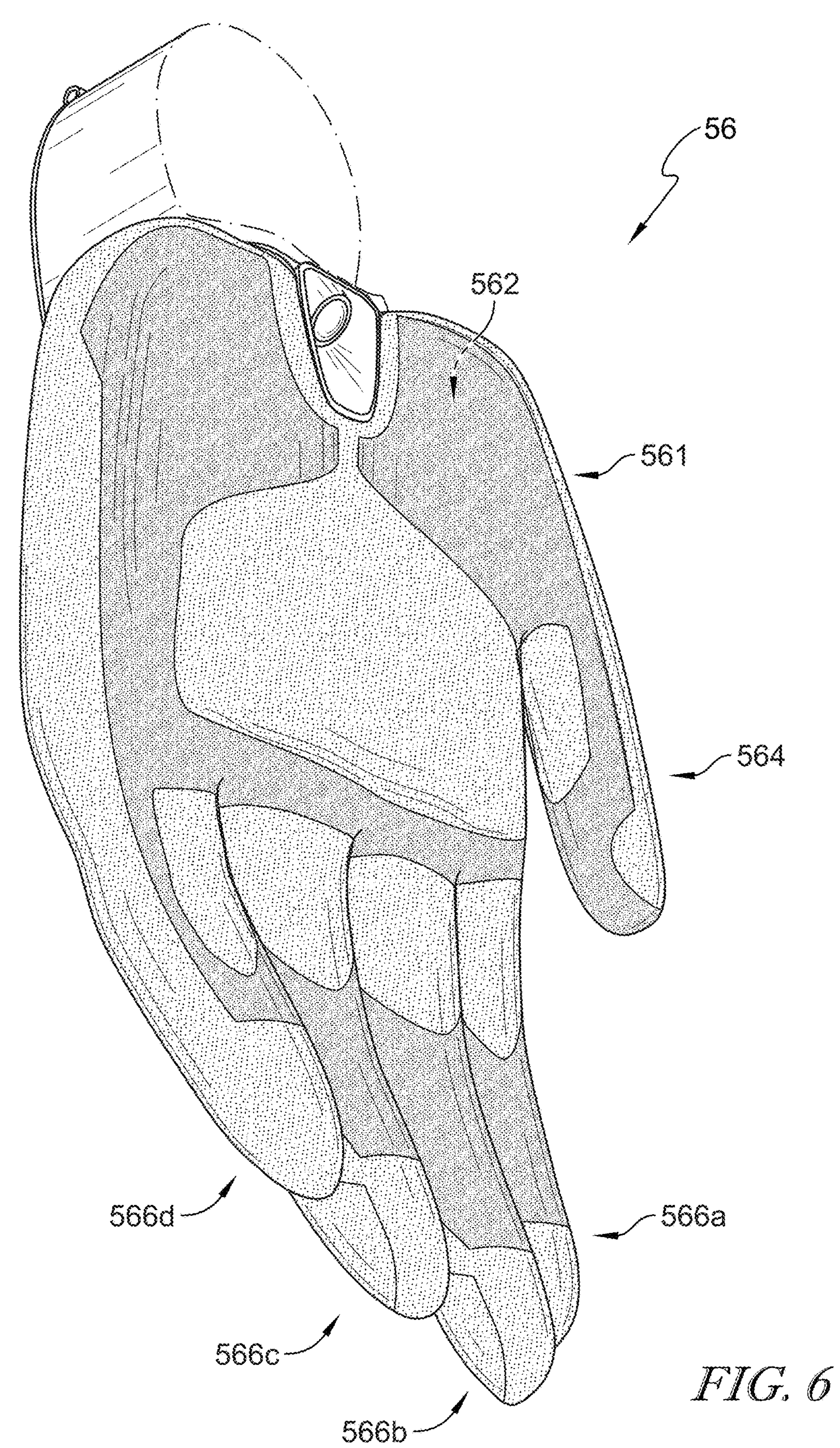
FIG. 6 is a perspective view of one of the end effectors included in the robot of FIGS. 1-2, wherein the end effector includes: (i) a thumb assembly, (ii) at least one finger assembly (e.g., four), and (iv) a covering that substantially encases the thumb assembly and the at least one finger assembly.
Figure 7:
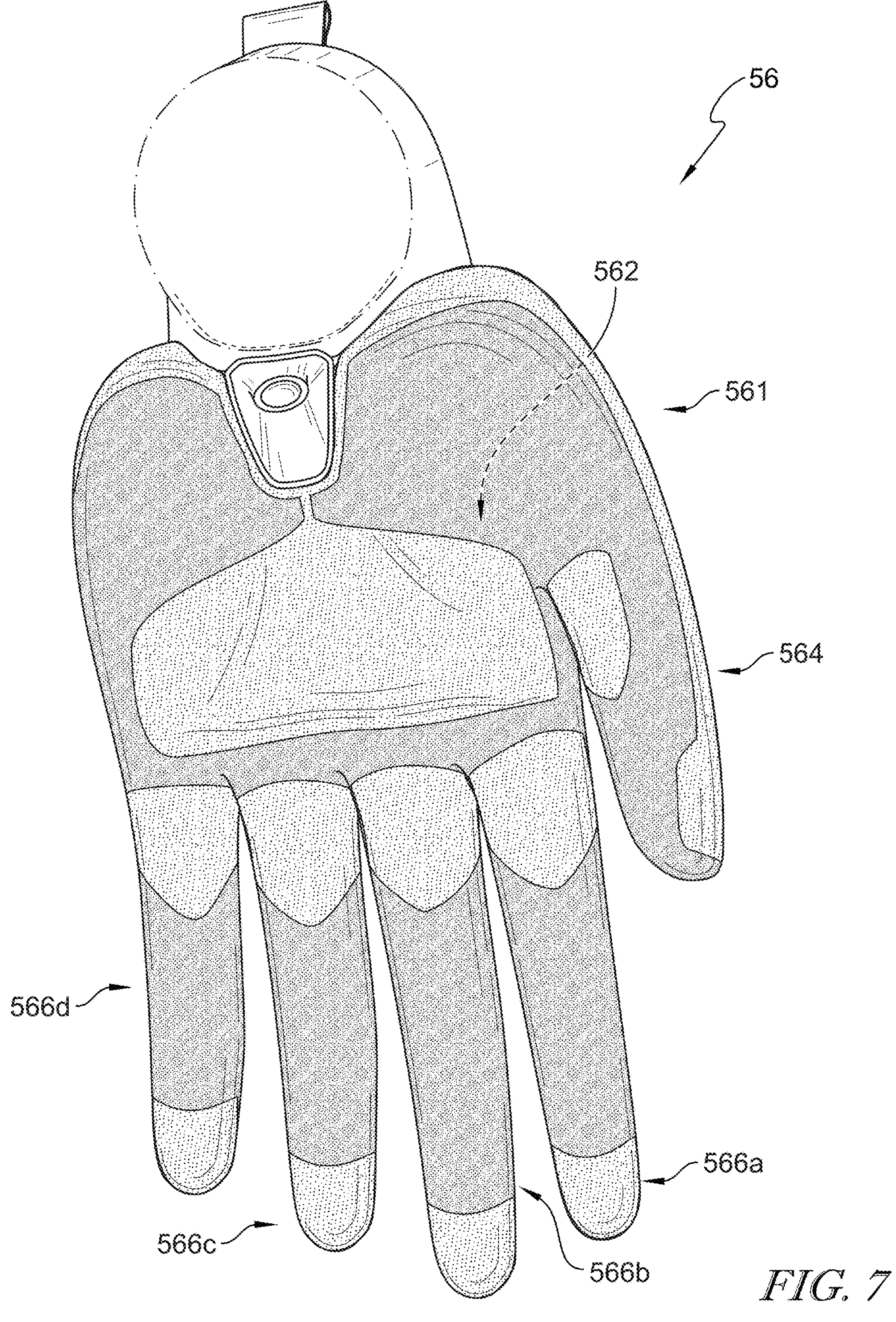
FIG. 7 is a palm view of the end effector of FIG. 6, wherein the components of the end effector remain obscured by the covering.
Figures 8, 9:
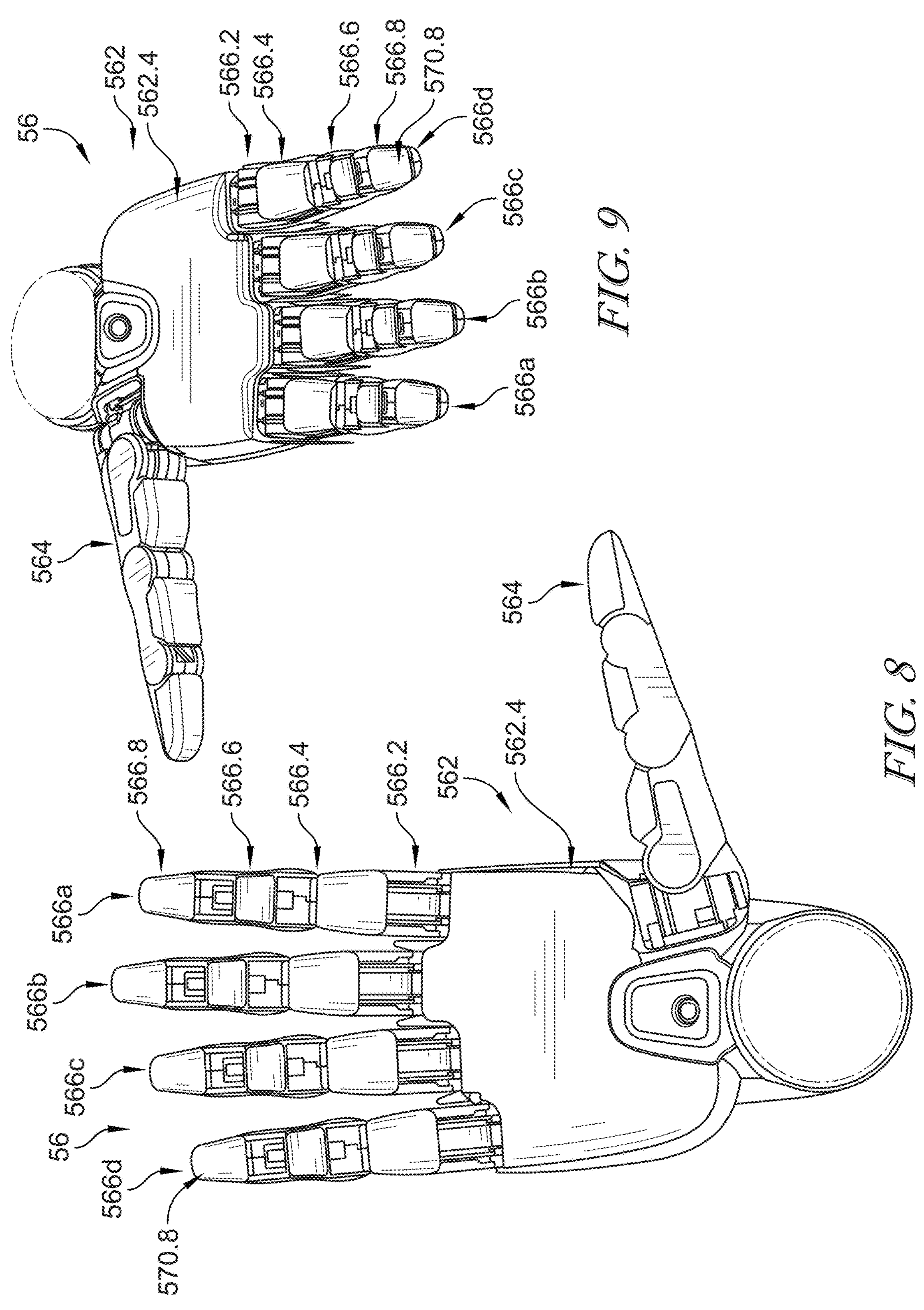
FIG. 8 is a palm view of the end effector of FIG. 6, wherein the cover has been removed to show the components of: (i) the palm, (ii) the thumb assembly, and (iii) the at least one finger assembly (e.g., four)
FIG. 9 is a front perspective view of the end effector of FIG. 8.
Figure 10:
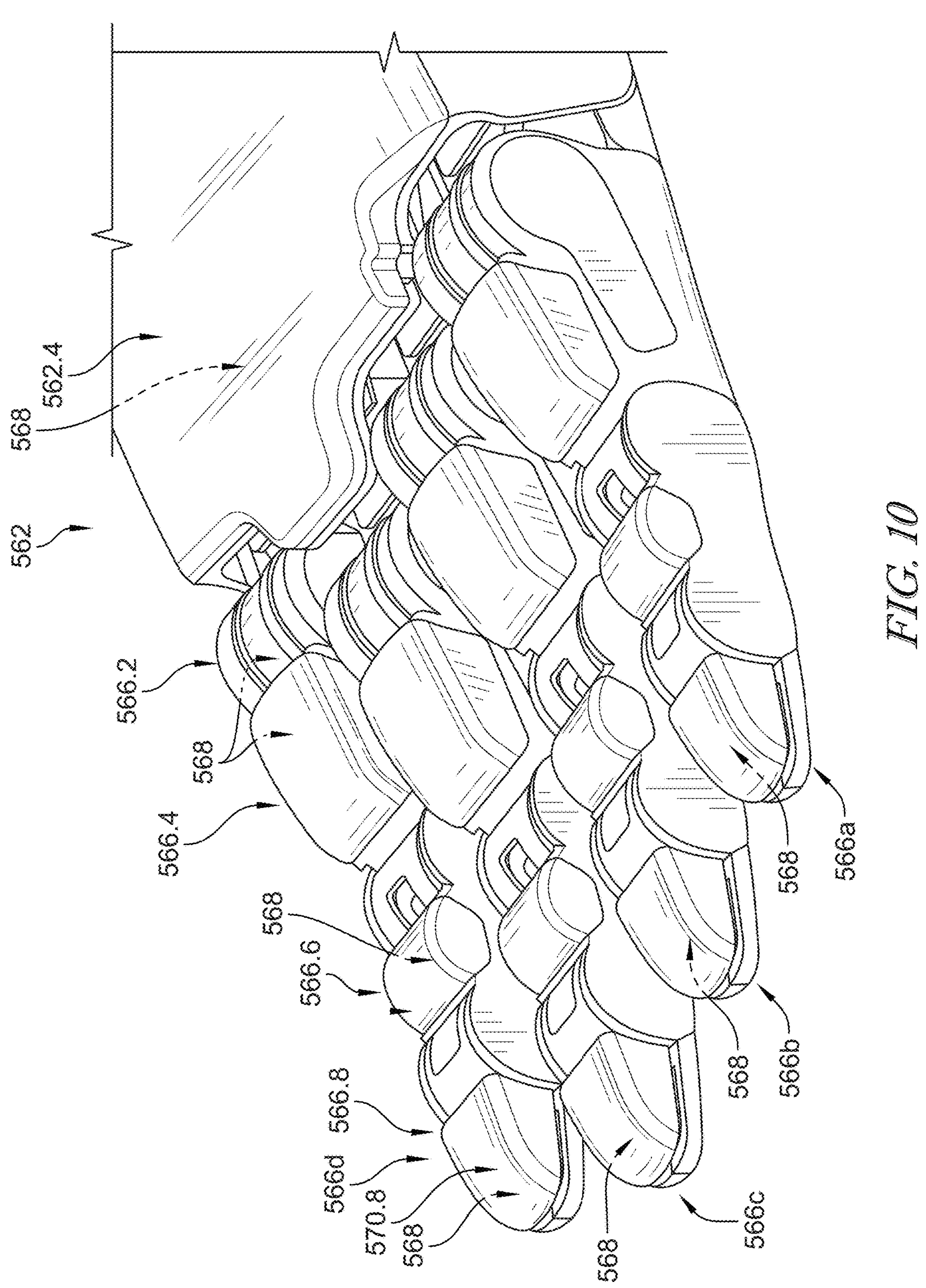
FIG. 10 is a partial perspective view of the end effector of FIG. 8 showing each of the at least one finger assembly includes (i) a knuckle assembly, (ii) a proximal assembly, (iii) a medial assembly, and (iv) a distal assembly.

As shown in FIGS. 6-8, each end effector 56 of the robot 1 includes: (i) a palm 562, (ii) a thumb assembly 564, (iii) at least one finger assembly 566*a-d*, (iv) a control assembly contained in and/or coupled to the palm 562 that is configured to control said thumb assembly 564 and said at least one finger assembly (e.g., finger assemblies 566*a*-566*d*), and (*v*) a cover or glove 561. The palm 562 is designed to: (i) encase and protect the control assembly and (ii) secure the finger assemblies 566*a*-566*d* in at least one plane. The thumb assembly 564 and finger assemblies 566*a*-566*d* are coupled to a frame of the palm 562 and are configured to move relative to said palm 562. The cover 561 is arranged to cover or surround the palm 562, the thumb assembly 564, and the finger assemblies 566*a-d*.

As shown in FIGS. 6-8, each finger assembly 566*a*-566*d* contained in the end effector 56 includes (i) a motor assembly, (ii) a knuckle assembly 566.2, (iii) a proximal assembly 566.4, (iv) a medial assembly 566.6, and (v) a distal assembly 566.8. The motor assembly may be a slotless BLDC motor, a brushed DC motor, an AC induction motor, or any other known motor that drives the movement of the finger assembly 566*a*-566*d* between an open, uncurled, or neutral state, a partially curled state, and a fully curled state. The motor assembly may be positioned in the forearm, palm of the hand, or within each finger. For example, each assembly 566.4, 566.6, 566.8 may be directly controlled with a motor that is positioned within that assembly or an adjacent assembly.

The knuckle assembly 566.2 is positioned forward of the palm 562 and is configured to allow the finger assembly 566*a*-566*d* to move from the open, uncurled, or neutral state to the fully curled state. The proximal assembly 566.4 is positioned between the knuckle assembly 566.2 and the medial assembly 566.6 and is the first portion of the finger assembly **566*a*-566*d* configured to move relative to a main enclosure or palm 562.4 of the end effector housing 562. The medial assembly 566.6 is positioned between the proximal assembly 566.4 and the distal assembly 566.8 and is the second portion of the finger assembly 566*a*-566*d* configured to move relative to the palm 562.4. The distal assembly 566.8 is positioned forward of the medial assembly 566.6 and is the third portion of the finger assembly 566*a*-566*d* configured to move relative to the palm 562.4**.

Figures 11, 12:
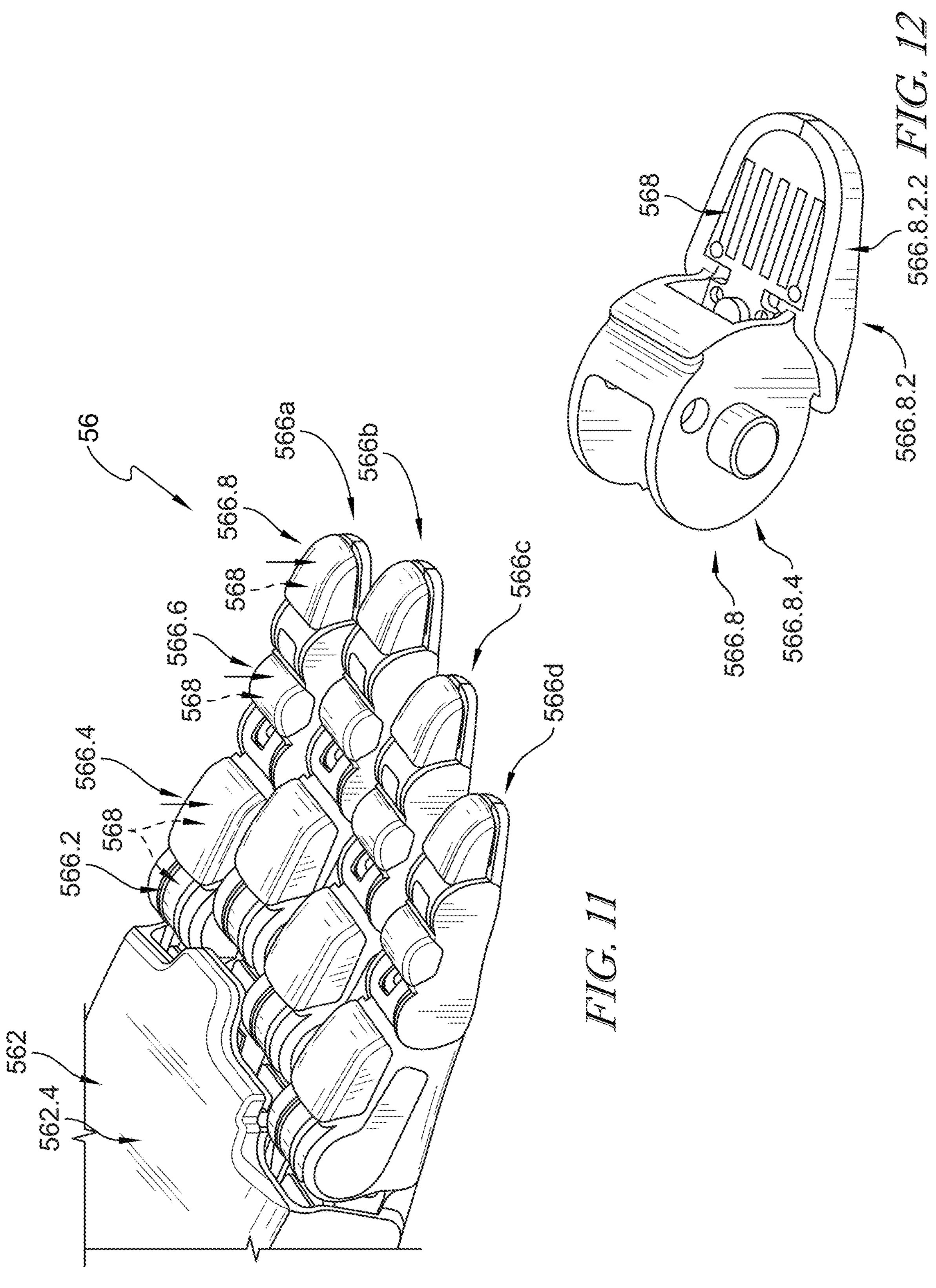
FIG. 11 is a partial perspective view of a first embodiment of the end effector of FIGS. 8-10, and wherein said end effector includes a first embodiment of a sensor assembly configured to measure the application of a single normal force on at least one component of the end effector.
FIG. 12 is a perspective view of the distal assembly of FIG. 11, wherein components of the distal assembly of a finger assembly have been removed to show a portion of the first embodiment of the sensor assembly contained therein that includes a single strain gauge.

Furthermore, each finger assembly **566*a*-566*d* houses at least one sensor assembly 568, which is configured to measure the forces or loads that are applied to or experienced by the thumb assembly 564 and/or finger assemblies 566*a*-566*d* of the end effector 56. The sensor assembly 568 may be located in or coupled to any one of: (i) the proximal assembly 566.4, (ii) the medial assembly 566.6, (iii) the distal assembly 566.8 of each finger assembly 566*a*-566*d*, (iv) the palm 562.4, and/or (v) a combination thereof. For ease of reference and as shown in FIG. 11, the sensor assembly 568 is located in the distal assembly 566.8**.

1. Distal Assembly

The distal assembly 566.8 of each finger assembly **566*a*-566*d* includes: (i) a distal housing assembly 566.8.2, (ii) a distal link assembly 566.8.4, and (iii) a sensor assembly 568 as shown in FIGS. 24-27. The distal housing assembly 566.8.2 is designed to protect and substantially encase the other components of the distal assembly 566.8, such as the sensor assembly 568. The distal link assembly 566.8.4 is included with and/or is integrally formed with a base member 566.8.2.2. The positional relationship between the components of the distal assembly 566.8 that are shown in FIGS. 24-27** are listed in Table 1.

TABLE 1

| Distance (mm) | Lower Bound | Upper Bound | Preferred Lower Bound | Preferred Upper Bound |
|---|---|---|---|---|
| D1 | 7.99 | 11.99 | 8.99 | 10.99 |
| D2 | 0.54 | 0.80 | 0.60 | 0.74 |
| D3 | 12.27 | 18.41 | 13.81 | 16.87 |
| D4 | 0.20 | 0.30 | 0.23 | 0.28 |
| D5 | 0.66 | 1.00 | 0.75 | 0.91 |

As shown in FIGS. 24-27, the distal housing assembly 566.8.2 includes: (i) a base member 566.8.2.2 and (ii) a finger energy attenuation member 570.8 arranged over the other components and the sensor assembly 568. In other words, the sensor assembly 568 is positioned between the base member 566.8.2.2 and the finger energy attenuation member 570.8. It should also be understood that the sensor assembly 568 is positioned in the distal housing assembly 566.8.2 and any sensor assembly 568 that is disclosed herein may be used in connection with the disclosed housing assembly 566.8.2, including the disclosed finger energy attenuation member 570.8.

Figures 39, 40, 41:
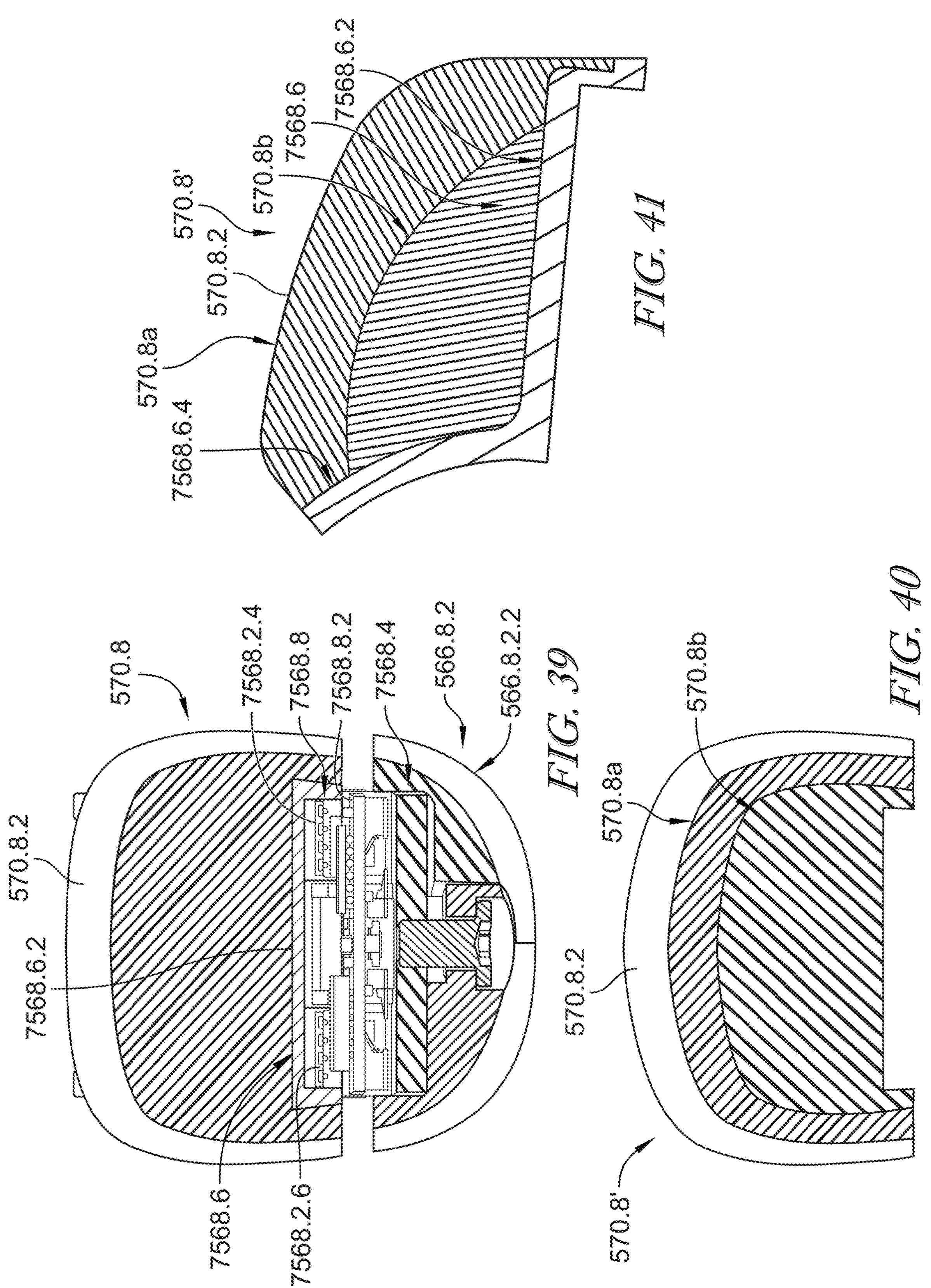
FIG. 39 is a cross-sectional view of the distal assembly taken along line 39-39 in FIG. 26, and showing that the distal housing assembly includes: (i) a base member which supports the sensor assembly, and (ii) a finger energy attenuation member with a single region.
FIG. 40 is a cross-sectional view of a ninth embodiment of the distal assembly taken along line 39-39 in FIG. 26, and wherein a majority of the distal assembly has been omitted to show a second embodiment of the finger energy attenuation member with an interior region and an exterior region that at least partially surrounds the interior region.
FIG. 41 is a cross-sectional view of the ninth embodiment of the distal assembly taken along line 27-27 in FIG. 26, and wherein a majority of the distal assembly has been omitted to show the second embodiment of the finger energy attenuation member with an interior region and an exterior region that at least partially surrounds the interior region.
Figures 42, 43:
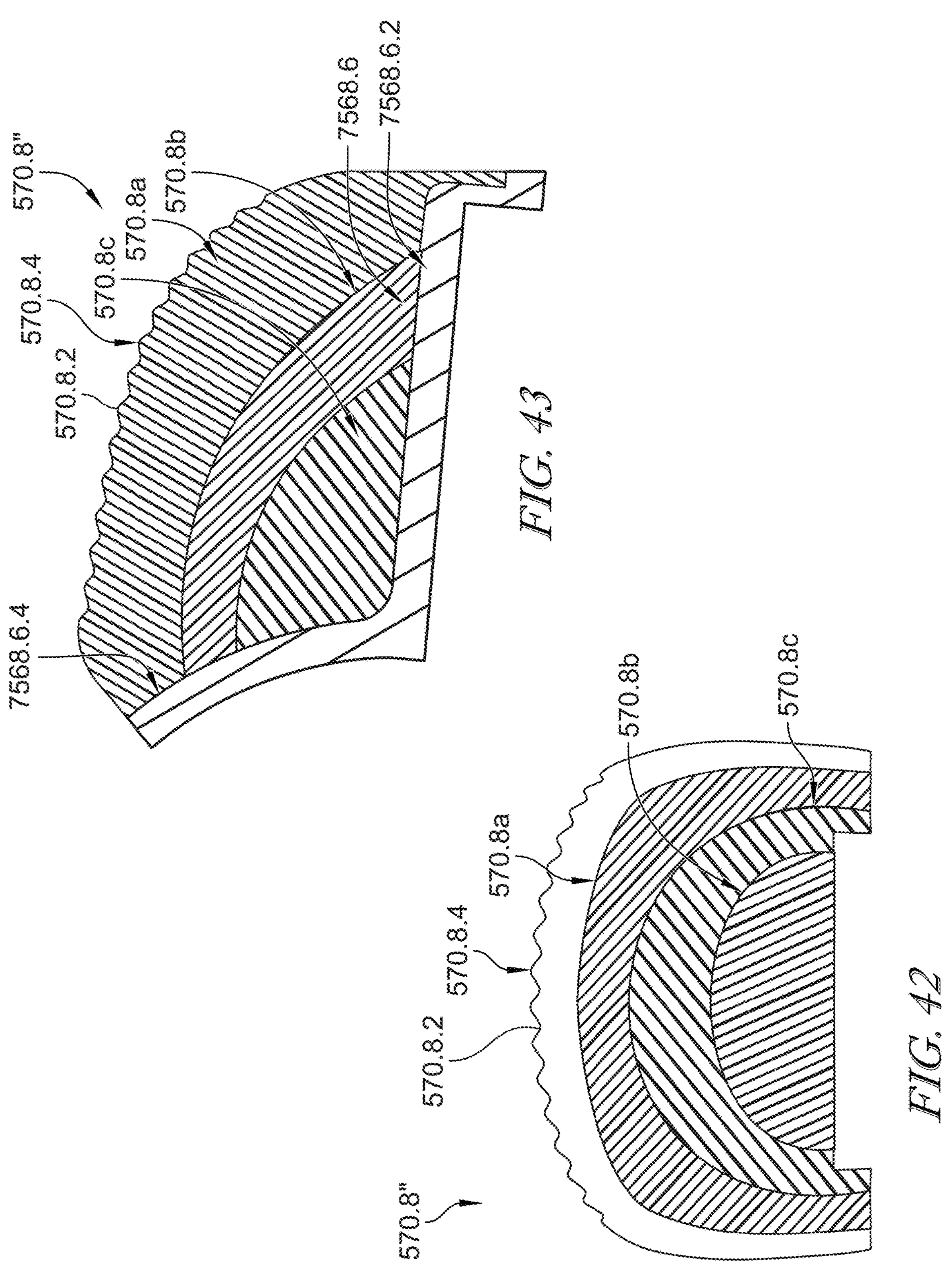
FIG. 42 is a cross-sectional view of a tenth embodiment of the distal assembly taken along line 39-39 in FIG. 26, and wherein a majority of the distal assembly has been omitted to show a third embodiment of the finger energy attenuation member with an interior region, an intermediate region, and an exterior region with a plurality of ridges and grooves.
FIG. 43 is a cross-sectional view of the ninth embodiment of the distal assembly taken along line 27-27 in FIG. 26, and wherein a majority of the distal assembly has been omitted to show a third embodiment of the finger energy attenuation member with an interior region, an intermediate region, and an exterior region with a plurality of ridges and grooves.

The finger energy attenuation member 570.8 is coupled to a portion of the sensor assembly 568 (e.g., force distributor member 7568.6) as shown in FIGS. 41 and 43. In other embodiments, the finger energy attenuation member 570.8 may be: (a) integrally formed with the sensor assembly 568, (b) coupled to or integrally formed with the base member 566.8.2.2, and/or (c) any combination thereof. The finger energy attenuation member 570.8 is formed to complete an exterior profile of the finger tip and is configured to receive an external force and transfer at least a portion of the received external force to the underlying sensor assembly 568. Distribution of said portion of the force to the sensor assembly 568 is due to the fact that the energy attenuation member 570.8 absorbs or attenuates some of the force that is applied to the end effector (e.g., distal assembly). The amount of the force that is transferred to the sensor assembly and/or the force absorbed by the finger energy attenuation member 570.8 relates to the configuration of the energy attenuation member 570.8, along with the force applied to the end effector. For example, a softer energy attenuation member 570.8 may transfer less force to the sensor assembly in comparison to a harder energy attenuation member 570.8.

The finger energy attenuation member 570.8 may include a single region (see FIGS. 27 and 39) or a plurality of regions (see FIGS. 40-43). For example, the finger energy attenuation member 570.8 may have any number of regions between 2 and 20. Each region may be defined by a change (e.g., a statistically significant change, and not a minor manufacturing tolerance change) of the properties of said region. For example, a first region will have a first set of properties, while a second region will have a second set of properties that are different from the first set of properties. These properties may include hardness, Young's modulus, compression set, indentation force deflection (IFD), tensile strength, damping capacity, density, compression/deflection ratios, shore durometer, Poisson's ratio, and/or any other known material and/or physical property. Based on the above disclosure, a finger energy attenuation member 570.8 will not include a plurality of regions if its properties are consistent throughout the entire member.

If the finger energy attenuation member 570.8 includes multiple regions, then said regions may be based on the fact that different materials were used in the construction of the finger energy attenuation member 570.8. For example, the finger energy attenuation member 570.8 may be fabricated from a plurality (e.g., between 2 and 20) of materials. The different materials may have different properties, including densities, compression/deflection ratios, and/or shore durometer. In one example (see FIGS. 40 and 41), the finger energy attenuation member 570.8' has: (i) an interior region **570.8*a* and (ii) an exterior region 570.8*b* that at least partially surrounds the interior region 570.8*a*. The interior region 570.8*a* may include a first material that has a first shore durometer, a first compression/deflection ratio, and/or a first density, while the exterior region 570.8*b* may include a second material with a second shore durometer, a second compression/deflection ratio, and/or a second density. The second shore durometer or second compression/deflection ratio may be less than the first shore durometer or the first compression/deflection ratio. In this way, the interior region 570.8*a* is harder, more firm, and/or does not compress as easily as the exterior region 570.8*b*. In an alternative embodiment, the exterior region 570.8*b* may have greater values associated with these variables in comparison to the interior region 570.8*a*. Further, it should be understood that the regions 570.8*a*, 570.8*b*** may be integrally formed from one another, wherein said properties of each region may be changed by a change in the manufacturing process instead of a change in the materials that are used in connection with the region.

In another embodiment, the finger energy attenuation member 570.8" has: (i) an interior region **570.8*a*, (ii) an exterior region 570.8*b*, and (iii) an intermediate region 570.8*c* as shown in FIGS. 42 and 43. The intermediate region 570.8***c* is located at least partially between the exterior region 570.8*b* and the interior region 570.8*a*. The intermediate region 570.8*c* may include a third material that has a third shore durometer, a third compression/deflection ratio, and/or a third density that is between the shore durometers, the compression/deflection ratios, or densities of the first and second materials. It should also be understood that the entire finger energy attenuation member 570.8 may only include a single region that includes a substantially equal shore durometer, compression/deflection ratio, Young's modulus, compression set, indentation force deflection (IFD), tensile strength, damping capacity, density, and/or Poisson's ratio, as shown in FIG. 39.

The borders between the regions and/or the shape of each region may be selected by the designer. For example, FIGS. 40-43 show regions that include an inner region with a curvilinear extent, while the outer region may also have a curvilinear extent. In some configurations, the interior region has an outer surface that includes a curvilinear extent or a curvilinear outside surface. In other embodiments, only the outer region may have a curvilinear extent. Further, the inner region may have multiple other shaped extents including linear. Also, the outer region may have an outer surface 570.8.2 that mimics the shape of a human finger tip and includes a plurality of and/or a pattern of ridges/projections and grooves 570.8.4. The ridges and grooves 570.8.4 may be configured to aid in the detection of different textures due to the ability to detect vibrations (wherein said vibrations may be transferred to the sensor assembly 568) when moving the finger energy attenuation member 570.8 across the surface it is in contact with. Additionally, the ridges and grooves 570.8.4 may also aid in picking up small objects because the ridges may be able to deform into the grooves 570.8.4. Finally, the ridges and grooves 570.8.4 may cover a small area of the finger energy attenuation member 570.8 or at least a majority of the outside surface of the energy attenuation member.

The finger energy attenuation member 570.8 and/or the regions thereof can be made from or include a wide variety of materials, including: (i) polymers (e.g., polyethylene foam (PE Foam), ethylene vinyl acetate (EVA) foam, polyurethane foam (including Memory Foam and Open-cell Polyurethane Foam), polyimide foam, polyvinyl chloride (PVC) foam, expanded polypropylene (EPP) foam, cross-linked polyethylene foam (XLPE), polyethylene terephthalate (PET) Foam), (ii) rubber foams (e.g., neoprene foam, silicone rubber foam, nitrile butadiene rubber (NBR) foam, ethylene propylene diene monomer (EPDM) foam, vinyl nitrile foam, thermoplastic elastomer (TPE) foam, elastomeric foam), (iii) natural foams, (iv) engineered foams (e.g., microcellular urethane (MCU) foam, reticulated polyurethane foam, melamine foam, convoluted foam), (v) composite and hybrid materials (e.g., multi-layered foams, fiberglass foam composites, metalized foam composites), (vi) expanded polystyrene (EPS), (vii) expanded polypropylene (EPP), (viii) Koroyd®, (ix) D30®, (x) Poron® XRD, (xi) thermoplastic elastomers (TPE), (xii) thermoplastic polyurethane (TPU), (xiii) any other known plastics, (xiv) any combination of the above, and/or (xv) any other material known to one of skill in the art.

a. Tactile Sensor Assemblies

FIGS. 12-38 show various embodiments of tactile sensor assemblies 568, 1568, 2568, 3568, 4568, 5568, 6568, 7568, 8568, 9568 for the end effector 56 of the humanoid robot 1. The tactile sensor assembly 568, 1568, 2568, 3568, 4568, 5568, 6568, 7568, 8568, 9568 is configured to measure a force or load experienced by and/or applied to the end effector (e.g., finger assemblies 566*a*-566*d*) using a sensor. Said sensor may include or be a strain gauge or arrays of strain gauges. The strain gauges are designed to measure strain, which may be used to determine the force, stress, torque, pressure, deflection, etc. of a force or load experienced by and/or applied to the finger assemblies 566*a*-566*d*. The feedback provided by these tactile sensor assemblies 568, 1568, 2568, 3568, 4568, 5568, 6568, 7568, 8568, 9568 embedded in, coupled to, and/or integrally formed with the end effector (e.g., finger assemblies 566*a*-566*d*) can be combined with data from the encoders, torque sensors and/or other sensors that are positioned adjacent to or configured to obtain information from each joint. Said combination of feedback, data, and/or information can be used to control the actuation of the finger assemblies 566*a*-566*d*, thereby enabling robot 1 to perform complex manipulations that require delicate touch.

While the tactile sensor assemblies 568, 1568, 2568, 3568, 4568, 5568, 6568, 7568, 8568, 9568 are primarily shown as embedded in the distal assembly 566.8 of the finger assemblies 566*a*-566*d*, it should be understood that: (i) the tactile sensor assemblies may be positioned at any location in the end effector (e.g., palm), wrist, foot, or another end effector, (ii) they may not be embedded in the assembly; instead, they may be integrally formed therewith or directly secured to an outer extent of said assembly, (iii) they may be formed in a layer or external covering (e.g., cover 561) that is positioned on top of or over said assembly, and/or (iv) a combination of any one of the described options may be used. Examples of possible combinations include: (i) a portion of the tactile sensor assembly positioned in the cover and a portion of the tactile sensor assembly embedded within the end effector, (ii) a portion of the tactile sensor assembly secured to the exterior of the housing of said end effector and a portion of the tactile sensor assembly embedded within the end effector, (iii) a portion of the tactile sensor assembly positioned in the cover, a portion of the tactile sensor assembly secured to the exterior of the housing of said end effector, and a portion of the tactile sensor assembly embedded within the end effector, (iv) a portion of the tactile sensor assembly positioned in the cover, a portion of the tactile sensor assembly integrally formed with the exterior of the housing of said end effector, and a portion of the tactile sensor assembly embedded within the end effector, and/or (v) any combination or hybrid thereof.

1. Single Strain Gauge

FIGS. 11 and 12 illustrate an embodiment of a tactile sensor assembly 568 configured to measure a single normal force experienced on the respective finger assembly 566*a*-566*d*. The sensor assembly 568 includes a single strain gauge 568.2. In the illustrative embodiment, The single strain gauge 568.2 is coupled directly to the base member 566.8.2.2 of the distal housing assembly 566.8.2 or a part that is secured to said base member 566.8.2.2. It should be understood that this tactile sensor assembly may use any components, aspect, and/or technology that is disclosed above or below in whole or in part.

2. Strain Gauge Array

Figures 15, 16:
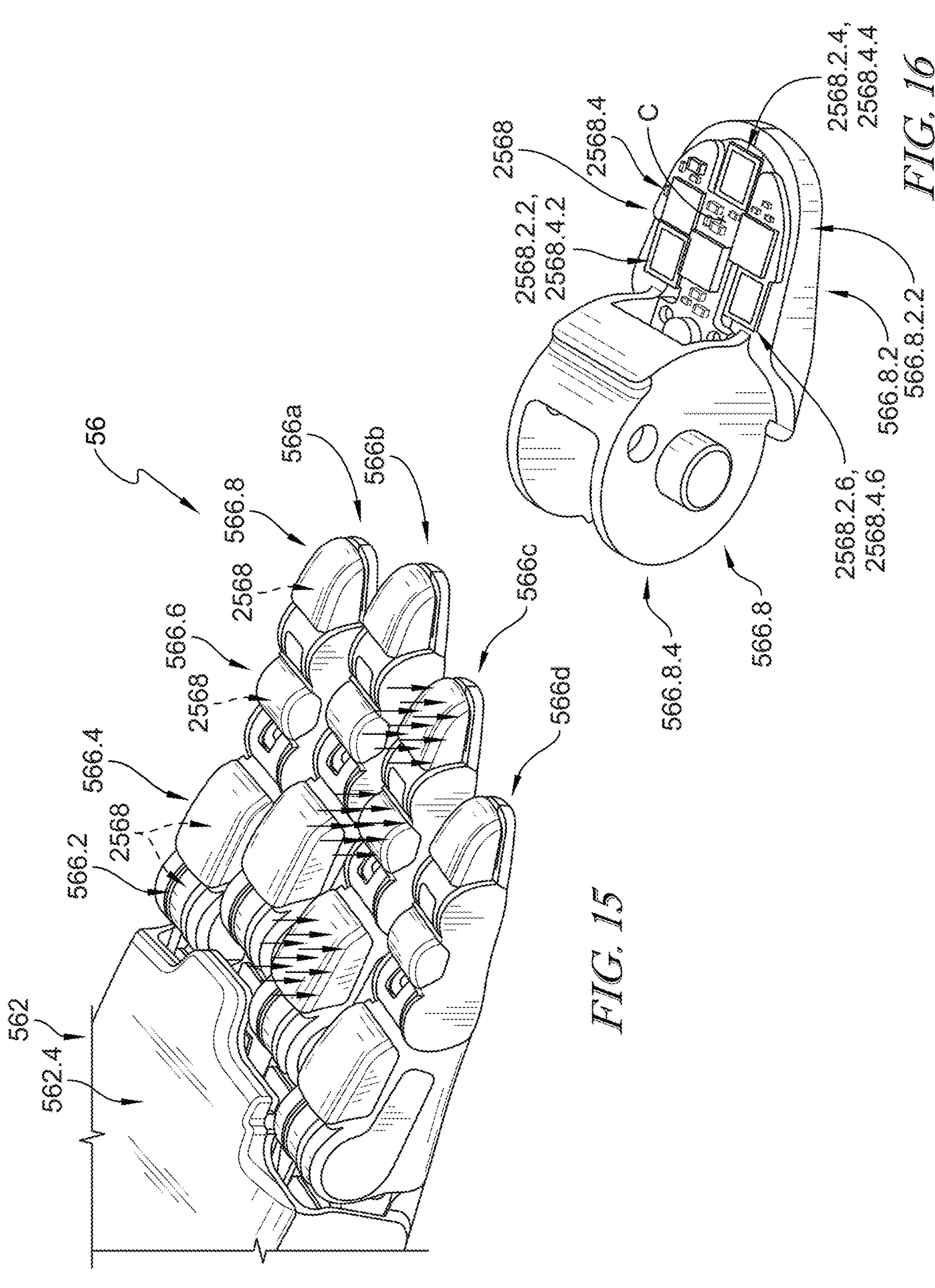
FIG. 15 is a partial perspective view of a third embodiment of the end effector of FIGS. 8-10, and wherein said end effector includes a third embodiment of a sensor assembly configured to measure the application of a plurality of normal forces on at least one component of the end effector.
FIG. 16 is a perspective view of the distal assembly of FIG. 15, wherein components of the distal assembly of a finger assembly have been removed to show a portion of the third embodiment of the sensor assembly contained therein that includes a plurality of strain gauges.

FIGS. 15 and 16 illustrate a third embodiment of a tactile sensor assembly 2568 configured to measure an array of normal forces experienced on the respective finger assembly

566a-566d. The sensor assembly 2568 includes: (i) a mount member 2568.4 and (ii) an array of strain gauges 2568.2.2, 2568.2.4, 2568.2.6 each coupled to one of the linear arms 2568.4.2, 2568.4.4, 2568.4.6 included on the mount member 2568.4. The mount member 2568.4 is coupled to the base member 566.8.2.2 of the distal assembly 566.8 and has three linear arms 2568.4.2, 2568.4.4, 2568.4.6 positioned around a centroid C as shown in FIG. 16.

Each strain gauge 2568.2.2, 2568.2.4, 2568.2.6 is coupled to one of the linear arms 2568.4.2, 2568.4.4, 2568.4.6 of the mount member 2568.4. In some embodiments, the mount member 2568.4 may be a printed circuit board and the linear arms 2568.4.2, 2568.4.4, 2568.4.6 are portions of the printed circuit board. The linear arms 2568.4.2, 2568.4.4, 2568.4.6 are configured to bend or deflect when acted on in a vertical direction and the strain gauges 2568.2.2, 2568.2.4, 2568.2.6 measure the strain in each linear arm 2568.4.2, 2568.4.4, 2568.4.6. It should be understood that this tactile sensor assembly may use any components, aspect, and/or technology that is disclosed above or below in whole or in part.

3. L-Shaped Strain Gauge

Figures 13, 14:
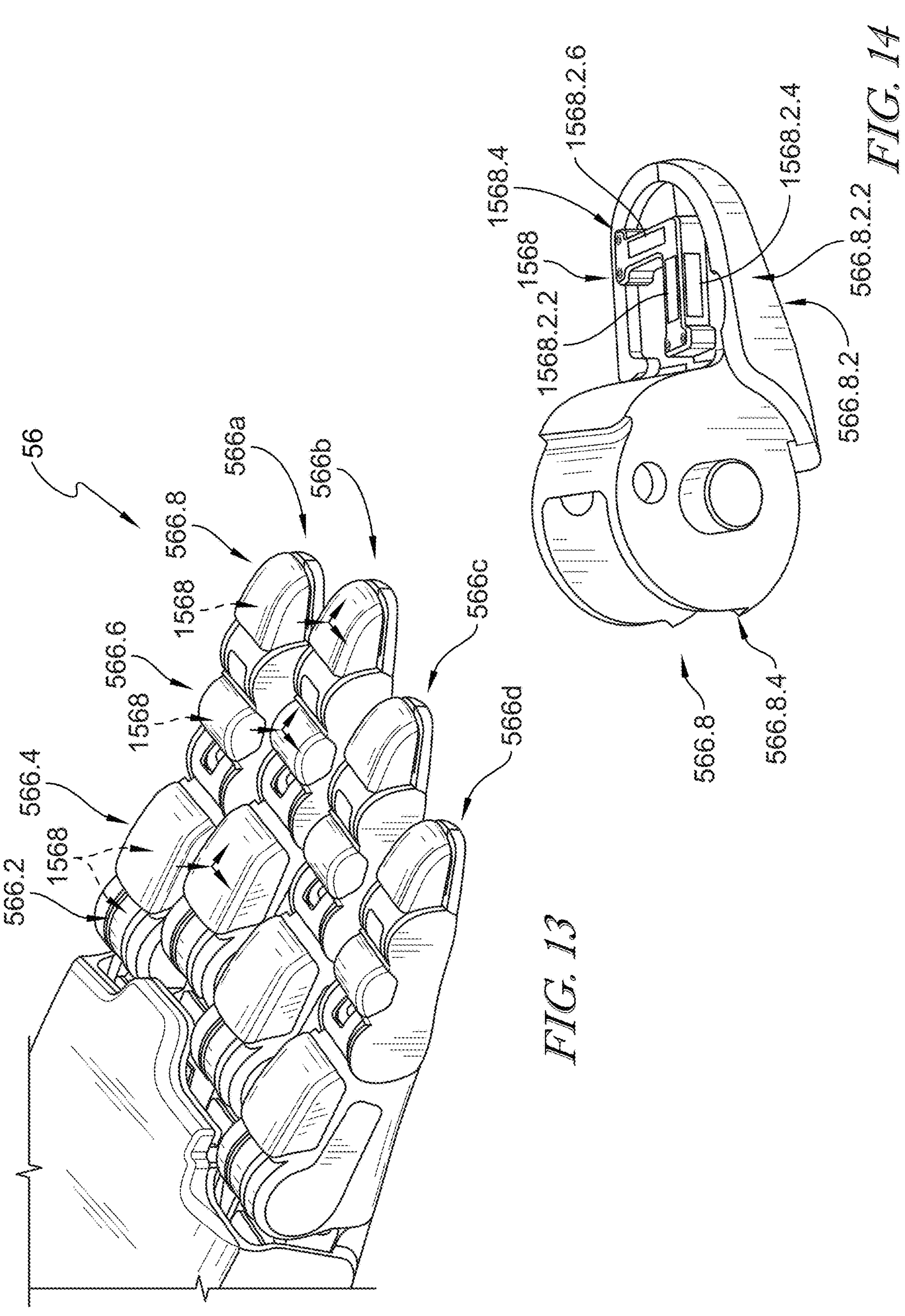
FIG. 13 is a partial perspective view of a second embodiment of the end effector of FIGS. 8-10, and wherein said end effector includes a second embodiment of a sensor assembly configured to measure the application of a single triaxial force on at least one component of the end effector.
FIG. 14 is a perspective view of the distal assembly of FIG. 13, wherein components of the distal assembly of a finger assembly have been removed to show a portion of the second embodiment of the sensor assembly contained therein that includes three strain gauges arranged in an L-shape.

FIGS. 13 and 14 illustrate a second embodiment of a tactile sensor assembly 1568 configured to measure a single triaxial force experienced on the respective finger assembly 566a-566d. The sensor assembly 1568 includes: (i) a mount member 1568.4 and (ii) at least three strain gauges 1568.2.2, 1568.2.4, 1568.2.6 coupled to the mount member 1568.4 included in the sensor assembly 1568. The mount member 1568.4 is coupled to the base member 566.8.2.2 of the distal assembly 566.8 and has an L-shape as shown in FIG. 14.

Each strain gauge 1568.2.2, 1568.2.4, 1568.2.6 is coupled to a different section/surface of the mount member 1568.4 to measure the strain in the three different axes to determine the triaxial force experienced on the respective finger assembly 566a-566d. It should be understood that this tactile sensor assembly may use any components, aspect, and/or technology that is disclosed above or below in whole or in part.

4. L-Shaped Strain Gauge Array

Figures 20, 21:
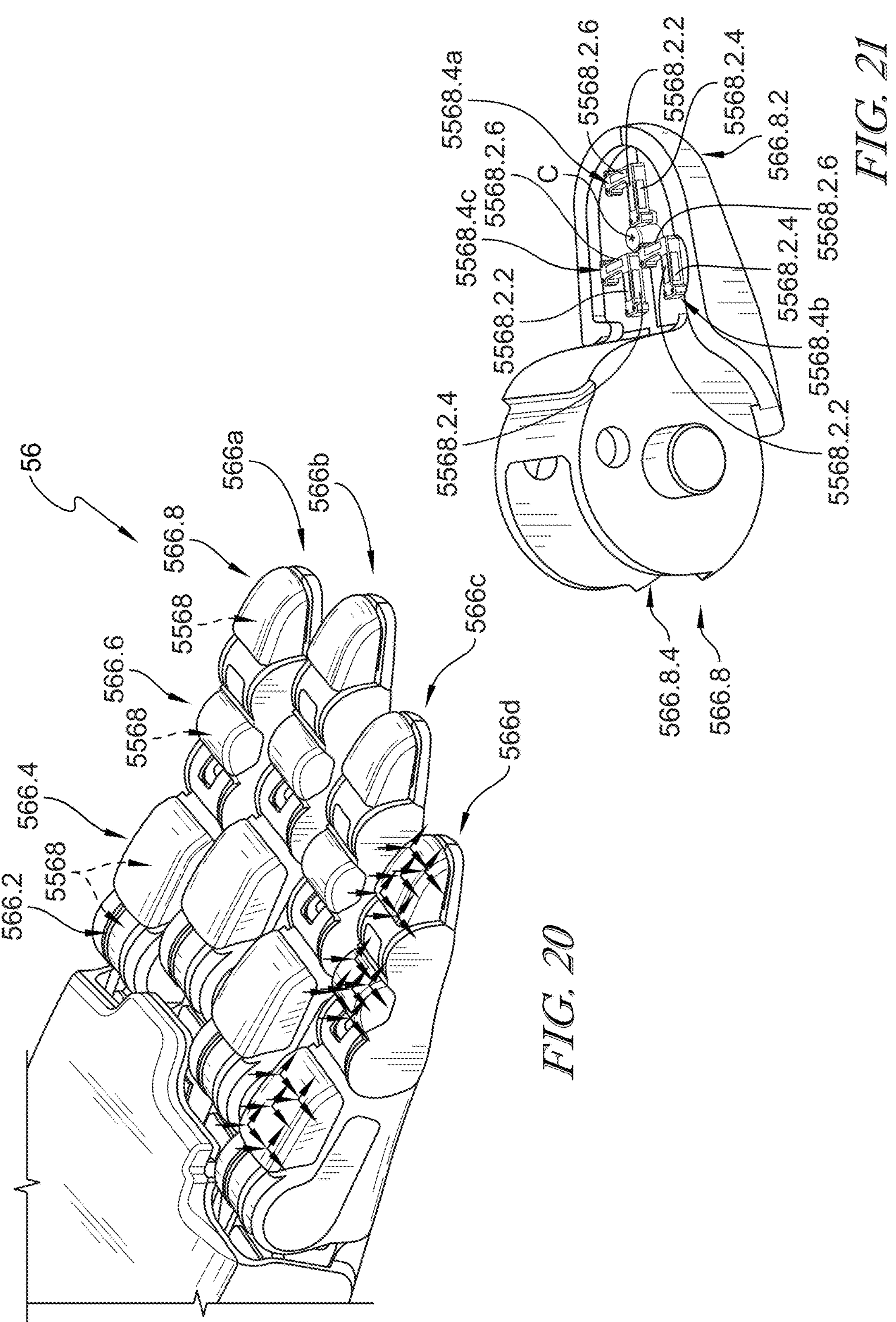
FIG. 20 is a partial perspective view of a sixth embodiment of the end effector of FIGS. 8-10, and wherein said end effector includes a sixth embodiment of a sensor assembly configured to measure the application of a plurality of triaxial forces on at least one component of the end effector.
FIG. 21 is a perspective view of the distal assembly of FIG. 20, wherein components of the distal assembly of a finger assembly have been removed to show a portion of the sixth embodiment of the sensor assembly contained therein that includes a plurality of L-shaped strain gauges.

FIGS. 20 and 21 illustrate a sixth embodiment of a tactile sensor assembly 5568 configured to measure an array of triaxial forces experienced on the respective finger assembly 566a-566d. The tactile sensor assembly 5568 includes: (i) a plurality of mount members 5568.4a, 5568.4b, 5568.4c and (ii) a plurality of strain gauges 5568.2.2, 5568.2.4, 5568.2.6 coupled to each mount member 5568.4a, 5568.4b, 5568.4c. Each mount member 5568.4a, 5568.4b, 5568.4c has an L-shape like the embodiment in FIGS. 13 and 14. The mount members 5568.4a, 5568.4b, 5568.4c are coupled to the distal assembly 566.8 and are spaced apart around a centroid C.

The strain gauges 5568.2.2, 5568.2.4, 5568.2.6 on each mount member 5568.4a, 5568.4b, 5568.4c are coupled to a different section/surface of the respective mount member 5568.4a, 5568.4b, 5568.4c to measure the strain in the three different axes to determine the triaxial forces experienced on the respective finger assembly 566a-566d. It should be understood that this tactile sensor assembly may use any components, aspect, and/or technology that is disclosed above or below in whole or in part.

5. Strain Gauge Bridge

This Application includes at least five embodiments of tactile sensor assemblies that include bridges, wherein said strain gauges are mounted on, formed on, coupled to, or integrally formed with said bridges. It should be understood that each of these sensor assemblies may use any components, aspect, and/or technology that is disclosed above in whole or in part.

a. Fourth Embodiment

Figures 17, 18:
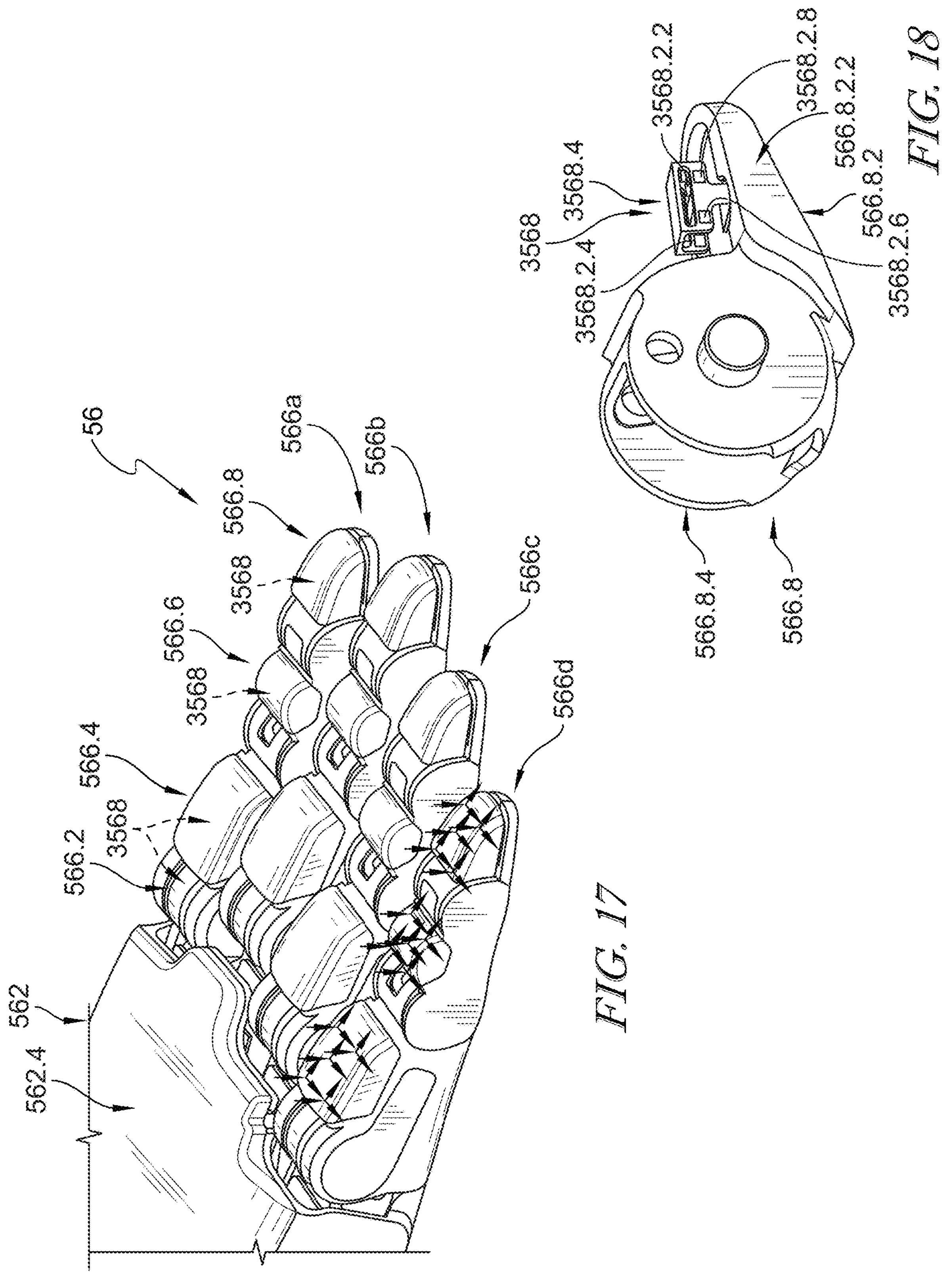
FIG. 17 is a partial perspective view of a fourth embodiment of the end effector of FIGS. 8-10, and wherein said end effector includes a fourth embodiment of a sensor assembly configured to measure the application of a plurality of triaxial forces on at least one component of the end effector.
FIG. 18 is a perspective view of the distal assembly of FIG. 17, wherein components of the distal assembly of a finger assembly have been removed to show a portion of the fourth embodiment of the sensor assembly contained therein that includes another version of a strain gauge bridge.

FIGS. 17 and 18 illustrate a fourth embodiment of a tactile sensor assembly 3568 configured to measure an array of triaxial forces or a load experienced by and/or applied to the respective finger assembly 566a-566d. The sensor assembly 3568 includes: (i) a bridge, spring bridge, or mount member 3568.4 and (ii) a plurality of strain gauges 3568.2.2, 3568.2.4, 3568.2.6, 3568.2.8 coupled to the bridge 3568.4. As shown in FIG. 18, the bridge 3568.4 has a rectangular shape and the sensor assembly 3568 has four strain gauges 3568.2.2, 3568.2.4, 3568.2.6, 3568.2.8 at the four corners of the bridge 3568.4. In some embodiments, three strain gauges may be used instead of four. In other embodiments, less than three strain gauges may be used.

b. Fifth Embodiment

Figure 19:
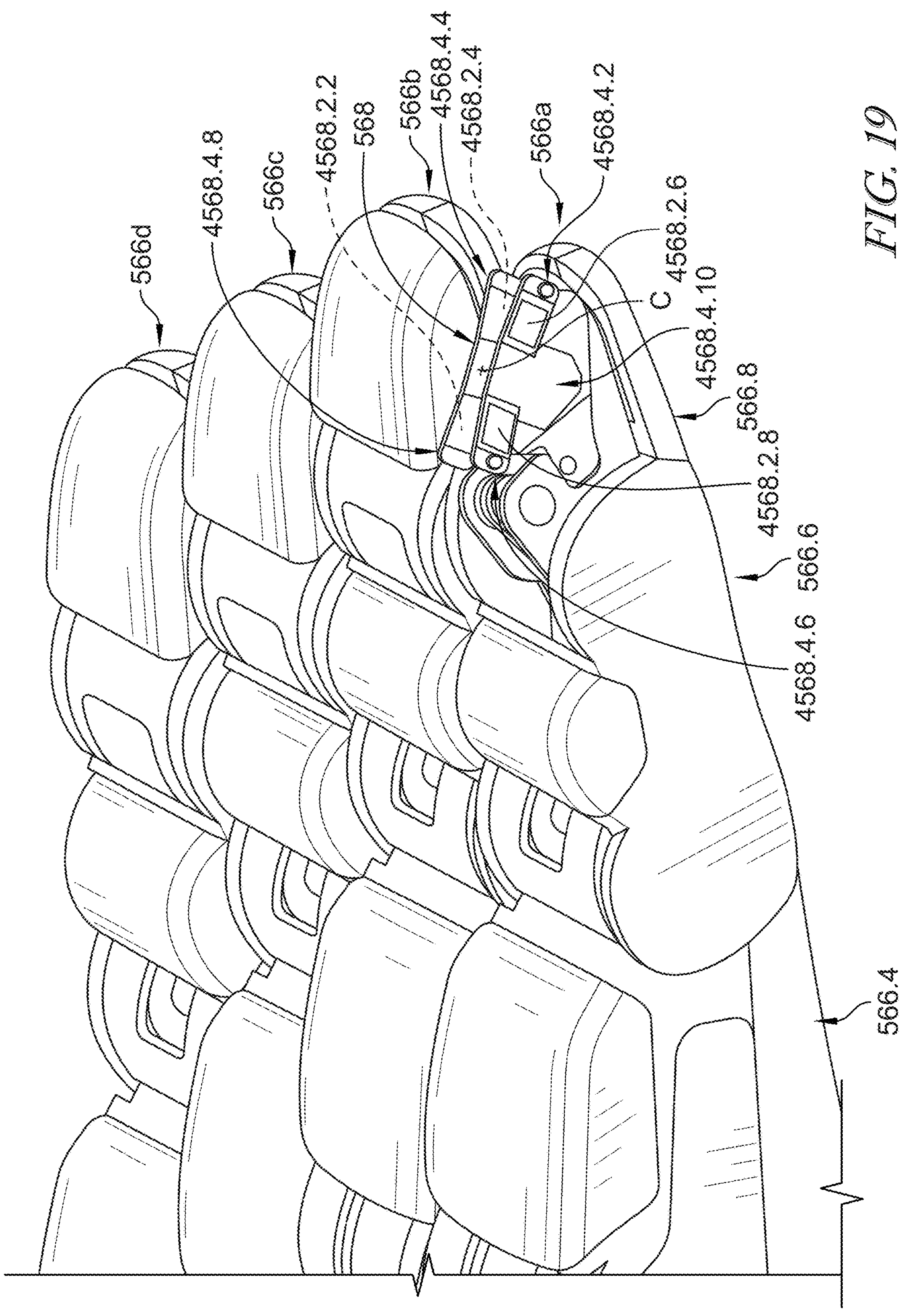
FIG. 19 is a perspective view of a fifth embodiment of the end effector of FIGS. 8-10, wherein components of the distal assembly of a finger assembly have been removed to show a portion of a fifth embodiment of a sensor assembly contained therein that includes a further version of a strain gauge bridge.

FIG. 19 illustrates a fifth embodiment of a tactile sensor assembly 4568 configured to measure an array of triaxial forces or a load experienced by and/or applied to the respective finger assembly 566a-566d. The sensor assembly 4568 includes a mount member or bridge 4568.4 and a plurality of strain gauges 4568.2.2, 4568.2.4, 4568.2.6, 4568.2.8 coupled to the bridge 4568.4 like in the embodiment of FIGS. 17 and 18. A strain gauge 4568.2.2, 4568.2.4, 4568.2.6, 4568.2.8 is positioned at each corner of the bridge 4568.4 so the force at each corner may be measured and used to determine a centroid of the force. As shown in FIG. 19, the bridge 4568.4 has a different shape compared to the bridge in the embodiment of FIGS. 17 and 18. The bridge 4568.4 has: (i) a center post 4568.4.10 and (ii) four arms 4568.4.2, 4568.4.4, 4568.4.6, 4568.4.8 that extend outward from a center point C of the center post 4568.4.10 and are angled relative to each other. In some embodiments, the bridge 4568.4 may have a different number of mount arms.

The bridge 3568.4, 4568.4 may have any suitable shape to enable a plurality of strain gauges to be mounted thereto (e.g. rectangular, triangular, circular, oval, square, pentagonal, hexagonal, octagonal, trapezoidal, rhombus, parallelogram, ellipsoid, crescent, star-shaped, heart-shaped, diamond-shaped, heptagonal, decagonal, semicircular, sphere, cylinder, cone, pyramid, torus, dodecagon, scalene triangle, isosceles triangle, equilateral triangle, oblong, kite-shaped, and prism-shaped, etc.).

c. Seventh Embodiment

Figures 22, 23:
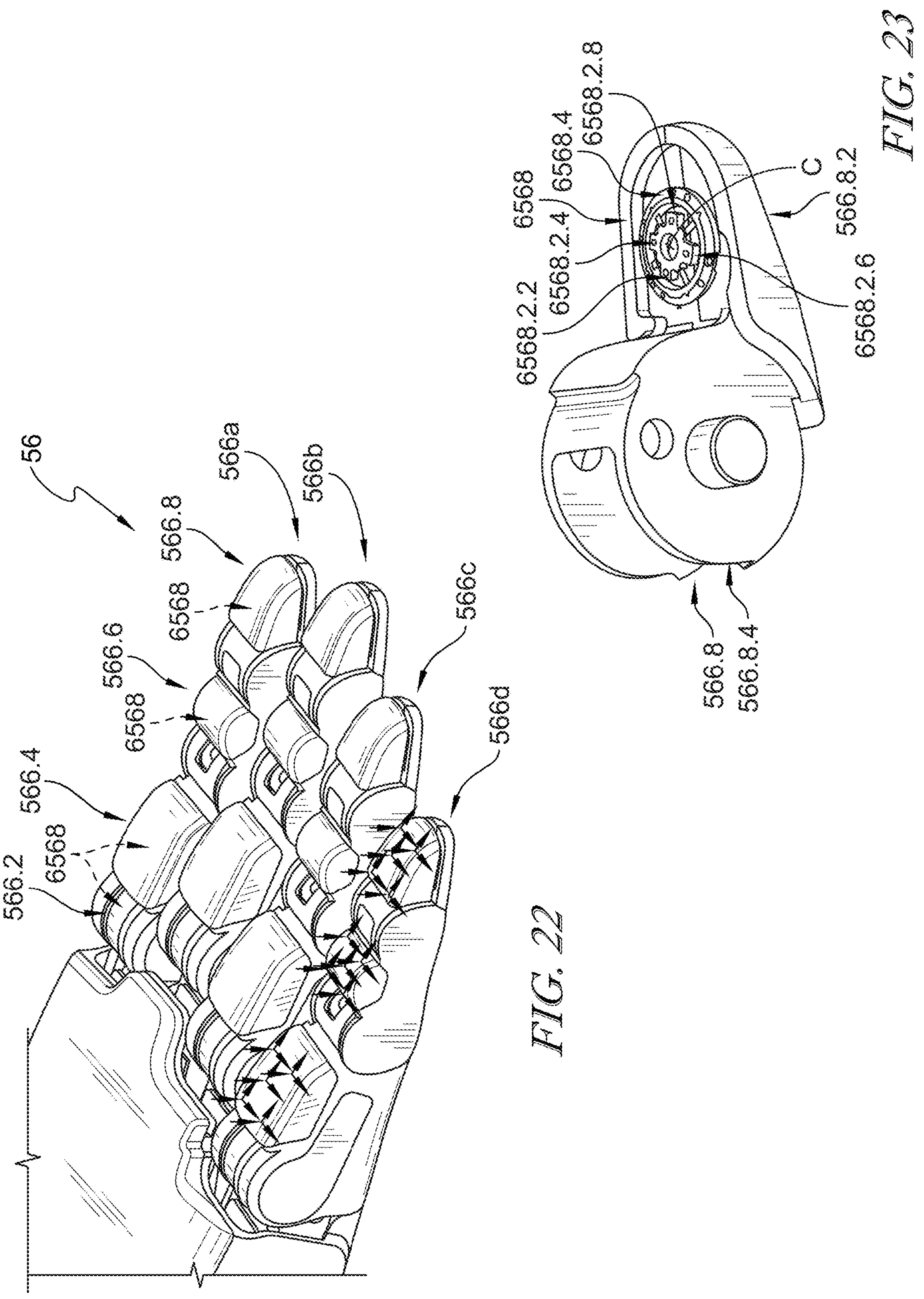
FIG. 22 is a partial perspective view of a seventh embodiment of the end effector of FIGS. 8-10, and wherein said end effector includes a seventh embodiment of a sensor assembly configured to measure the application of a plurality of triaxial forces on at least one component of the end effector.
FIG. 23 is a perspective view of the distal assembly of FIG. 22, wherein components of the distal assembly of a finger assembly have been removed to show a portion of the seventh embodiment of the sensor assembly contained therein that includes a circular-shaped strain gauge bridge.

FIGS. 22 and 23 illustrate a seventh embodiment of a tactile sensor assembly 6568 configured to measure an array of triaxial forces or a load experienced by and/or applied to the respective finger assembly 566a-566d. The tactile sensor assembly 6568 includes: (i) a circular bridge 6568.4 and (ii) a plurality of strain gauges 6568.2.2, 6568.2.4, 6568.2.6, 6568.2.8 coupled to the bridge 6568.4 such that the strain gauges are spaced apart around a centroid C. It should be understood that this tactile sensor assembly 6568 may use any components, aspect, and/or technology that is disclosed above or below in whole or in part.

d. Eighth Embodiment

Figures 28, 29:
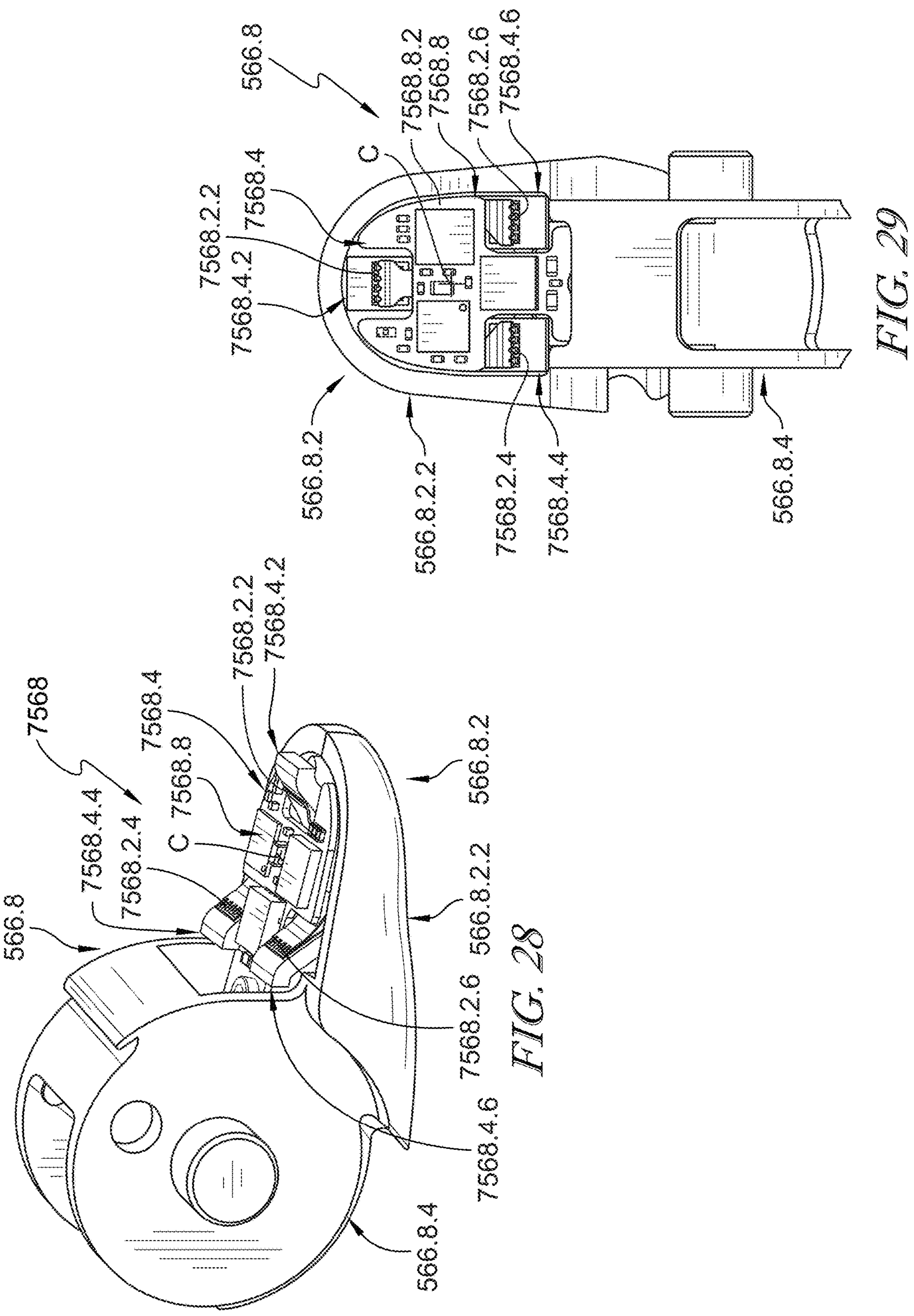
FIG. 28 is a perspective view of the eighth embodiment of the distal assembly of FIG. 24, wherein the finger energy attenuation member and the force distributor member have been removed to show the bridge, the strain gauges, and the electronics assembly included in the eighth embodiment of the sensor assembly.
FIG. 29 is a top view of the eighth embodiment of the distal assembly of FIG. 28.
Figures 32, 33:
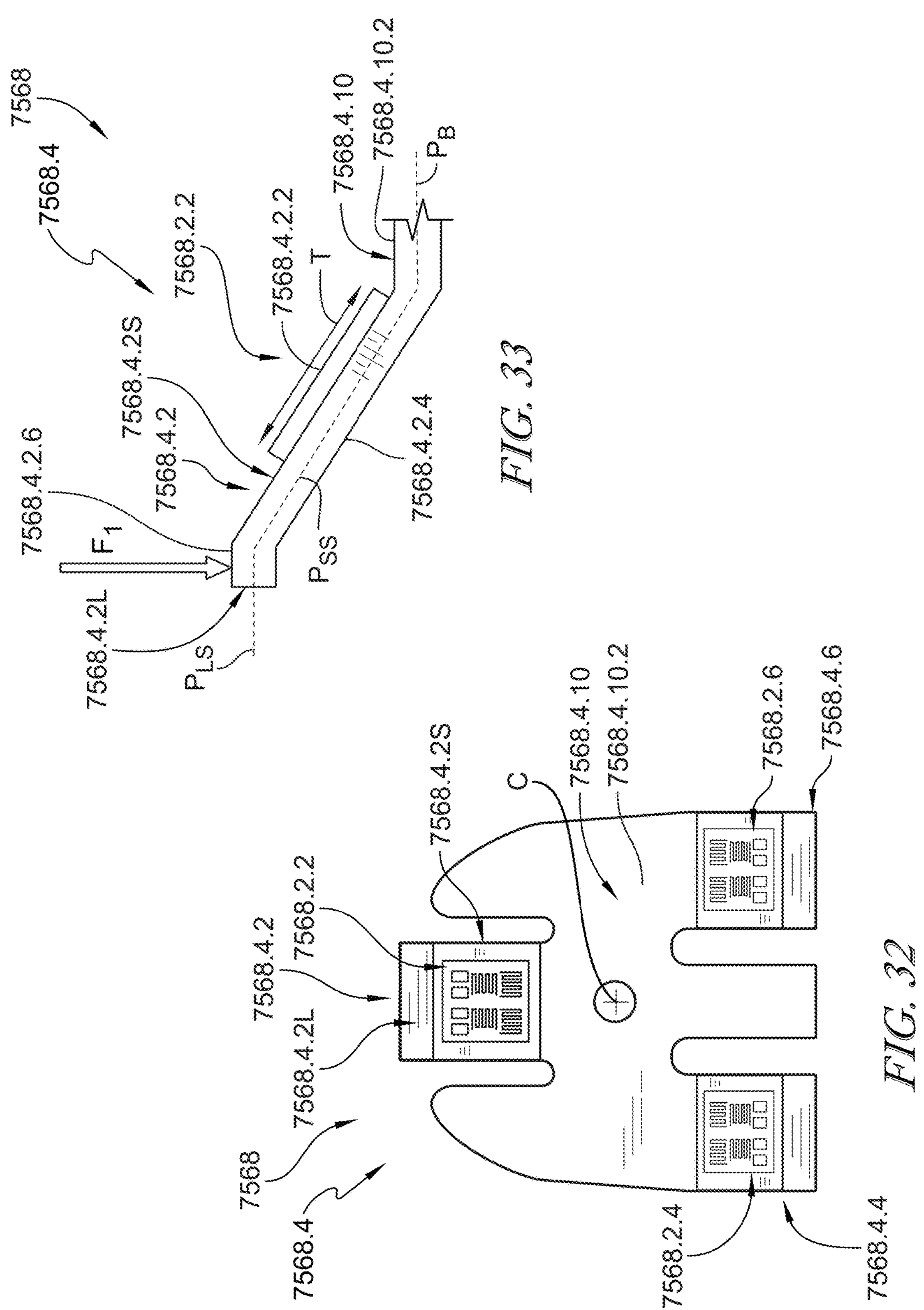
FIG. 32 is a top view of the bridge and strain gauges of FIG. 31, and showing: (i) the bridge with a base, and a plurality of flexure arms that extend upward and away from the base at locations spaced apart from one another, and (ii) a plurality of strain gauges, and wherein one strain gauge of the plurality of strain gauges is coupled to a flexure arm of the plurality of flexure arms.
FIG. 33 is a side view of a portion of the flexure arm of FIGS. 31-32, and wherein a strain gauge is coupled to an outer surface of a sloped section of the flexure arm.

FIGS. 24-33 illustrate an eighth embodiment of a tactile sensor assembly 7568. The tactile sensor assembly 7568 includes: (i) a bridge 7568.4 and (ii) a plurality of strain gauges 7568.2.2, 7568.2.4, 7568.2.6 coupled to the bridge 7568.4 such that the strain gauges are equally spaced apart about a centroid C. The bridge 7568.4 has a base section 7568.4.10 that is coupled to the base member 566.8.2.2 of the distal assembly 566.8 and a plurality of flexure arms 7568.4.2, 7568.4.4, 7568.4.6 that extend upward and away from the base section 7568.4.10 at locations around the centroid C as shown in FIGS. 28 and 32. In the illustrative embodiment, the bridge 7568.4 includes three flexure arms 7568.4.2, 7568.4.4, 7568.4.6, wherein a first flexure arm 7568.4.2 extends in a first direction from the centroid C of the base 7568.4.10, a second flexure arm 7568.4.4 extends in a second direction opposite the first direction parallel to and away from the first flexure arm 7568.4.2, and a third flexure arm 7568.4.6 extends in the second direction away from the first flexure arm 7568.4.2 and parallel to both the first flexure arm 7568.4.2 and the second flexure arm 7568.4.4. Each strain gauge 7568.2.2, 7568.2.4, 7568.2.6 is coupled to one of the flexure arms 7568.4.2, 7568.4.4, 7568.4.6 of the bridge 7568.4.

Figures 30, 31:
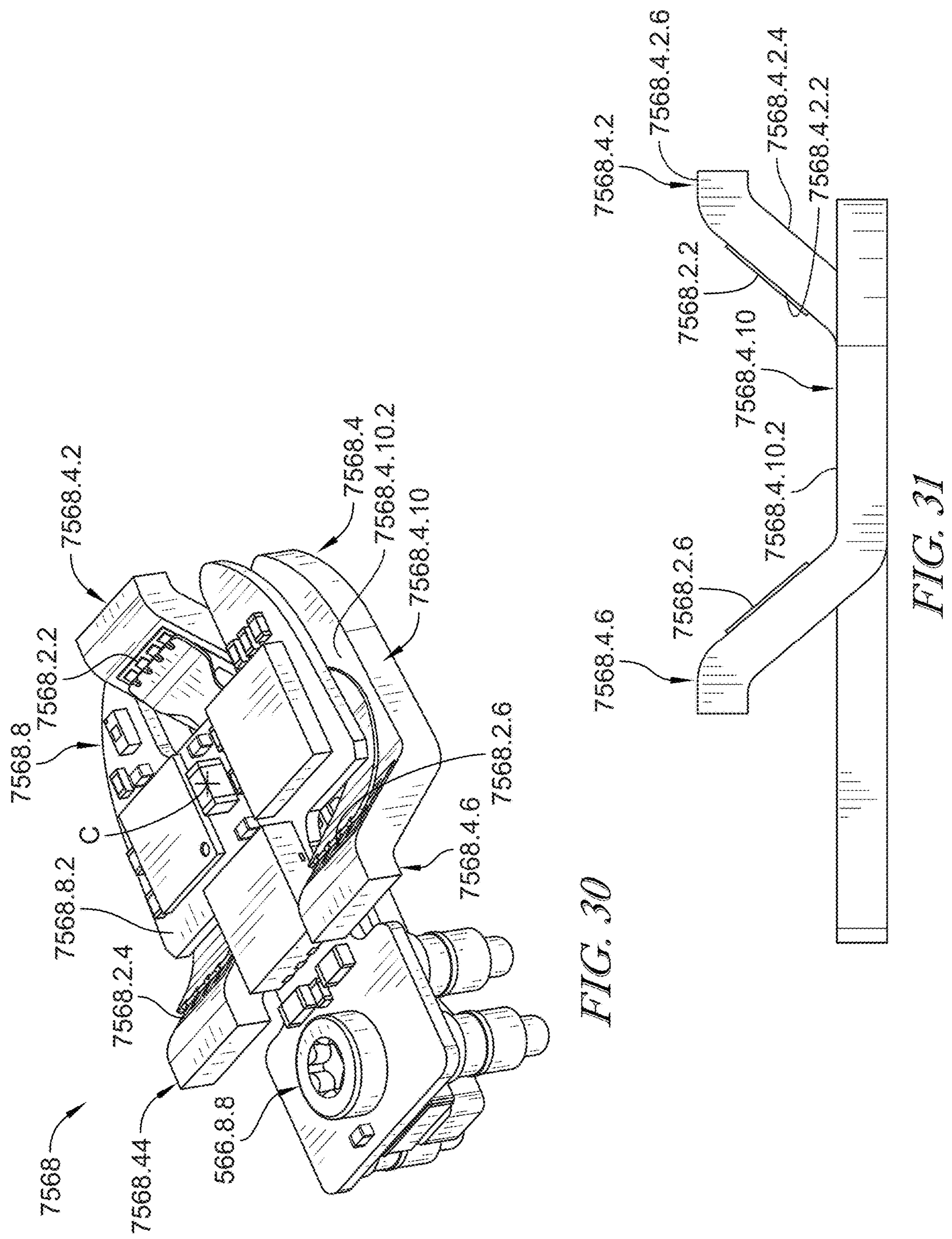
FIG. 30 is a perspective view of a portion of the eighth embodiment of the sensor assembly included in the distal assembly of FIGS. 24-29.
FIG. 31 is a side view of the bridge and the strain gauges included in the eighth embodiment of the sensor assembly of FIGS. 24-30.

Each flexure arm 7568.4.2, 7568.4.4, 7568.4.6 is spaced apart from the adjacent flexure arms 7568.4.2, 7568.4.4, 7568.4.6. Additionally, each flexure arm 7568.4.2, 7568.4.4, 7568.4.6 has: (i) a sloped section 7568.4.2S and (ii) a load section 7568.4.2L as shown in FIGS. 31 and 33. The sloped section 7568.4.2S extends upward and outward away from the base section 7568.4.10 at a first non-zero angle 7568.4.2A (e.g., between 1 degree and 60 degrees, preferably near 45 degrees) relative to the base section 7568.4.10. The first non-zero angle 7568.4.2A is measured as an interior angle between a dominant plane ($P_B$) of the base section 7568.4.10 and a dominant plane ($P_{SS}$) of the sloped section 7568.4.2S. In other embodiments, the sloped section 7568.4.2S may extend downward and outward away from the base section 7568.4.10 at the first non-zero angle (e.g., between 1 degree and 60 degrees, preferably near 45 degrees) relative to the base section 7568.4.10.

The load section 7568.4.2L extends from the sloped section 7568.4.2S at a second non-zero angle 7568.4.2B from the sloped section 7568.4.2S. In one embodiment, the load section 7568.4.2L extends such that its contact surface 7568.4.2.6 is substantially parallel to the base section 7568.4.10. The second non-zero angle 7568.4.2B is measured as an interior angle between the dominant plane ($P_{SS}$) of the sloped section 7568.4.2S and a dominant plane ($P_{LS}$) of the load section 7568.4.2L. The dominant plane ($P_B$) of the base section 7568.4.10 is parallel with an outer surface 7568.4.10.2 of the base section 7568.4.10, the dominant plane ($P_{SS}$) of the sloped section 7568.4.2S is parallel with an outer surface 7568.4.2.2 and inner surface 7568.4.2.4 of the sloped section 7568.4.2S, and the dominant plane ($P_{LS}$) of the load section 7568.4.2L is parallel with an outer or contact surface 7568.4.2.6 of the load section 7568.4.2L as shown in FIG. 33. The base section, sloped section, and load section may all be substantially planar structures.

The load sections of all three flexure arms may be substantially arranged in a planar circle. Each first non-zero angle may be measured between an outer surface of the base and an outer surface of the sloped section of the respective flexure arm, wherein the outer surface of the sloped section extends from the outer surface of the base. Each second non-zero angle may be measured between the outer surface of the respective flexure arm and a contact surface of the respective load section that extends from the outer surface of the respective flexure arm. When acted on vertically, the flexure arms 7568.4.2, 7568.4.4, 7568.4.6 deflect or bend relative to the base section 7568.4.10.

Each flexure arm 7568.4.2, 7568.4.4, 7568.4.6 is made from a semi-deformable material, whose deformation is well-known over a wide range of environmental conditions (e.g., temperature). For example, the flexure arms 7568.4.2, 7568.4.4, 7568.4.6 may be made from constantan, karma, isoelastic alloys, beryllium copper, nichrome, platinum-tungsten alloys, silicon, germanium, polyimide, epoxy-phenolic resins, cyanoacrylate, epoxy, manganin, or copper. Therefore, each flexure arm 7568.4.2, 7568.4.4, 7568.4.6 is configured to repeatably deform a known amount in response to a known force applied normal to the load section 7568.4.2L of the respective flexure arm 7568.4.2, 7568.4.4, 7568.4.6 and return to a non-deformed state when the known force is removed. It should be understood that the flexure arms 7568.4.2, 7568.4.4, and 7568.4.6 may not be substantially deformable and instead may be slightly deformable given 30-45 PSI.

For each flexure arm of the three flexure arms, a separate strain gauge 7568.2.2, 7568.2.4, 7568.2.6 is coupled to the sloped section 7568.4.25 of the respective flexure arm 7568.4.2, 7568.4.4, 7568.4.6 as shown in FIGS. 31 and 33. One or more of the strain gauges 7568.2.2, 7568.2.4, 7568.2.6 may be screen printed onto the sloped section 7568.4.2S of the respective flexure arm. As shown in FIGS. 31-33, the sensor assembly 7568 only includes strain gauges 7568.2.2, 7568.2.4, 7568.2.6 on one side of the respective flexure arm 7568.4.2, 7568.4.4, 7568.4.6. Each strain gauge 7568.2.2, 7568.2.4, 7568.2.6 is coupled to the outer surface 7568.4.2.2 of the sloped section 7568.4.2S in the illustrative embodiment. In other embodiments, the sensor assembly 7568 may have upper and lower strain gauges on each flexure arm 7568.4.2, 7568.4.4, 7568.4.6 as discussed in further detail below.

As shown in FIGS. 31-33, the plurality of strain gauges 7568.2.2, 7568.2.4, 7568.2.6 are T-Rosette strain gauges. When an external force is applied normal to the contact surface of the load section 7568.4.2L of the respective flexure arm 7568.4.2, the respective strain gauge 7568.2.2, 7568.2.4, 7568.2.6 is subject to a tensile force T. In other embodiments, the plurality of strain gauges 7568.2.2, 7568.2.4, 7568.2.6 may be linear strain gauges, any other strain gauge, and/or include any strain gauge technology disclosed herein.

Figures 24, 25:
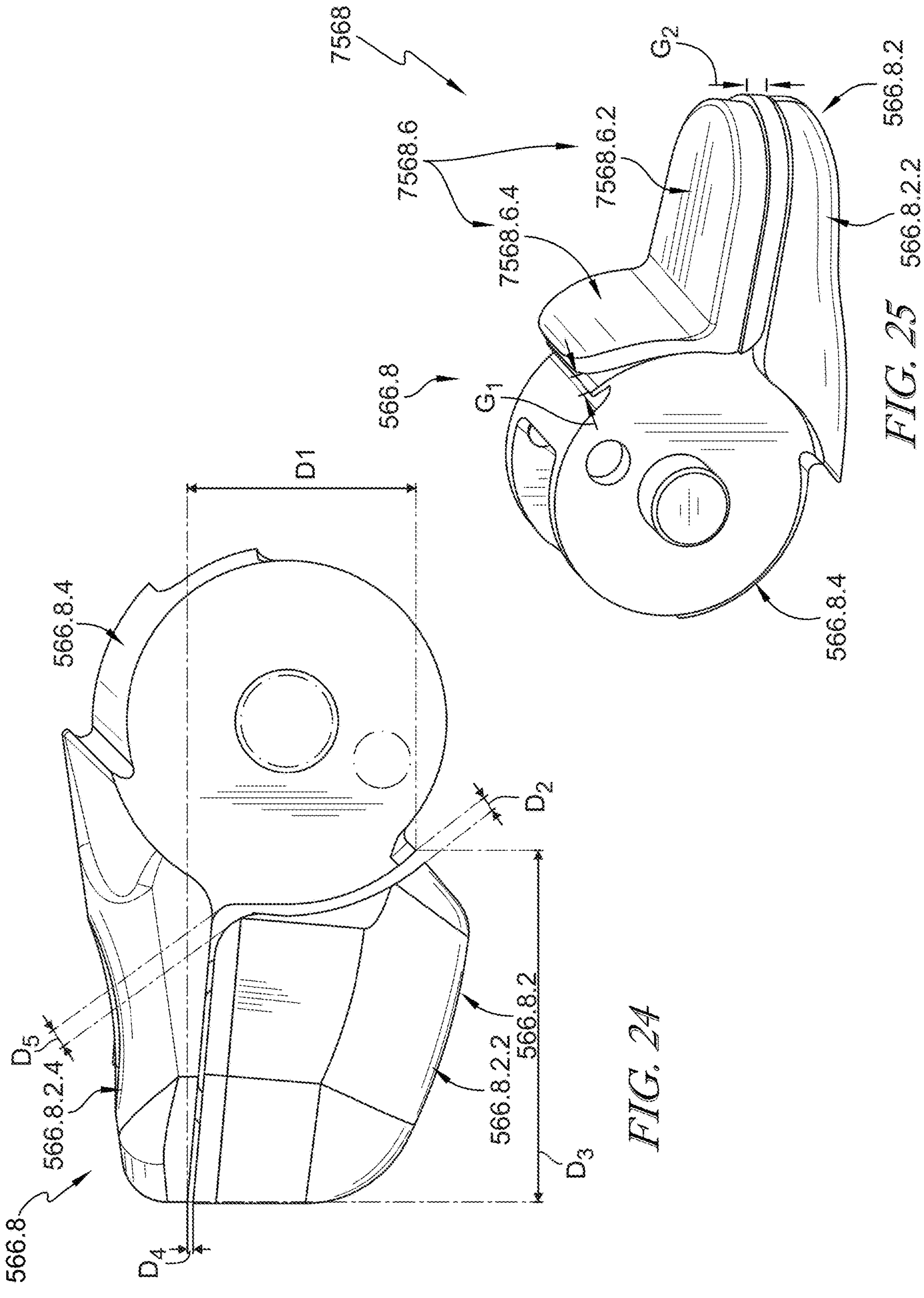
FIG. 24 is a side view of an eighth embodiment of a distal assembly included in one of the finger assemblies of FIGS. 8-10, wherein said distal assembly includes (i) a distal housing assembly, (ii) a distal link assembly, and (iii) an eighth embodiment of a sensor assembly positioned within said distal housing assembly.
FIG. 25 is a perspective view of the eighth embodiment of the distal assembly of FIG. 24, wherein the finger energy attenuation member has been removed to reveal a force distributor member of the eighth embodiment of the sensor assembly.
Figures 26, 27:
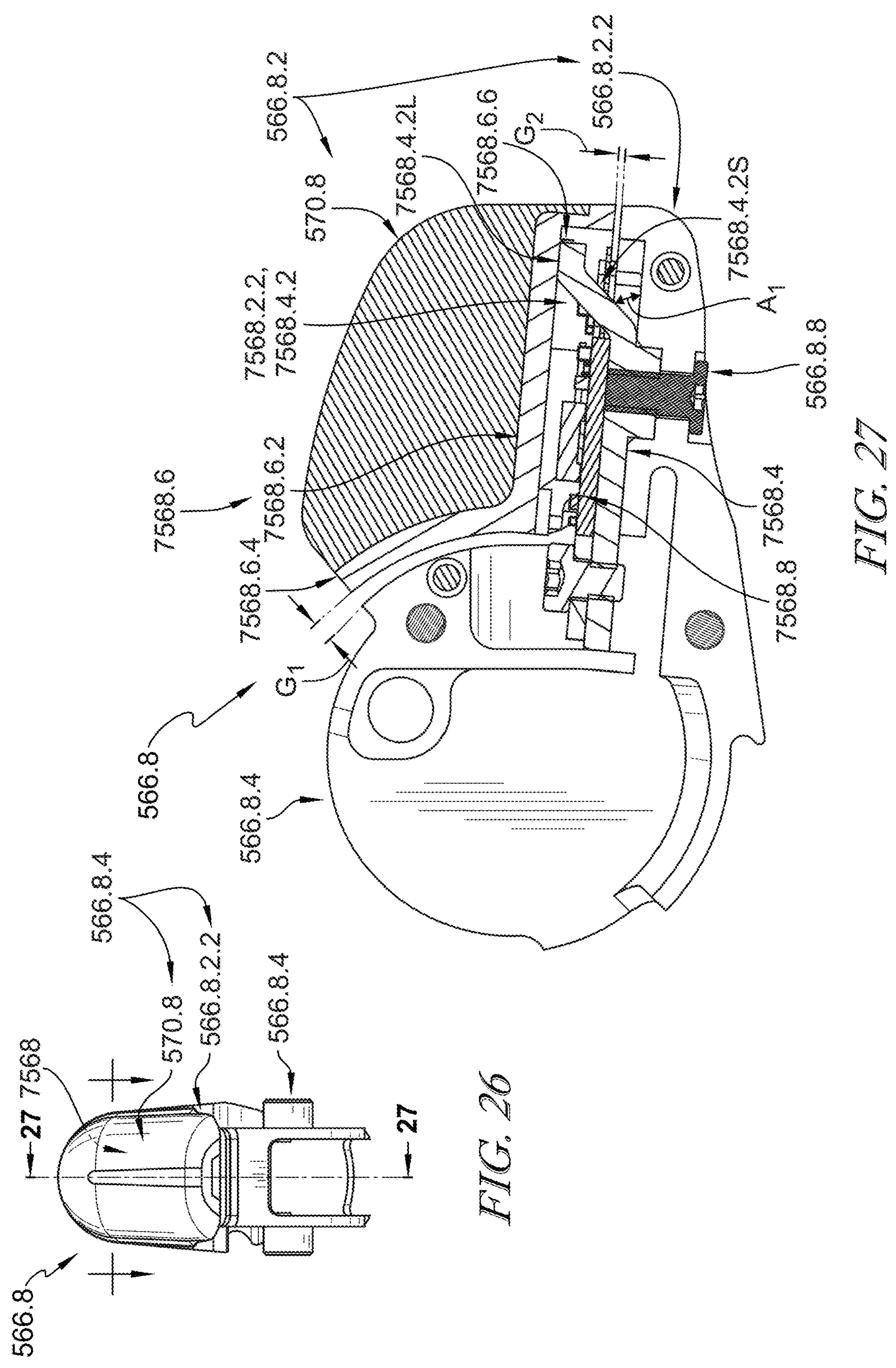
FIG. 26 is a palm view of the eighth embodiment of the distal assembly of FIG. 24.
FIG. 27 is a cross-sectional view of the eighth embodiment of the distal assembly taken along line 27-27 in FIG. 26 showing that the distal assembly includes: (i) the eighth embodiment of the sensor assembly having the force distributor member, a bridge, a plurality of strain gauges that are coupled to the bridge, and an electronics assembly coupled to the strain gauges, (ii) the distal housing assembly and a finger energy attenuation member with a single region, and (iii) the distal link assembly.

As shown in FIGS. 25 and 27, the end effector and sensor assembly 7568 may further comprise a force distributor member 7568.6. The force distributor member 7568.6 is configured to receive a force from the energy attenuation member 570.8 and distribute the received force to only the flexure arms 7568.4.2, 7568.4.4, 7568.4.6, while preventing overloading of the strain gauges 7568.2.2, 7568.2.4, 7568.2.6. To do this, the force distributor member 7568.6 overlies and is coupled to an extent of the bridge 7568.4, while underlying the finger energy attenuation member 570.8 of the distal housing assembly 566.8.2. Specifically, the force distributor member 7568.6 is engaged with the contact surface of the load sections 7568.4.2L of the flexure arms 7568.4.2, 7568.4.4, 7568.4.6 to distribute the force thereto.

The force distributor member 7568.6 is configured to move towards the base section of the bridge, while causing deformation or flexing of one or more of the flexure arms 7568.4.2, 7568.4.4, 7568.4.6 in response to a force applied to the force distributor member 7568.6. The movement of the force distributor member 7568.6 is limited to a predetermined amount of movement towards each of the flexure arms 7568.4.2, 7568.4.4, 7568.4.6 via a physical hard stop (i.e., the base member 566.8.2.2 of the distal housing assembly 566.8.2). A gap exists between an extent of the housing and the force distributor member, and this gap is closed when a sufficient force is applied, at which point the extent acts as the physical hard stop preventing further movement of the force distributor member. The tolerances, or gaps G1, G2, between the force distributor member and an extent of the distal housing assembly (e.g., the base member 566.8.2.2) prevent overloading of the strain gauges 7568.2.2, 7568.2.4, 7568.2.6 by limiting the deflection or bending of the flexure arms.

The force distributor member 7568.6 has (i) a distributor base 7568.6.2, (ii) an extension flange 7568.6.4, and (iii) location tabs 7568.6.6 as shown in FIGS. 25 and 27. The distributor base 7568.6.2 extends over the bridge 7568.4. The extension flange 7568.6.4 extends upward and away from the distributor base 7568.6.2 at an angle relative to the distributor base 7568.6.2. The location tabs 7568.6.6 engage the load sections 7568.4.2L of the flexure arms 7568.4.2, 7568.4.4, 7568.4.6 to position the force distribution member 7568.6 in the desired position. In other embodiments, the force distributor member 7568.6 may be omitted or integrally formed with the base member 566.8.2.2 and/or the distal housing assembly 566.8.2.

The energy attenuation member may be made from or include an elastic or compliant material (e.g., silicone rubber, thermoplastic elastomers (TPE), polyurethane elastomers, nitrile rubber (NBR), ethylene propylene diene monomer (EPDM) rubber, latex rubber, thermoplastic polyurethane (TPU), hydrogels, dielectric elastomers, liquid crystal elastomers (LCEs), shape memory alloys (SMA), polyethylene and polypropylene elastomers, conductive elastomers, elastomeric foams, biodegradable elastomers (e.g., PLA blends), liquid metal alloys (e.g., gallium-based alloys), carbon fiber-reinforced elastomers, gel materials, and smart materials like magnetorheological elastomers, or plastics or polymers), while the force distributor member 7568.6 is made of a rigid material (e.g., aluminum alloys, stainless steel, titanium alloys, carbon fiber composites, fiberglass, polycarbonate, ABS plastic, PEEK (polyether ether ketone), PETG (polyethylene terephthalate glycol), nylon (polyamide), high-density polyethylene (HDPE), PVC (polyvinyl chloride), acrylic (PMMA), glass-filled nylon, magnesium alloys, ceramics, composite laminates, and/or other metals, plastics, or polymers).

As shown in FIGS. 27-28, the sensor assembly 7568 further includes an electronics assembly 7568.8. The electronics assembly 7568.8 is communicatively coupled to the strain gauges 7568.2.2, 7568.2.4, 7568.2.6 as shown in FIG. 28. The electronics assembly 7568.8 is configured to process data received from each strain gauge 7568.2.2, 7568.2.4, 7568.2.6. More specifically, the electronics assembly 7568.8, which may include amplifiers, analog-to-digital converters, and a microcontroller, is configured to: (i) receive signals from each strain gauge 7568.2.2, 7568.2.4, 7568.2.6 as input, (ii) process the received data or signals, and (iii) output processed data or information based on the received signals. The strain gauges can also indirectly detect a shearing force that is applied to the energy attenuation member. A lateral or shear force on the fingertip produces a differential loading pattern across the three flexure arms, and the electronics assembly can process this differential signal to calculate the magnitude and direction of the shear force.

The electronics assembly 7568.8 of the sensor assembly 7568 includes a printed circuit board 7568.8.2 located (i) between the bridge 7568.4 and the force distributor member 7568.6 and (ii) at least partially between the three flexure arms 7568.4.2, 7568.4.4, 7568.4.6 as shown in FIG. 28. In this way, a single fastener 566.8.8 may be used to couple the electronics assembly 7568.8 and the bridge 7568.4, with the strain gauges 7568.2.2, 7568.2.4, 7568.2.6 coupled thereto, to the base member 566.8.2.2 of the distal housing assembly 566.8.2. The fastener 566.8.8 would extend through the base member 566.8.2.2 of the distal housing assembly 566.8.2 (i.e. the finger nail side) allowing for fast, easy removal. In some cases, this arrangement may allow for hot swapping of the components (i.e. adding or removing components to the assembly while the system is still powered on). For example, the sensor assembly 7568 (or any sensor assembly described herein) may include any type of known connector that allows for hot swapping, which includes magnetic spring-loaded pogo pin connectors, snap-fit with flat contacts, twist-lock circular connectors, flexible PCB/flat-flex cable connectors, and/or optical/electromagnetic inductive couplers.

e. Ninth Embodiment

Figures 34, 35, 36:
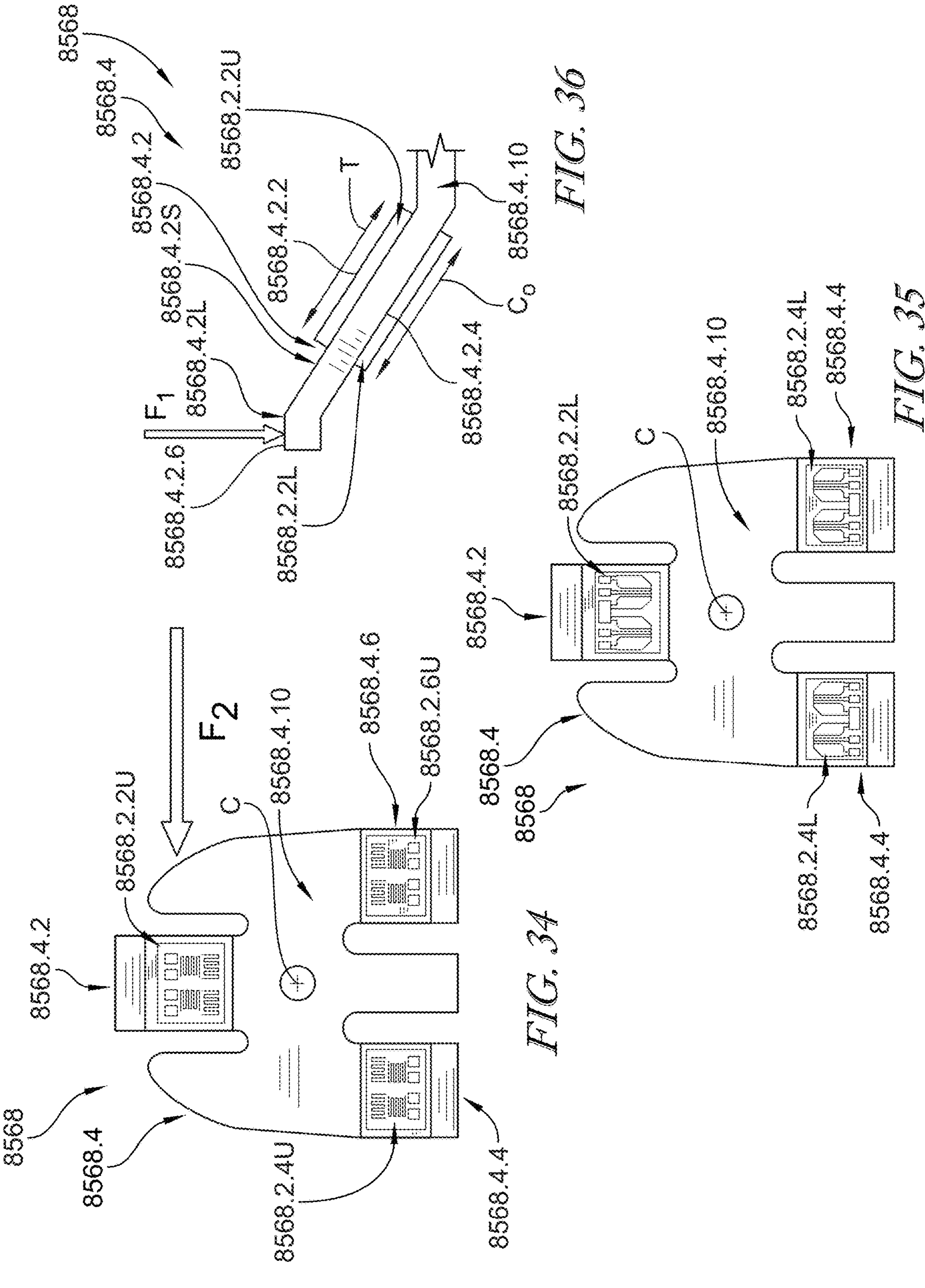
FIG. 34 is a top view of a bridge and strain gauges contained in a ninth embodiment of a sensor assembly, wherein: (i) the bridge includes a base, and a plurality of flexure arms that extend upward and away from the base at locations spaced apart from one another, and (ii) a plurality of upper strain gauges, and wherein one upper strain gauge of the plurality of upper strain gauges is coupled to each sloped upper surface of a flexure arm of the plurality of flexure arms.
FIG. 35 is a bottom view of a bridge and strain gauges contained in a ninth embodiment of a sensor assembly, and wherein the strain gauges further include a plurality of lower strain gauges, and wherein one lower strain gauge of the plurality of lower strain gauges is coupled to each sloped lower surface of a flexure arm of the plurality of flexure arms.
FIG. 36 is a side view of a portion of the flexure arm of FIGS. 34-35, and wherein an upper strain gauge is coupled to an upper surface of a sloped section of the flexure arm and a lower strain gauge is coupled to a lower surface of a sloped section of the flexure arm.

FIGS. 34-36 illustrate a ninth embodiment of a tactile sensor assembly 8568. Similar to the embodiment of FIGS. 24-33, the tactile sensor assembly 8568 includes: (i) a bridge 8568.4 and (ii) a plurality of strain gauges 8568.2.2U, 8568.2.2L, 8568.2.4U, 8568.2.4L, 8568.2.6U, 8568.2.6L coupled to flexure arms 8568.4.2, 8568.4.4, 8568.4.6 of the bridge 8568.4 such that the strain gauges are spaced apart around a centroid C. However, for each flexure arm of the three flexure arms, the sensor assembly 8568 includes upper and lower strain gauges 8568.2.2U, 8568.2.2L, 8568.2.4U, 8568.2.4L, 8568.2.6U, 8568.2.6L on each flexure arm 8568.4.2, 8568.4.4, 8568.4.6. In particular, the disclosed tactile sensor assembly 8568 includes a plurality of T-Rosette strain gauges 8568.2.2U, 8568.2.4U, 8568.2.6U and a plurality of shear-strain gauges 8568.2.2L, 8568.2.4L, 8568.2.6L. The lateral force on the flexure arms 8568.4.2, 8568.4.4, 8568.4.6 is measured by the lower strain gauges 8568.2.2L, 8568.2.4L, 8568.2.6L.

The bridge 8568.4 of the sensor assembly 8568 is substantially similar to the bridge 7568.4 in FIGS. 28-32. The bridge 8568.4 has: (i) a base section 8568.4.10 and a plurality of flexure arms 8568.4.2, 8568.4.4, 8568.4.6, illustratively three flexure arms, that extend upward and away from the base section 8568.4.10 at circumferential locations around the centroid C. Each flexure arm 8568.4.2, 8568.4.4, 8568.4.6 has: (i) a sloped section 8568.4.2S and (ii) a load section 8568.4.2L as shown in FIG. 32. When acted on vertically, the flexure arms 8568.4.2, 8568.4.4, 8568.4.6 deflect or bend relative to the base 8568.4.10.

Each strain gauge 8568.2.2U, 8568.2.2L, 8568.2.4U, 8568.2.4L, 8568.2.6U, 8568.2.6L is coupled to the sloped section 8568.4.2S of the respective flexure arm 8568.4.2, 8568.4.4, 8568.4.6 as shown in FIG. 36. The upper strain gauge 8568.2.2U, 8568.2.4U, 8568.2.6U is coupled an outer surface 8568.4.2.2 of the respective flexure arm 8568.4.2, 8568.4.4, 8568.4.6 and the lower strain gauge 8568.2.2L, 8568.2.4L, 8568.2.6L is coupled to an inner surface 8568.4.2.4 of the flexure arm 8568.4.2 opposite the outer surface 8568.4.2.2 so that the upper and lower strain gauges are aligned but on opposite sides of the flexure arm. When an external force is applied normal to a contact surface of the load section 8568.4.2L of the respective flexure arm 8568.4.2, 8568.4.4, 8568.4.6, the upper strain gauge 8568.2.2U, 8568.2.4U, 8568.2.6U is subject to a tensile force T, while the lower strain gauge 8568.2.2L, 8568.2.4L, 8568.2.6L is subject to a compressive force $C_O$ to measure the bending strain.

f. Tenth Embodiment

Figures 37, 38:
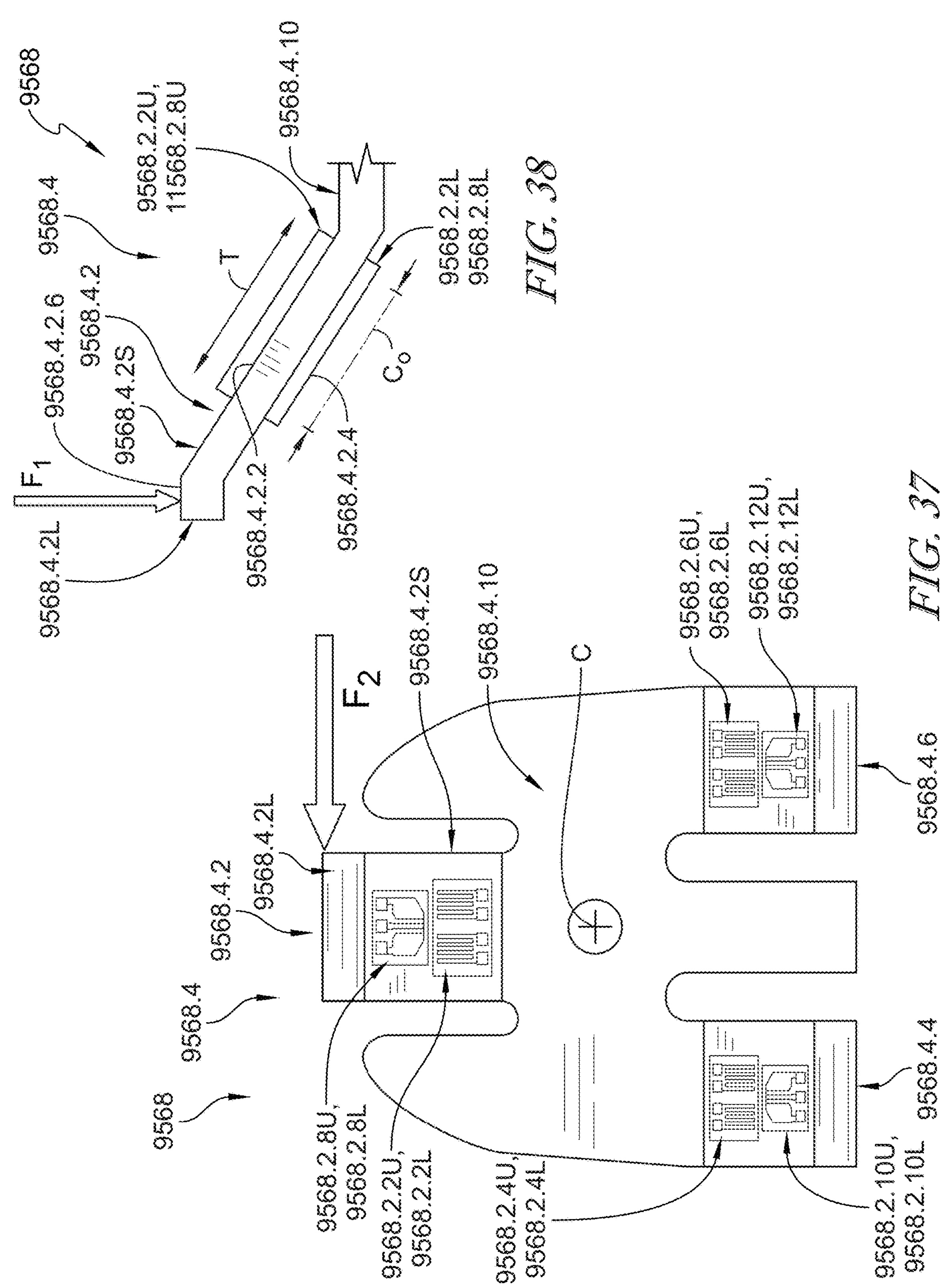
FIG. 37 shows top and bottom views of a bridge and strain gauges contained in a tenth embodiment of a sensor assembly, wherein: (i) the bridge includes a base, and a plurality of flexure arms that extend upward and away from the base at locations spaced apart from one another, and (ii) a plurality of strain gauges, and wherein two upper strain gauges of a plurality of upper strain gauges are coupled to each sloped upper surface of a flexure arm of the plurality of flexure arms, and two lower strain gauges of a plurality of lower strain gauges are coupled to each sloped lower surface of a flexure arm of the plurality of flexure arms.
FIG. 38 is a side view of a portion of the flexure arm of FIG. 37, and wherein two upper strain gauges are coupled to an upper surface of a sloped section of the flexure arm and two lower strain gauges are coupled to a lower surface of a sloped section of the flexure arm.

FIGS. 37 and 38 show a tenth embodiment of a tactile sensor assembly 9568. Similar to the embodiment of FIGS. 24-33, the tactile sensor assembly 9568 includes: (i) a bridge 9568.4 and (ii) a plurality of strain gauges 9568.2.2U, 9568.2.2L, 9568.2.4U, 9568.2.4L, 9568.2.6U, 9568.2.6L, 9568.2.8U, 9568.2.8L, 9568.2.10U, 9568.2.10L, 9568.2.12U, 9568.2.12L coupled to flexure arms 9568.4.2, 9568.4.4, 9568.4.6 of the bridge 9568.4 such that the strain gauges are spaced apart around a centroid C. The top side of the sensor assembly 9568 is identical to the bottom side such that two strain gauges are coupled to an outer surface 9568.4.2.2 of each flexure arm 9568.4.2, 9568.4.4, 9568.4.6 and two strain gauges are coupled to an inner surface 9568.4.2.4 of each flexure arm 9568.4.2, 9568.4.4, 9568.4.6 opposite the outer surface 9568.4.2.2 as shown in FIGS. 37 and 38. However, unlike the embodiment in FIGS. 24-33, the sensor assembly 9568 further includes: (i) a plurality of linear strain gauges and (ii) a plurality of shear strain gauges. The lateral force on the flexure arm is measured by the shear-strain gauges.

However, unlike the embodiment in FIGS. 28-30, the sensor assembly 9568 further includes: (i) a plurality of linear strain gauges 9568.2.2U, 9568.2.2L, 9568.2.4U, 9568.2.4L,9568.2.6U, 9568.2.6L, and (ii) a plurality of shear strain gauges 9568.2.8U, 9568.2.8L, 9568.2.10U, 9568.2.10L,9568.2.12U, 9568.2.12L as shown in FIGS. 37 and 38. The lateral force on the flexure arms 9568.4.2, 9568.4.4, 9568.4.6 is measured by the shear-strain gauges 9568.2.8U, 9568.2.8L, 9568.2.10U, 9568.2.10L, 9568.2.12U, 9568.2.12L.

The bridge 9568.4 of the sensor assembly 9568 is substantially similar to the bridges 7568.4 and 8568.4 in FIGS. 28-36. The bridge 9568.4 has: (i) a base section 9568.4.10 and (ii) a plurality of flexure arms 9568.4.2, 9568.4.4, 9568.4.6, illustratively three flexure arms, that extend upward and away from the base section 9568.4.10 at circumferential locations around the centroid C. Each flexure arm 9568.4.2, 9568.4.4, 9568.4.6 has: (i) a sloped section 9568.4.2S and (ii) a load section 9568.4.2L as shown in FIG. 38. When acted on vertically, the flexure arms 9568.4.2, 9568.4.4, 9568.4.6 deflect or bend relative to the base section 9568.4.10. Each strain gauge 9568.2.2, 9568.2.4, 9568.2.6 is coupled to the sloped section of the respective flexure arm 9568.4.2, 9568.4.4, 9568.4.6.

6. Strain Gauges

Any of the following tactile sensor assemblies 568, 1568, 2568, 3568, 4568, 5568, 6568, 7568, 8568, 9568 may include any type of strain gauge including: (i) linear strain gauges, (ii) double linear strain gauges, (iii) shear or torsional strain gauges, (iv) rosette strain gauges (T (or Tee) shaped, rectangular shaped, delta shaped, stacked), (v) diaphragm strain gauges, (vi) biaxial strain gauges, (vii) bidirectional strain gauges, (viii) stacked strain gauges, (ix) cross strain gauges, (x) double shear, (xi) circular, (xii) any hybrid or combination thereof, and/or (xiii) any other suitable strain gauge type that is known to one of skill in the art. The strain gauges may be arranged in different configurations including: (i) quarter-bridge configurations, (ii) half-bridge configurations, and/or (iii) full-bridge configurations.

The strain gauges may also be foil strain gauges, semiconductor strain gauges, thin-film strain gauges, ink based strain gauges, thick-film strain gauges, optical, nanocomposite, and/or any combination or hybrid thereof. Further, the strain gauges may be directly integrated into the housings (interior or exterior), coupled to said housings (interior or exterior) after the housing is manufactured, coupled to another structure (e.g., bridge, spring, etc.) positioned within the housing, integrated into or coupled to the motor or motor housing, positioned between housings, and/or any other known configuration or combination thereof. The foil strain gauges may be made from or include: (i) foils that may be or may include constantan (copper-nickel alloy) karma (nickel-chromium alloy) isoelastic (nickel-iron alloy) evanohm (nickel-chromium alloy) nichrome v (nickel-chromium alloy), and (ii) a carrier that may be or may include polyimide film, epoxy or phenolic resin, glass-fiber reinforced epoxy, ceramic backing, and/or polyurethane. Finally, the strain gauges may be any gauge that meets, uses, and/or was tested with at least one of the following standards: ASTM E251-13(2018), Standard Test Methods for Performance Characteristics of Metallic Bonded Resistance Strain Gages, ASTM International, ISO 376:2011, Metallic materials Calibration of force-proving instruments used for the verification of uniaxial testing machines, ISO 9513:2012, Metallic materials Calibration of extensometer systems used in uniaxial testing, VDI/VDE 2635 Blatt 2, Experimental structural analysis—Recommendation on the implementation of strain measurements at high temperatures, IEC 61298-3:1998, Process measurement and control devices—General methods and procedures for evaluating performance—Part 3: Tests for the effects of influence quantities, DIN 51301, which is hereby incorporated by reference for all purposes. The strain gauges may be used in combination with other sensors in the sensing assembly or at alternate locations in the robot. Other sensors or technology that may replace or be added to the tactile sensor assembles are discussed below.

7. Alternative Embodiments

It should be understood that other sensors and/or technology may be used instead of or in combination with the sensor assemblies discussed above. Other strain gauge technology that may be used includes: (i) mems-based strain gauges, (ii) nanocomposite strain gauges, (iii) thin-film or thick-film strain gauges (e.g., C4A Series or EA Series from Vishay Precision Group, RF9 Series or Y Series from Hottinger Brüel & Kjaer, KFG Series or KFR Series from Kyowa Electronic Instruments, TFSG Series from BCM Sensor Technologies, SGT Series or KFH Series from Omega Engineering, ELF Series or EPL Series from Meggitt Sensing Systems, or any other known manufacturer), (iv) inductive strain gauges, (v) capacitive strain gauges, (vi) piezoelectric strain gauges, (vii) optical fiber strain gauges, (viii) semiconductor strain gauges, and/or (ix) a hybrid or combination thereof. The strain gauges provide measurements with high accuracy, but may lack high resolution. The additional sensors used in combination with the strain gauges in the sensor assembly would help provide a higher resolution. Alternative or additional sensors/technology may include photodiodes, Hall Effect sensors, capacitive sensors, piezoelectric sensors, piezoresistive sensors, optical sensors, force-sensitive resistors (FSRs), magnetic sensors, inductive sensors, micro-electro-mechanical systems (MEMS) sensors, dielectric elastomer sensors, quantum tunneling composite (QTC) sensors, fiber Bragg grating sensors, ultrasonic sensors, thermal sensors, electroactive polymers, triboelectric nanogenerators (TENGs), linear variable differential transformers (LVDTs), flex sensors, acoustic emission sensors, resistive touch sensors, proximity sensors, hydrogel-based sensors, smart skin technologies, magnetoelastic sensors, capacitive micromachined ultrasonic transducers (CMUTs), pressure-sensitive adhesives, electromagnetic acoustic transducers (EMATs), photonic crystal sensors, laser doppler vibrometers, electrical impedance tomography sensors, graphene-based sensors, nanowire sensors, electronic skin (e-skin) sensors, carbon nanotube-based sensors, barometric pressure sensors, eddy current sensors, microfluidic tactile sensors, nanogenerators, stretchable electronic sensors, force torque sensors, rheological sensors, haptic feedback sensors, polymer nanofiber sensors, ionic liquid-based sensors, thermocouple sensors, touch-sensitive field-effect transistors, terahertz radiation sensors, radar sensors, LIDAR sensors, infrared touch sensors, humidity sensors, mechanical limit switches, pressure mapping sensors, distributed fiber optic sensors, magnetostrictive sensors, optoelectronic sensors, surface acoustic wave (SAW) sensors, capaciflectance sensors, tribo-skin sensors, spintronic sensors, photonic touch sensors, acoustic resonant sensors, and capacitive tomography sensors, or any other suitable technology that is known to one of skill in the art.

The advanced tactile sensing system may further include a laminated capacitive taxel matrix embedded within the cover substrate that measures normal pressure distributions with millimeter-scale spatial resolution. This capacitive taxel array can operate independently to generate dense contact maps for object identification, or alternatively be fused with strain-based sensors through a weighted estimator algorithm that produces robust reconstruction of both normal and shear forces across a wide dynamic range, enhancing force measurement accuracy and slip detection capabilities across varying materials and surface properties.

The system may include temperature compensation and self-calibration mechanisms. Said compensation may be achieved by including resistance temperature detectors (RTDs) embedded in each fingertip module that provide time-synchronized readings with tactile sensor sampling, enabling edge microcontroller units to apply per-module lookup tables and parametric models for compensating temperature-dependent gain and hysteresis without manual re-zeroing. Automated self-calibration routines periodically excite known reference states and record sensor responses across temperature ranges, with a calibration engine updating thermal coefficients, creep terms, and bias estimates stored in non-volatile memory to maintain consistent metrology as components age or environments change. For comprehensive ground-truth calibration during servicing, external calibration jigs apply traceable normal and shear loads across the operating range, with a calibration manager automatically fitting response curves and writing resulting coefficients, version tags, and cyclic redundancy checks to on-module EEPROM, standardizing modules for interchangeability.

The mechanical design can further include enhanced energy attenuation through additively manufactured lattice core structures that provide spatially graded stiffness with three-dimensional printed lattices featuring a tailored modulus optimized for fingertip geometry and load paths. The local cell topology and density vary to efficiently route forces to sensing elements, offering more repeatable properties than traditional foams while supporting embedded channels for wiring or other components.

Edge computing capabilities can be integrated throughout the system architecture, with fingertip MCUs configured as tactile event encoders performing on-sensor feature extraction and compressive sensing to compute compact descriptors including contact area, centroid location, and slip indices directly at the data source. This compressive sampling and sparsification reduces data volume transmitted over the communication bus, minimizing bus contention and enabling low-latency control loops for scalable multi-finger systems. A lightweight machine learning model operates on the fingertip MCU for slip prediction, analyzing vibration spectrograms derived from piezoelectric or accelerometer channels through short-time spectral features to classify and output slip probability that controllers use for proactive grip force adjustment. The system includes neural network accelerators such as ultra-low-power Neural Processing Units or DSP extensions that accelerate convolutional and recurrent network workloads, supporting multi-modal data fusion and anomaly detection within strict power budgets while preserving CPU cycles for communication and safety-critical tasks.

The machine learning and AI integration extends to multiple advanced capabilities, including edge fusion of tactile and kinematic data through a fused estimator that combines contact forces, contact geometry from tactile sensors, and joint states from motor encoders to infer object pose and compliance in real-time, driving grip adjustments, regrasp decisions, and path replanning to reduce grasp failure rates. The system exposes a Grasp-quality Score API providing scalar and vector metrics that summarize grasp stability, force-closure margin, and slip probability in formats easily consumed by external planners and supervisors for safety enforcement and strategy optimization. Online learning algorithms enable adaptive calibration with incrementally updated model parameters as the system observes new operating conditions and sensor drift patterns, with safeguards constraining updates to preserve stability and provide parameter reversion if performance degrades. Object recognition through tactile signatures allows a classifier to match observed characteristic contact patterns, textures, and compliance responses to a library of known items, enabling identification even when visual sensors are occluded, improving manipulation strategies and inventory verification. A decision layer analyzes fused metrics to provide real-time recommendations for grip adjustments, regrasp points, or path updates delivered within tight deadlines suitable for closed-loop control, which operators or autonomy stacks can accept, modify, or reject based on policy.

Synchronization across the distributed system is achieved through a PTP-like distributed clocking scheme that aligns sensor samples across all fingertips to within microseconds, enabling coherent force reconstruction, accurate correlation of multi-point events, and improved fusion with motor encoders and vision systems. All tactile events are time-stamped and formatted using a unified contact event schema that includes coordinate frames, calibration references, and uncertainty annotations, standardizing data to accelerate development of learning and control algorithms across platforms.

For teleoperation applications, the system can support bilateral control with force reflection through a passivity-based control loop that mirrors forces measured by the end-effector to the master control device while enforcing stability, with bandwidth and damping tuned to avoid oscillations in the human-robot control loop, resulting in precise and natural manipulation in remote or hazardous environments.

The system can include robust environmental protection through IP67-rated sealing that enables immersion in water up to one meter for thirty minutes without performance loss, accomplished through sealed interfaces, breathable vents that equalize pressure while blocking contaminants, conformal coatings on electronic components, and gel-filled cable exits providing strain relief and blocking capillary paths for fluid intrusion. Fluid ingress detection systems using embedded ultrasonic or impedance sensors detect liquid presence within protective layers, triggering protective behaviors and logging service events upon detection to provide early warning that prevents latent damage. For hazardous environments, the construction incorporates flame-retardant formulations in polymers and elastomers that comply with applicable flammability ratings, with electronic component layouts designed to isolate potential heat sources and include thermal fuses for additional protection against ignition risk during fault conditions or high-temperature operation.

v. Leg Assemblies

The leg assemblies 6 include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the leg assembly may incorporate features such as hard-stops, cooling channels, heat sinks, or other materials, structures, components, or assemblies described herein. For example, a heat pipe may extend from the knee to the shin 84. Furthermore, the talus 88 may include a quick-release mechanism that enables the interchange of a different foot 92. Moreover, the housing of each component may be designed with internal reinforcement structures, and may be made from various materials (e.g., metal alloys or advanced materials like carbon-fiber-reinforced polymers).

To enhance the stability and adaptability of the humanoid robot 1, the leg assemblies 6 may incorporate advanced sensing and control systems, as well as comprehensive protective systems. For instance, force sensors located in the feet 92 and ankles may provide real-time feedback on ground contact forces and pressure distribution. This data may be used by the control system of the humanoid robot 1 to make rapid adjustments in order to maintain balance, especially when moving on uneven or dynamic surfaces. Inertial measurement units (IMUs) positioned in the leg assemblies 6 and the pelvis 64 may also provide crucial information on the orientation and acceleration of each leg segment, thereby allowing for the precise control of leg positioning during movement.

b. Mechanical and Electrical Architecture

The mechanical and electrical architecture 1.2 may be embodied as any combination of hardware, software, and circuitry that enables the humanoid robot 1 to operate and perform physical functions in response to electrical charges or electrical signals. As illustrated comprehensively in additional figures herein, the robot 1 is composed of a plurality of assemblies and components that are specifically arranged to emulate or generally resemble human anatomical structures and their functional characteristics. A humanoid form is advantageous because it enables the robot 1 to execute a wide range of general tasks that are typically performed by humans, such as walking between different locations, end effectorling and moving objects, and retrieving items from various positions and orientations. Non-humanoid forms (e.g., wheeled robots or quadrupeds) typically lack the versatility and effectiveness that are required to perform such a diverse array of generalized tasks.

i. Actuators

The actuators 1.2.4 contained within the robot 1 include thirty actuators (J1)-(J16), excluding the end effectors, that are housed within various components of the robot 1 to actuate movement of said components. An additional aggregate total of twelve actuators are in both end effectors 56 combined. Below is a summary table showing the actuator 1.2.4 reference names and numbers for the thirty actuators (J1)-(J16), the quantity of each, descriptive actuator names used herein for consistency, common corresponding informal actuator names, and associated rotational axes from the high-level configuration of the illustrative embodiment robot 1. Specific actuators in each end effector 56 (e.g., six actuators in each end effector) are not individually included in the below table

TABLE 2

| Actuator | Qty | Actuator Name | Informal Actuator Name(s) | Axis |
|---|---|---|---|---|
| (J1) 190 | 2 | arm | primary arm | $A_1$ |
| (J2) 280 | 2 | shoulder | (none) | $A_2$ |
| (J3) 320 | 2 | upper arm twist | upper arm x, upper arm roll | $A_3$ |
| (J4) 374 | 2 | elbow | arm z, arm yaw, lower humerus | $A_4$ |
| (J5) 468 | 2 | lower arm twist | lower arm x, lower arm roll | $A_5$ |
| (J6) 484 | 2 | wrist flex | wrist/end effector y, wrist/end effector pitch, flick | $A_6$ |
| (J7) 520 | 2 | wrist pivot | wrist/end effector z, wrist/end effector yaw, wave | $A_7$ |
| (J8.1) 120 | 1 | head twist | head no | $A_{8.1}$ |
| (J8.2) 140 | 1 | head nod | head yes | $A_{8.2}$ |
| (J9) 680 | 1 | torso lean | spine x, torso/spine roll | $A_9$ |
| (J10) 620 | 1 | torso twist | spine z, torso/spine yaw | $A_{10}$ |
| (J11) 720 | 2 | hip flex | hip y, hip/leg pitch, forward kick | $A_{11}$ |
| (J12) 768 | 2 | hip roll | hip x, hip/leg roll, sideways kick | $A_{12}$ |
| (J13) 782 | 2 | leg twist | hip z, hip/leg yaw | $A_{13}$ |
| (J14) 820 | 2 | knee | lower thigh, lower leg y, lower leg pitch, rear kick | $A_{14}$ |
| (J15) 860 | 2 | foot flex | foot y, foot pitch, or first ankle | $A_{15}$ |
| (J16) 900 | 2 | foot roll | talus, foot roll, foot x, second ankle | $A_{16}$ |

It should be understood that in other embodiments, some of these systems, assemblies, components, and/or parts may be omitted, combined, or replaced with alternative systems, assemblies, components, and/or parts. The robot 1 only uses electric actuators, and thereby lacks manual, hydraulic, cable-based, or pneumatic actuators. The exclusive use of electric actuators reduces assembly, maintenance, weight, and cost, and increases durability and safety considerations related to operating the robot 1 within or around other humans.

ii. External Cover Assembly

The illustrative embodiment robot 1 includes various components (e.g., assemblies) with housings 1.2.2 (e.g., to form an exoskeleton) that are designed to protect the operational systems of the robot 1, such as actuators 1.2.4 and the electronics assembly 1.2.6, provide structural support, and give form to the robot 1. Said housings 1.2.2 can be comprised of hard or rigid casings that may include internal mounting features designed to support systems in specific locations, structural features engineered to withstand operational loads, and internal and/or external features that allow for interoperation between adjacent components and/or are formed to resemble human features. Some housings 1.2.2 additionally include one or more detachable shells that may overlay a casing to allow access to internal assemblies or to complete the form of the component.

The requirements of the housings 1.2.2 can vary in shape and form based on the individual structural or material requirements for each specific component. While it may be desirable to utilize a particular material for all housings 1.2.2 to create a consistent exterior appearance, fabrication may be complicated by specific structural or operational needs at different locations. It may not be necessary to utilize the same materials in different housings 1.2.2 that experience different load requirements. Various materials may be preferred for a specific housing 1.2.2 based on properties such as strength, toughness, elasticity, weight, and conductivity. Similarly, the complexity of some housing 1.2.2 designs may be better suited for one type of manufacturing process, such as machining, die casting, injection molding, or composite fabrication, over another. Because there is a desire or need to use different materials within different regions and/or use materials that do not have a consistent exterior appearance, the illustrative embodiment robot 1 includes exterior coverings of the exterior covering assembly 1.2.16 that are designed to at least partially hide the housings 1.2.2 under a textile exterior layer that can be easily swapped if damaged, serve to protect internal components from dust and debris, are designed to fit the form of the robot 1 without substantial wrinkling, and/or allow for venting or address thermal considerations at specified locations.

The exterior coverings may have a multi-layered assembly, which may include: (i) an energy-absorbing material that is coupled to the coupling layer, (ii) a coupling layer (e.g., a plastic or polymer based layer), wherein the coupling layer facilitates attachment to, or attachment at, a housing 1.2.2, and/or (iii) an exterior covering material (e.g., a textile). Alternatively, the multi-layered assembly may omit the coupling layer, the energy-absorbing material, and/or the exterior covering material. In each case, the movement of a nearby joint may cause one housing 1.2.2 to impact or crush the energy absorbing layer instead of another housing 1.2.2, thereby mitigating or eliminating structural stress or load on either housing 1.2.2 and/or the respective actuator 1.2.4. Additionally, the energy attenuation members help to reduce pinch points, and/or allow for a more human-like appearance.

1. Exterior Coverings

The exterior coverings, which can include a neck cover, a torso cover, an upper leg cover, a shin cover, a foot cover, a lower arm cover, and an end effector cover, are designed not to interfere with the robot's range of motion, to allow access to underlying components, to potentially add indicators to the external surface, and to improve the robot's overall aesthetic appearance. As shown in the figures, a single exterior covering does not extend over all actuators in the robot 1, and typically does not cover more than five actuators at a time. In other words, the exterior covering does not resemble an oversized jumpsuit with a closure running from, e.g., the robot's pelvis to its head region, nor does it include a hood that extends around a substantial portion of the robot's head. Instead, the exterior covering is strategically and tightly fitted in certain regions and may include different inserts (e.g., a different textile) that are positioned between the moving aspects of joints.

Exterior covering materials of the exterior covering assembly 1.2.16 can be made from one or more textiles and can be customized or selected to reduce wrinkling and to allow for the twisting or movement of the underlying components without restriction or substantial distortion. For example, the exterior covering materials may be designed to allow the lower arm to twist and rotate from about −120 degrees to about 180 degrees. Additionally, the exterior covering materials may be selected to allow for the cooling of components, the viewing of indicator lights, or the operation of buttons through said exterior coverings. This provides a substantial benefit over conventional systems that lack these advanced features. It should be understood that this disclosure contemplates using or including exterior covering materials that: (i) integrate lights from the robot 1 into said exterior covering, and specifically into a textile itself, (ii) may be translucent or temporarily translucent (e.g., based on time or environment), and/or (iii) can be formed (e.g., woven) in a manner that allows light to be transmitted through the textile.

As such, various types of lights (e.g., fiber optic lighting, led strip lights, led rope lights, micro-led string lights, led neon flex, phosphorescent paint, OLED panels (organic light-emitting diode), laser diode lighting, neon tubing, electroluminescent panels, led edge-lit panels, flexible led sheets, flexible OLED strips, inductive electroluminescent displays, laser fiber cables, quantum dot light-emitting displays, phosphor-coated led strips, laser-activated fluorescent materials, electroluminescent paint, laser-illuminated fiber bunches, phosphor-coated electroluminescent (PCEL) materials, smart RGB led strips, light-up silicone tubing (LED or EL-based), laser wire, or other electroluminescent materials such as EL wire, EL tape, or EL film) that are coupled to the humanoid robot 1 may be visible through the exterior covering material. The exterior covering material can include reflective yarn or night-luminous yarn that changes its appearance when light is shining on its surface. In other embodiments, a shiny, reflective, iridescent, matte, or textured polyurethane film can be applied to the surface of the exterior covering material (e.g., a textile) in certain areas to provide an additional reflective effect or for another purpose, such as displaying a logo, pattern, or labels.

The exterior covering material can also include features to accommodate the thermal considerations of the robot 1. In various examples, the exterior covering material can be a custom textile that utilizes different weaves in different locations to allow for ventilation in specific areas. Additionally, the exterior covering material can include textiles or threads that are heat-sensitive and change color with a change in temperature. In summary, the exterior coverings may additionally be made from, include, or specifically omit any one or any combination of the following material types: durable materials, flame-resistant materials, waterproof materials, hazard materials, or chemical-resistant materials.

Alternatively or additionally, the exterior covering assembly 1.2.16 may include features such as closures (e.g., a zipper that runs a partial or full length of the exterior covering assembly 1.2.16), attachment points, couplers, self-cleaning nanocoatings, thermoelectric materials, photochromic dyes, or electromagnetic shielding layers, as well as modular, quick-release panels or e-textile technology with conductive fibers woven throughout to create a distributed sensor network that is capable of detecting impacts, monitoring joint angles, or even harvesting energy from movement. The exterior covering assembly 1.2.16 may be designed to include inserts (which may also be textiles or may be other materials) that are positioned strategically between moving joint components to further ensure that pivoting motion is not restricted at the joints of the humanoid robot 1. Different textile materials, patterns, knits, weaves, etc. may be incorporated to facilitate movement in specific regions, thereby enhancing the functional dexterity of the robot 1.

iii. Other Sensors

Figures 4, 5:
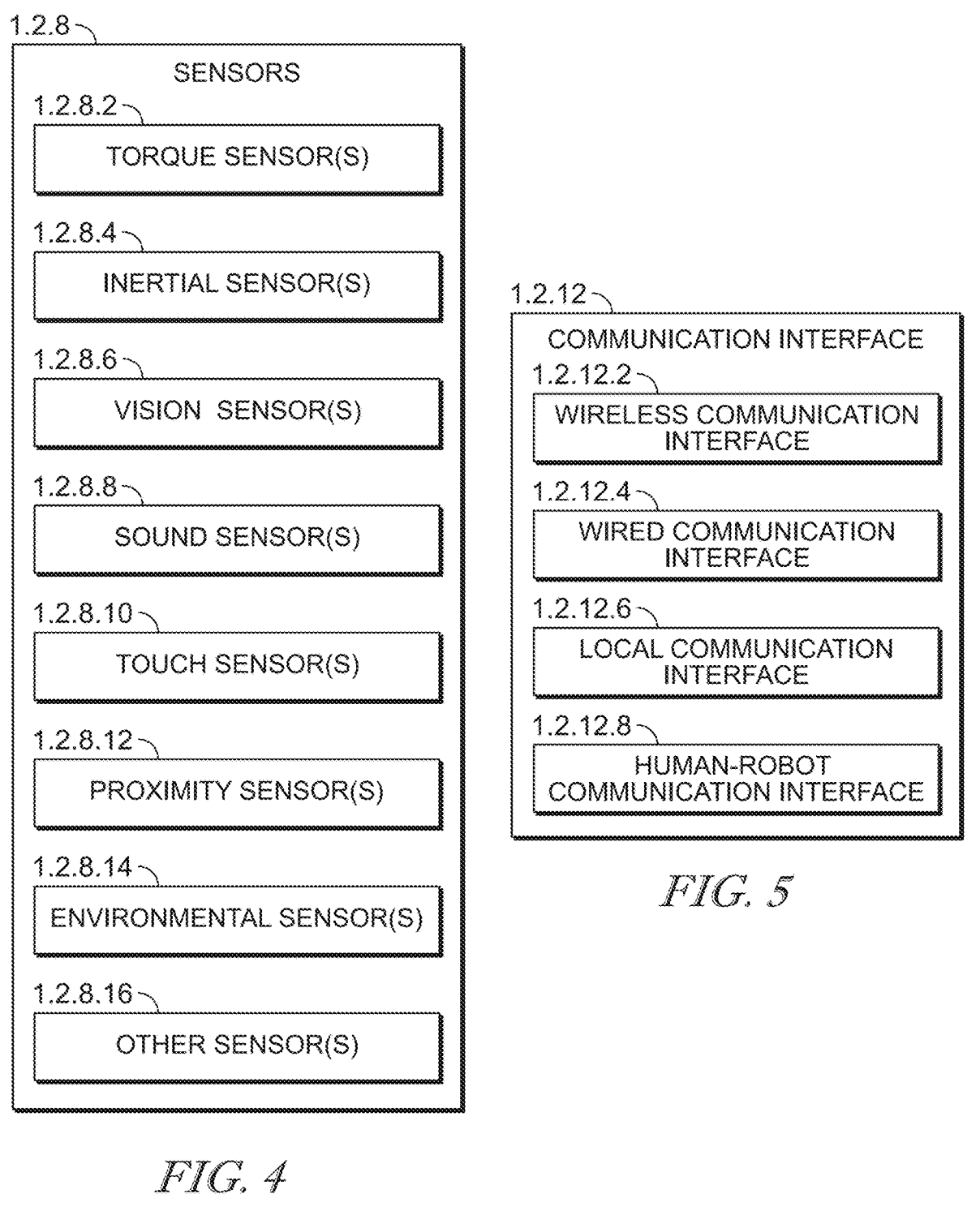

As illustrated in FIG. 4, sensors 1.2.8 may be embodied as any hardware, software, and/or circuitry for providing sensor data indicative of perceived stimuli, conditions, and measurements to enable the humanoid robot 1 to process, reason, and act appropriately (e.g., based on a given task, a set of rules, and/or other constraints). The sensors 1.2.8 may include one or more torque sensors 1.2.8.2, inertial sensors 1.2.8.4, visual sensors 1.2.8.6, auditory sensors 1.2.8.8, touch sensors 1.2.8.10, proximity sensors 1.2.8.12, environmental sensors 1.2.8.14, and other sensors 1.2.8.16. The sensors 1.2.8 may provide sensor data (e.g., torque, inertia measures, audiovisual sensor data, touch data, proximity data, environmental data, etc.) to the compute 1000 processors, further described below, to enable appropriate interaction between the humanoid robot 1 and the environment.

The torque sensors 1.2.8.2 may comprise one or more torque cells that are positioned within the actuators and are designed to measure the amount of force or torque applied to a part of the humanoid robot 1. The measurements may be transmitted to other components of the humanoid robot 1, such as the whole body controller 1550 or one or more controllers 1600, to enable balance, locomotion, manipulation, and end effectorling by the humanoid robot 1.

The inertial sensors 1.2.8.4 may comprise sensors for measuring the motion, position, and orientation of the humanoid robot 1 relative to the environment for purposes of navigation, stabilization, and interaction with the environment and surroundings. For example, the inertial sensors 1.2.8.4 can include one or more accelerometers (e.g., to measure acceleration forces in one or more directions for use in determining changes in velocity and orientation), gyroscopes (e.g., to measure angular velocity for use in tracking rotational movement and maintaining balance), IMUs (e.g., combining the accelerometers and gyroscopes for use in providing comprehensive motion and orientation data), and Global Positioning System (GPS) receivers (e.g., to provide location data based on satellite signals, for use in outdoor navigation and positioning).

The visual sensors 1.2.8.6 may comprise sensors for capturing visual data, including cameras (e.g., red-green-blue (RGB) standard color cameras, grayscale monocular cameras, and stereo cameras (e.g., to capture depth perception)), depth cameras (e.g., depth cameras using technologies such as structured light or time-of-flight to measure distance to objects, Azure® Kinect® depth camera, Intel® RealSense® depth camera, etc.), LIDAR (Light Detection and Ranging) sensors (e.g., to measure distance to objects by emitting laser pulses, analyze the reflections, and provide detailed 2D or 3D maps of the environment), radar (e.g., to detect objects via radio waves and measure distance and speed for use in various applications including navigation and obstacle detection). Visual sensors 1.2.8.6 may also include event-based cameras, which report changes in pixel intensity rather than full frames, offering advantages in speed and data efficiency for dynamic scenes. Examples of said visual sensors 1.2.8.6 include the cameras 108.2.2 and 108.2.4 contained in the head 10.1 of the robot 1.

The auditory sensors 1.2.8.8 may comprise sensors for capturing audio data, including microphones (e.g., to capture audio signals for voice recognition, environmental noise detection, or communication), ultrasonic transducers (e.g., to capture distance measurement and obstacle detection through high-frequency sound waves), spatial audio sensors such as microphone arrays and direction of arrival sensors (e.g., to capture sound from different locations to determine the direction and distance of sound sources for 3D positioning). Auditory sensors 1.2.8.8 could also include specialized acoustic sensors for detecting specific sound patterns, such as the sound of failing machinery or distress calls, further enhancing the robot's environmental awareness.

The touch sensors 1.2.8.10 may comprise sensors for detecting physical contact or pressure applied to the surface of the humanoid robot 1, e.g., to enable tactile feedback, safety and collision avoidance, object end effectorling and manipulation, and interaction with the environment and surroundings. Example touch sensors 1.2.8.10 may include pressure sensors to measure an amount of pressure applied to a surface by the humanoid robot 1, such as capacitive sensors (e.g., to detect touch or proximity through changes in capacitance), resistive sensors (e.g., to detect pressure or touch by measuring changes in resistance), piezoelectric sensors (e.g., to generate an electrical charge in response to mechanical stress or pressure and detect vibrations or impact), force-sensitive resistors (e.g., to change resistance based on the amount of applied force), and optical touch sensors (e.g., to use light beams or infrared to detect touches or proximity). Alternative touch sensors 1.2.8.10 may involve artificial skin technologies that provide a more distributed and nuanced sense of touch, capable of detecting not only contact but also shear forces and temperature changes on the robot's surfaces.

The proximity sensors 1.2.8.12 may comprise sensors for detecting the presence or absence of objects within a given range without necessarily making physical contact with the object, e.g., to provide obstacle avoidance, navigation, and object detection. Example proximity sensors 1.2.8.12 can include ultrasonic sensors (e.g., to measure distance by emitting ultrasonic waves and detecting reflection of the waves for avoiding obstacles and measuring distance) and infrared rangefinders (e.g., to detect, using infrared light, the presence or distance of objects for proximity sensing and simple obstacle detection). Capacitive proximity sensors may also be used as part of proximity sensors 1.2.8.12, particularly for close-range interactions.

The environmental sensors 1.2.8.14 may comprise sensors for measuring various physical parameters of the environment and surroundings to enable the humanoid robot 1 to interact with the environment and surroundings, adapt to changes in the environment and surroundings, and perform a given task. Example environmental sensors 1.2.8.14 can include thermocouples (e.g., to measure temperature by generating a voltage proportional to temperature difference), thermistors (e.g., to measure temperature based on changes in resistance), magnetometers (e.g., to measure magnetic fields for navigation and orientation), light sensors (e.g., to measure intensity of light in the environment), gas sensors (e.g., to detect presence and concentration of various gases and monitor air quality), and humidity sensors (e.g., to measure relative humidity in the air). Other environmental sensors 1.2.8.14 could include barometric pressure sensors for altitude determination or weather prediction, radiation sensors for operation in hazardous environments, or particulate matter sensors for air quality assessment in industrial settings.

iv. Communication Interfaces

The communication interfaces 1.2.12 may be embodied as any hardware, software, or circuitry to enable the exchange of data, signals, and other forms of communication between different components within the humanoid robot 1, and between the humanoid robot 1 and other systems (e.g., other humanoid robots 2700A-X, the command centers 2750A-X, the remote AI system 2780), and other components and devices interconnected over the networks 2999A-X. Specifically, FIG. 5 shows that the humanoid robot 1 may be configured with a variety of communication interfaces 1.2.12. The communication interfaces 1.2.12 may be embodied as any combination of a communication circuit, device, or collection thereof, capable of enabling communications over a network (e.g., the networks 2999A-X). The communication interfaces 1.2.12 may be configured to use any one or more communication technology (e.g., wired or wireless communications) and associated protocols to effect such communication.

Referring to FIG. 5, examples of communication interfaces 1.2.12 include a wireless communication interface 1.2.12.2 (e.g., Bluetooth®, Wi-Fi®, WiMAX, Cellular (e.g., 3G, 4G, 5G), Zigbee, LoRa (Long Range) and RF (Radio Frequency)), a wired communication interface 1.2.12.4 (e.g., Ethernet, USB, Serial Communication (e.g., RS-232, RS-485), and Controller Area Network (CAN) interface)), a local communication interface 1.2.12.6 (e.g., an I2C (Inter-Integrated Circuit), SPI (Serial Peripheral Interface)), and a human-robot communication interface 1.2.12.8 (e.g., voice recognition systems to enable communication through spoken commands using speech recognition technology, touch interfaces such as touchscreens or physical buttons for direct human interaction with the humanoid robot 1). Alternatively or additionally, the human-robot communication interface 1.2.12.8 may include gesture recognition systems or gaze tracking, allowing for more intuitive and non-verbal interaction with human operators. The communication interfaces 1.2.12 may also include a network interface controller (NIC) (not illustrated), which may also be referred to as a host fabric interface (HFI). The NIC may be embodied as one or more add-in-boards, daughtercards, controller chips, chipsets, or other devices that may be used by the humanoid robot 1 for network communications with remote devices.

c. Compute

As illustrated in FIG. 2, the compute 1000 may comprise any combination of hardware, software, and circuitry to perform various computing functions that enable the humanoid robot 1 to operate semi- or fully-autonomously. Specifically, the compute 1000 includes: (i) compute hardware 1010, and (ii) computing architecture 1100. Such functions may include processing long-horizon goals, coordinating with other humanoid robots 2700A-X, processing sensor information, controlling the humanoid robot 1 based on the sensor information and goals, controlling the activation or deactivation of mechanical components, learning, simulating, refining behavioral models, and policy management.

i. Hardware

The compute hardware 1010 may operate as one or more general purpose processors or special purpose processors (e.g., digital signal processors, application specific integrated circuits (ASICs), field programmable gate arrays (FPGAs), etc.) that can be configured to execute computer-readable program instructions stored in the aforementioned data storage devices. Such instructions can be executed to provide controller operations (e.g., to activate or deactivate components of the mechanical and electrical architecture 1.2, etc.). Specifically, the humanoid robot 1 may be configured with a variety of processors such as one or more central processing units (CPUs) 1100 (e.g., x86 CPUs, ARM CPUs, RISC-V CPUs, embedded CPUs such as Internet-of-Things CPUs or mobile CPUs), graphics processing units (GPUs) (e.g., ray tracing GPUs, accelerated computing GPUs, embedded GPUs such as system-on-chip (SoC) GPUs or mobile GPUs), neural network processing units (for example, tensor processing units designed for tensor computations in machine learning tasks; dedicated neural network processing units such as Intel Nervana NNP, Graphcore IPU, IBM TrueNorth, or Qualcomm Cloud AI 100; custom neural network processing units such as Amazon Web Services (AWS) Inferentia, Apple Neural Engine, and Huawei Ascend; and Neuromorphic Neural Network Processing Units such as Intel Loihi or BrainChip Akida), and other processors. For example, the other processors may be embodied as a single or multi-core processor, a microcontroller, or other processor or processing/controlling circuit. In some embodiments, the other processors may be embodied as, include, or be coupled to an FPGA, an ASIC, reconfigurable hardware or hardware circuitry, or other specialized hardware to facilitate the performance of the functions described herein.

ii. Architecture

The computing architecture 1100 includes: (i) a movement controller 1302, (ii) a behavior manager 1350, (iii) a perception system 1420, (iv) a local AI system 1470, (v) a whole body controller 1550, (vi) one or more controllers 1600, and (vii) other subcomponents 1650.

E. Industrial Application

While the present disclosure shows several illustrative embodiments of a robot (in particular, a humanoid robot), it should be understood that these embodiments are designed to be examples of the principles of the disclosed assemblies, methods, and systems. They are not intended to limit the broad aspects of the disclosed concepts solely to the specific embodiments that have been illustrated. As will be realized by one skilled in the art, the disclosed robot, and its associated functionality and methods of operation, are capable of other and different configurations. Furthermore, several of its details are capable of being modified in various respects, all without departing from the fundamental scope of the disclosed methods and systems. For example, one or more of the disclosed embodiments, either in part or in whole, may be combined with another disclosed assembly, method, and system to create hybrid implementations. As such, one or more steps from the diagrams or components in the Figures may be selectively omitted or combined in a manner that is consistent with the principles of the disclosed assemblies, methods, and systems. Additionally, the order of one or more steps from the arrangement of components may be omitted or performed in a different order than what is explicitly described. Accordingly, the drawings, diagrams, and the detailed description provided herein are to be regarded as illustrative in nature, and not as restrictive or limiting, of the said humanoid robot. It should be understood that the use of the word "or" when separating element names in connection with a single reference number indicates that the same structure can have two or more different names. For example, the phrase "end effector or end effector assembly 56" indicates that the structure that is referenced by the number 56 can be referred to or claimed as either an "end effector" or a "end effector assembly."

While the above-described methods and systems are primarily designed for use with a general-purpose humanoid robot, it should be understood that the disclosed assemblies, components, learning capabilities, or kinematic capabilities may be adapted for use with other types of robots. Examples of other such robots include, but are not limited to: an articulated robot (e.g., an arm having two, six, or ten degrees of freedom, etc.), a cartesian robot (e.g., rectilinear or gantry robots, robots having three prismatic joints, etc.), a Selective Compliance Assembly Robot Arm (SCARA) robot (e.g., a robot with a donut-shaped work envelope, with two parallel joints that provide compliance in one selected plane, with rotary shafts positioned vertically, with an end effector attached to an arm, etc.), a delta robot (e.g., a parallel link robot with parallel joint linkages connected with a common base, having direct control of each joint over the end effector, which may be used for pick-and-place or product transfer applications, etc.), a polar robot (e.g., a robot with a twisting joint connecting the arm with the base and a combination of two rotary joints and one linear joint connecting the links, having a centrally pivoting shaft and an extendable rotating arm, a spherical robot, etc.), a cylindrical robot (e.g., a robot with at least one rotary joint at the base and at least one prismatic joint connecting the links, with a pivoting shaft and an extendable arm that moves vertically and by sliding, with a cylindrical configuration that offers vertical and horizontal linear movement along with rotary movement about the vertical axis, etc.), a self-driving car, a kitchen appliance, construction equipment, or a variety of other types of robot systems. The robot system may include one or more sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art and is used in connection with robot systems. Likewise, the robot system may omit one or more of the aforementioned sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art to be used in connection with robot systems. In other embodiments, other configurations or components may be utilized.

As is well known in the data processing and communications arts, a general-purpose computer typically comprises a central processor or other processing device, an internal communication bus, various types of memory or storage media (e.g., RAM, ROM, EEPROM, cache memory, disk drives, etc.) for code and data storage, and one or more network interface cards or ports for communication purposes. The software functionalities that are described herein involve programming, which includes executable code as well as associated stored data. This software code is executable by the general-purpose computer. In operation, the code is stored within the memory of the general-purpose computer platform. At other times, however, the software may be stored at other locations or transported for loading into the appropriate general-purpose computer system.

A server, for example, typically includes a data communication interface for engaging in packet data communication over a network. The server also includes a central processing unit (CPU), which may be in the form of one or more processors, for executing the program instructions. The server platform typically includes an internal communication bus, program storage, and data storage for the various data files that are to be processed or communicated by the server, although the server often receives its programming and data via network communications. The hardware elements, operating systems, and programming languages of such servers are conventional in nature, and it is presumed that those who are skilled in the art are adequately familiar therewith. The server functions may be implemented in a distributed fashion on a number of similar platforms to distribute the processing load.

Hence, aspects of the disclosed methods and systems that are outlined above may be embodied in the form of computer programming. Program aspects of the technology may be thought of as "products" or "articles of manufacture," which are typically in the form of executable code or associated data that is carried on or embodied in a type of machine-readable medium. "Storage" type media includes any or all of the tangible memory of the computers, processors, or the like, or any associated modules thereof. This may include various semiconductor memories, tape drives, disk drives, and the like, which may provide non-transitory storage at any time for the software programming. All or portions of the software may at times be communicated through the Internet or various other telecommunication networks. Thus, another type of media that may bear the software elements includes optical, electrical, and electromagnetic waves, such as those that are used across physical interfaces between local devices, through wired and optical landline networks, and over various air-links. The physical elements that carry such waves, such as wired or wireless links, optical links, or the like, also may be considered as media that bear the software. As used herein, unless specifically restricted to non-transitory, tangible "storage" media, terms such as computer or machine "readable medium" refer to any medium that participates in the process of providing instructions to a processor for execution.

A machine-readable medium may take many forms, including but not limited to, a tangible storage medium, a carrier wave medium, or a physical transmission medium. Non-volatile storage media include, for example, optical or magnetic disks, such as any of the storage devices in any computer or computers or the like, such as may be used to implement the disclosed methods and systems. Volatile storage media include dynamic memory, such as the main memory of such a computer platform. Tangible transmission media include components such as coaxial cables, copper wire, and fiber optics, including the wires that comprise a bus within a computer system. Carrier-wave transmission media can take the form of electric or electromagnetic signals, or acoustic or light waves, such as those that are generated during radio frequency (RF) and infrared (IR) data communications. Common forms of computer-readable media therefore include, for example: a floppy disk, a flexible disk, a hard disk, magnetic tape, any other magnetic medium, a CD-ROM, a DVD or DVD-ROM, any other optical medium, punch cards, paper tape, any other physical storage medium with patterns of holes, a RAM, a PROM and EPROM, a FLASH-EPROM, any other memory chip or cartridge, a carrier wave that is transporting data or instructions, cables or links that are transporting such a carrier wave, or any other medium from which a computer can read programming code or data. Many of these forms of computer-readable media may be involved in carrying one or more sequences of one or more instructions to a processor for execution.

It is to be understood that the invention is not limited to the exact details of construction, operation, exact materials, or specific embodiments shown and described herein, as obvious modifications and equivalents will be apparent to one who is skilled in the art. While the specific embodiments have been illustrated and described in detail, numerous modifications may come to mind without significantly departing from the spirit of the invention, and the scope of protection is only limited by the scope of the accompanying Claims. In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such a feature is required in all embodiments and, in some embodiments, may not be included or may be combined with other features.

It should also be understood that the term "substantially" as utilized herein means a deviation of less than 15% and preferably less than 5%. It should also be understood that the term "near" means within 10 cm, the term "proximate" means within 5 cm, and the term "adjacent" means within 1 cm. It should also be understood that other configurations or arrangements of the above-described components are contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

The following applications are hereby incorporated by reference for any purpose: (i) PCT Application Nos. PCT/US25/10425, PCT/US25/11450, PCT/US25/12544, PCT/US25/16930, PCT/US25/19793, PCT/US25/23064, PCT/US25/23325, PCT/US25/24817, and PCT/US25/25005; (ii) U.S. patent application Ser. Nos. 18/919,263, 18/919,274, 18/922,334, 19/000,626, 19/006,191, 19/033,973, 19/038,657, 19/064,596, 19/066,122, 19/180,106, 19/223,945, 19/224,109, 19/224,252, 19/249,517, 19/252,392, 19/252,708, 19/306,591, 19/319,712, 19/324,392, 19/323,751, 19/325,486, 19/325,415, 19/324,342, 19/329,008, 19/329,474, 19/329,485, 19/329,559, 19/337,845, 19/337,852, and 19/337,899; and (iii) U.S. Design Patent application Ser. Nos. 29/889,764, 29/928,748, 29/935,680, 29/954,572, 29/967,462, 29/993,115, 29/998,761, 30/024,341, and 30/024,351; (iv) U.S. Provisional Patent Application Nos. 63/556,102, 63/557,874, 63/558,373, 63/561,307, 63/561,311, 63/561,313, 63/561,315, 63/561,317, 63/561,318, 63/564,741, 63/565,077, 63/573,226, 63/573,528, 63/573,543, 63/574,349, 63/614,499, 63/615,766, 63/617,762, 63/620,633, 63/625,362, 63/625,370, 63/625,381, 63/625,384, 63/625,389, 63/625,405, 63/625,423, 63/625,431, 63/626,028, 63/626,030, 63/626,034, 63/626,035, 63/626,037, 63/626,039, 63/626,040, 63/626,105, 63/632,630, 63/632,683, 63/633,113, 63/633,405, 63/633,920, 63/633,931, 63/633,941, 63/634,042, 63/634,599, 63/634,697, 63/635,152, 63/677,087, 63/685,856, 63/690,334, 63/692,747, 63/692,765, 63/694,253, 63/694,304, 63/696,507, 63/696,533, 63/697,793, 63/697,816, 63/700,749, 63/702,185, 63/705,715, 63/706,768, 63/707,547, 63/707,897, 63/707,949, 63/708,003, 63/715,117, 63/715,270, 63/720,222, 63/722,057, 63/753,670, 63/757,440, 63/759,665, 63/760,617, 63/763,209, 63/766,911, 63/770,620, 63/770,654, 63/772,440, 63/773,078, 63/776,429, 63/792,520, 63/819,533, 63/837,511, 63/837,536, 63/839,386, 63/839,517, 63/839,612, 63/839,880, 63/839,918, and 63/841,314, each of which is expressly incorporated by reference herein in its entirety.

In this Application, to the extent any U.S. patents, U.S. patent applications, or other materials (e.g., articles) have been incorporated by reference, the text of such materials is only incorporated by reference to the extent that it does not conflict with the materials, statements, and drawings set forth herein. In the event of such a conflict, the text of the present document controls, and terms in this document should not be given a narrower reading in virtue of the way in which those terms are used in other materials incorporated by reference. It should also be understood that structures or features not directly associated with a robot cannot be adopted or implemented into the disclosed humanoid robot without careful analysis and verification of the complex realities of designing, testing, manufacturing, and certifying a robot for the completion of usable work nearby or around humans. Theoretical designs that attempt to implement such modifications from non-robotic structures or features are insufficient, and in some instances, woefully insufficient, because they amount to mere design exercises that are not tethered to the complex realities of successfully designing, manufacturing, and testing a robot.

The invention claimed is:

1. A humanoid robot comprising:

a torso;

a head coupled to the torso;

an articulated arm coupled to torso; and an end effector coupled to the articulated arm and comprising:

(a) a tactile sensor assembly including (i) a first strain gauge, and (ii) an electronics assembly communicatively coupled to the first strain gauge and configured to: receive signals from the strain gauge as input, process the received signals, and output processed data based on the received signals, and (b) an energy attenuation member comprising (i) an interior region having a first compression/deflection ratio, and (ii) an exterior region at least partially surrounding the interior region and having a second compression/deflection ratio that is less than the first compression/deflection ratio, wherein the energy attenuation member is configured to receive an external force and transfer at least a portion of the received external force to the tactile sensor assembly.

2. The humanoid robot of claim 1, wherein the energy attenuation member further comprises an intermediate region located at least partially between the exterior region and the interior region, and wherein the intermediate region has a third compression/deflection ratio that is between the first compression/deflection ratio and the second compression/deflection ratio.

3. The humanoid robot of claim 1, wherein the interior region of the energy attenuation member comprises a curvilinear outer surface.

4. The humanoid robot of claim 1, wherein the exterior region of the energy attenuation member comprises an outside surface with a pattern of ridges and grooves.

5. The humanoid robot of claim 1, wherein the exterior region of the energy attenuation member comprises a plurality of ridges and grooves, and wherein said plurality of ridges and grooves covers at least a majority of the outer surface of the energy attenuation member.

6. The humanoid robot of claim 1, wherein the end effector further comprises a force distributor member arranged between the tactile sensor assembly and the energy attenuation member, wherein the force distributor member is fixed to the energy attenuation member and transfers the portion of the received external force to the tactile sensor assembly.

7. The humanoid robot of claim 6, wherein the force distributor member comprises a base positioned over the first strain gauge and an extension flange at a rear of the base extending upward and away from the first strain gauge, wherein the force distributor member transfers the portion of the received external force to the tactile sensor assembly by moving towards the tactile sensor assembly, and wherein an amount of such movement is limited by a hard stop acting against a bottom surface of the force distributor member.

8. The humanoid robot of claim 1, wherein the tactile sensor assembly further includes a bridge comprising:

(a) a base section, and (b) three flexure arms, wherein each flexure arm includes a sloped section extending upwards from the base section and a load section extending away from the sloped section and parallel to the base section, and wherein the first strain gauge is coupled to the sloped section of a first flexure arm of the of the three flexure arms, a second strain gauge is coupled to the sloped section of a second flexure arm of the of the three flexure arms, and a third strain gauge is coupled to the sloped section of a third flexure arm of the of the three flexure arms.

9. The humanoid robot of claim 8, wherein each sloped section extends upwards from the base section at an angle between 1° and 60°, measured as an interior angle between a dominant plane of the base section and a dominant plane of the sloped section.

10. The humanoid robot of claim 8, wherein each flexure arm of the three flexure arms is configured to repeatably deform a known amount in response to a known force applied normal to the load section of the respective flexure arm and return to a non-deformed state when the known force is removed.

* * * * *